United States Patent
Yao et al.

(10) Patent No.: US 12,231,933 B2
(45) Date of Patent: Feb. 18, 2025

(54) COMMUNICATIONS METHOD AND APPARATUS

(71) Applicant: Huawei Technologies Co., Ltd., Shenzhen (CN)

(72) Inventors: Chuting Yao, Beijing (CN); Yiru Kuang, Beijing (CN); Jian Wang, Beijing (CN); Bo Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 337 days.

(21) Appl. No.: 17/910,274

(22) PCT Filed: Mar. 2, 2021

(86) PCT No.: PCT/CN2021/078747
§ 371 (c)(1),
(2) Date: Sep. 8, 2022

(87) PCT Pub. No.: WO2021/179962
PCT Pub. Date: Sep. 16, 2021

(65) Prior Publication Data
US 2023/0141810 A1   May 11, 2023

(30) Foreign Application Priority Data
Mar. 10, 2020   (CN) .......................... 202010162964.1

(51) Int. Cl.
*H04W 72/12* (2023.01)
*H04W 8/22* (2009.01)
(Continued)

(52) U.S. Cl.
CPC .............. *H04W 24/08* (2013.01); *H04W 8/22* (2013.01); *H04W 72/12* (2013.01); *H04W 72/51* (2023.01)

(58) Field of Classification Search
CPC ..... H04W 24/08; H04W 72/51; H04W 72/12; H04W 8/22
See application file for complete search history.

(56) References Cited

U.S. PATENT DOCUMENTS

| 2013/0308481 A1 | 11/2013 | Kazmi et al. |
| 2019/0097877 A1 | 3/2019 | Yiu et al. |

(Continued)

FOREIGN PATENT DOCUMENTS

| CN | 107409027 A | 11/2017 |
| CN | 107820726 A | 3/2018 |

(Continued)

OTHER PUBLICATIONS

Nokia et al., "Consideration on Measurement configuration in NR-DC," 3GPP TSG-RAN WG2 Meeting #103bis, Chengdu, China, R2-1814529, Total 3 pages, 3rd Generation Partnership Project, Valbonne, France (Oct. 8-12, 2018).

(Continued)

*Primary Examiner* — Kent Krueger
(74) *Attorney, Agent, or Firm* — Leydig, Voit & Mayer, Ltd.

(57) ABSTRACT

A communications method and apparatus are provided. A network device determines whether a first capability of a terminal device is less than or equal to a second capability of the terminal device. The first capability is a capability of the terminal device of working at a first frequency when the terminal device supports only a first radio access technology, and the second capability is a capability of the terminal device corresponding to the first frequency in a first frequency combination. When the first capability is less than or equal to the second capability, the network device sends a first message to the terminal device. The first message is used to indicate the terminal device to measure a second frequency, the first message does not include a configuration (Continued)

of a first measurement gap, and the first measurement gap is used to measure the second frequency.

20 Claims, 16 Drawing Sheets

(51) Int. Cl.
*H04W 24/08* (2009.01)
*H04W 72/51* (2023.01)

(56) References Cited

U.S. PATENT DOCUMENTS

| | | | | |
|---|---|---|---|---|
| 2022/0210675 | A1* | 6/2022 | Cui | H04W 24/08 |
| 2022/0377662 | A1* | 11/2022 | Sun | H04W 24/10 |
| 2023/0035994 | A1* | 2/2023 | Takada | H04W 24/10 |

FOREIGN PATENT DOCUMENTS

| | | | |
|---|---|---|---|
| CN | 109788497 | A | 5/2019 |
| CN | 110049509 | A | 7/2019 |
| CN | 110720235 | A | 1/2020 |
| WO | 2019033058 | A1 | 2/2019 |

OTHER PUBLICATIONS

ZTE, "Discussion on Intra frequency and inter frequency definition in NR," 3GPP TSG-RAN WG4 Meeting RAN4#84, R4-1708192, Berlin, Germany, Total 9 pages, 3rd Generation Partnership Project, Valbonne, France (Aug. 21-25, 2017).

Intel Corporation, "Measurement need for gap capability transfer enhancements for EN-DC and NR SA", 3GPP TSG RAN WG2 Meeting #100, R2-1712693, Mobile Competence Centre;650, Route Des Lucioles; F-06921 Sophia-Antipolis Cedexfrance, XP051371607, Total 6 pages, 3rd Generation Partnership Project, Valbonne, France (Nov. 27-Dec. 1, 2017).

"3rd Generation Partnership Project; Technical Specification Group Radio Access Network; Evolved Universal Terrestrial Radio Access (E-UTRA) and NR; Multi-connectivity; Stage 2 (Release 15)," 3GPP TS 37.340 V0.2.1, Total 43 pages, 3rd Generation Partnership Project, Valbonne, France (Aug. 2017).

Nokia et al., "Need for measurement gap before EN-DC configuration," 3GPP TSG-RAN WG4 Meeting #88, Gothenburg, Sweden, R4-1810590, Mobile Competence Centre;650, Route Des Lucioles;F-06921 Sophia-Antipolis Cedex; XP051579524, Total 4 pages, 3rd Generation Partnership Project, Valbonne, France (Aug. 20-24, 2018).

"3rd Generation Partnership Project; Technical Specification Group Radio Access Network; NG Radio Access Network; Overall Description; Stage 2 (Release 15)," TS 38.00 V0.2.0, Total 33 pages, 3rd Generation Partnership Project, Valbonne, France (May 2017).

* cited by examiner

CONT. FROM FIG. 3A

CONT. FROM FIG. 3A

When the first capability is greater than the second capability

S38: Determine a communications parameter of the terminal device of working at a first frequency as a second communications parameter, to schedule communication of the terminal device at the first frequency based on the second capability S39: Fourth message (the fourth message indicates to measure the second frequency, and the fourth message does not include a configuration of a first measurement gap)

When the first capability is greater than the second capability

S40: Configure a communications parameter of the terminal device of working at a first frequency in a second measurement gap as a third communications parameter, to schedule communication of the terminal device at the first frequency in the second measurement gap based on a fourth capability, where the fourth capability is less than or equal to the first capability S41: Fifth message (the fifth message indicates to measure the second frequency, the fifth message includes the third communications parameter, and the fifth message includes a configuration of a second measurement gap)

When the first capability is greater than the second capability

S42: Determine a communications parameter of the terminal device of working at a first frequency in a second measurement gap as a fourth communications parameter, to schedule communication of the terminal device at the first frequency in the second measurement gap based on the second capability S43: Sixth message (the sixth message indicates to measure the second frequency, and the sixth message includes a configuration of the second measurement gap)

FIG. 3B

COMMUNICATIONS METHOD AND APPARATUS

CROSS-REFERENCE TO RELATED APPLICATIONS

This application is a National Stage of International Application No. PCT/CN2021/078747, filed on Mar. 2, 2021, which claims priority to Chinese Patent Application No. 202010162964.1, filed on Mar. 10, 2020, both of which are hereby incorporated by reference in their entireties.

TECHNICAL FIELD

Embodiments of this application relate to the field of communications technologies, and in particular, to a communications method and apparatus.

BACKGROUND

A terminal device that supports an evolved universal terrestrial radio access new radio dual connectivity (E-UTRA NR dual connectivity, EN-DC) architecture may have two transceiver systems. For the terminal device in the EN-DC architecture, for example, a serving cell of the terminal device is a long term evolution (LTE) cell. If the terminal device needs to measure a corresponding new radio (NR) cell, when an LTE base station identifies that the terminal device performs only inter-RAT measurement (that is, measures only the NR cell, and does not measure another LTE cell), and a to-be-measured frequency and a frequency of the current serving cell belong to an EN-DC frequency combination supported by the terminal device, the LTE base station may not configure a measurement gap for the terminal device. Therefore, the terminal device can not only measure the NR cell, but also can communicate with the serving cell. This improves transmission efficiency.

However, an LTE radio frequency capability of the terminal device in the supported EN-DC frequency combination may be less than an LTE radio frequency capability of the terminal device used when the terminal device supports only an LTE system. For example, the terminal device has four receive antennas (Rx) in total. If the terminal device supports only an LTE band, all the four antennas may be used to receive an LTE signal. However, if the terminal device supports an EN-DC frequency combination, and the terminal device measures an NR cell when there is no gap, only two of the four antennas may be used to receive an LTE signal, and the other two antennas need to be used to receive an NR signal during measurement.

It can be learned that an LTE radio frequency capability of the terminal device may be deteriorated due to a measurement process of the terminal device. In this case, the terminal device may not start measurement to ensure current LTE service quality. Consequently, the terminal device cannot measure an NR band, and cannot find a good EN-DC secondary station. Alternatively, the terminal device starts measurement. When a base station is unknown, the terminal device deteriorates the LTE radio frequency capability. Consequently, a bit error may occur in an LTE service.

SUMMARY

Embodiments of this application provide a communications method and apparatus, to reduce a performance loss caused when a radio frequency capability of a terminal device is deteriorated due to measurement.

According to a first aspect, a first communications method is provided. The method includes: determining whether a first capability of a terminal device is less than or equal to a second capability of the terminal device, where the first capability is a capability of the terminal device of working at a first frequency when the terminal device supports only a first radio access technology, the second capability is a capability of the terminal device corresponding to the first frequency in a first frequency combination, the first frequency combination includes the first frequency and a second frequency, the first frequency corresponds to the first radio access technology, and the second frequency corresponds to a second radio access technology; and when the first capability is less than or equal to the second capability, sending a first message to the terminal device, where the first message is used to indicate the terminal device to measure the second frequency, the first message does not include a configuration of a first measurement gap, and the first measurement gap is used to measure the second frequency.

The method may be performed by a first communications apparatus. The first communications apparatus may be a communications device, or may be a communications apparatus, for example, a chip, that can support the communications device in implementing a function required in the method. For example, the first communications apparatus is the network device, a chip that is disposed in the network device and that is configured to implement a function of the network device, or another component that is configured to implement a function of the network device. In the following description process, an example in which the first communications apparatus is the network device is used.

In this embodiment of this application, it may be determined whether the first capability of the terminal device is less than or equal to the second capability of the terminal device. A capability of the terminal device includes, for example, a radio frequency capability of the terminal device. For example, it is determined whether an LTE radio frequency capability of the terminal device used when the terminal device supports only an LTE system is less than or equal to an LTE radio frequency capability of the terminal device in an EN-DC frequency combination. If the first capability is less than or equal to the second capability of the terminal device, it indicates that the LTE radio frequency capability of the terminal device in the EN-DC frequency combination is not deteriorated. In this case, no measurement gap may be configured for the terminal device. Therefore, the terminal device can not only measure the second frequency, but also can communicate with a device such as the network device at the first frequency. This can improve transmission efficiency. When it is determined that the LTE radio frequency capability is not deteriorated, no measurement gap is configured for the terminal device, so that the terminal device can normally complete measurement, and can find a relatively good EN-DC secondary station. In addition, when the network device is unknown, the terminal device does not need to deteriorate the LTE radio frequency capability either. This reduces a probability that a bit error occurs in an LTE service.

With reference to the first aspect, in a first possible implementation of the first aspect, the terminal device measures the second frequency when working at the first frequency.

The network device compares the first capability with the second capability, and both the first capability and the second capability correspond to the first frequency. Therefore, if the terminal device needs to measure the second frequency, a working frequency of the terminal device or a frequency of a serving cell of the terminal device needs to be the first frequency. In this way, the terminal device can normally complete measurement on the second frequency.

With reference to the first aspect or the first possible implementation of the first aspect, in a second possible implementation of the first aspect, the method further includes:

when the first capability is greater than the second capability, sending a second message to the terminal device, where the second message is used to indicate the terminal device to measure the second frequency, and the second message includes the configuration of the first measurement gap.

If the first capability is greater than the second capability, and if the terminal device measures the second frequency without a gap at the first frequency, a capability of the terminal device corresponding to the first radio access technology is deteriorated. In this case, a method may be used in this embodiment of this application. To be specific, the terminal device may continue to be configured to measure the second frequency when working at the first frequency, but the first gap is configured for the terminal device, and the terminal device measures the second frequency in the first gap. In this way, when working at the first frequency, the terminal device does not simultaneously measure the second frequency and communicate with the network device at the first frequency. Beyond the first gap, the terminal device may communicate with the network device or the like at the first frequency by using the first capability, so that communication performance of the terminal device corresponding to the first radio access technology is not deteriorated. In the first gap, the terminal device may measure the second frequency. In this manner, a measurement requirement of the terminal device can be met, and the capability of the terminal device corresponding to the first radio access technology is not deteriorated.

With reference to the first aspect or the first possible implementation of the first aspect, in a third possible implementation of the first aspect, the method further includes:

when the first capability is greater than the second capability, configuring a first communications parameter of the terminal device of working at the first frequency, to schedule communication of the terminal device at the first frequency based on a third capability, where the third capability is less than or equal to the second capability; and sending a third message to the terminal device, where the third message is used to indicate the terminal device to measure the second frequency, the third message does not include the configuration of the first measurement gap, and the first measurement gap is used to measure the second frequency.

If the first capability is greater than the second capability, and if the terminal device measures the second frequency without a gap at the first frequency, a capability of the terminal device corresponding to the first radio access technology is deteriorated. In this case, another method may be used in this embodiment of this application. For example, the network device configures a communications parameter of working at the first frequency as the first communications parameter for the terminal device. The first communications parameter corresponds to the third capability of the terminal device. In other words, if the first communications parameter is configured for the terminal device, the terminal device works with the third capability. In other words, the first communications parameter is a communications parameter used to configure a capability of the terminal device as the third capability. Therefore, after the network device configures the first communications parameter, the network device may schedule communication of the terminal device at the first frequency based on the third capability, the terminal device also communicates with the network device at the first frequency based on the third capability, and the third capability is less than or equal to the second capability. In this case, the capability of the terminal device is the third capability configured by the network device for the terminal device. Therefore, the third capability is known to the network device. The network device also schedules communication of the terminal device at the first frequency based on the third capability, so that scheduling of the network device matches an actual capability of the terminal device, and the terminal device can normally communicate with the network device at the first frequency based on the third capability. This reduces a bit error probability, and increases a transmission success rate.

With reference to the third possible implementation of the first aspect, in a fourth possible implementation of the first aspect, the third message further includes the first communications parameter, and the first communications parameter is a communications parameter used to configure a capability of the terminal device as the third capability.

The third message may include the first communications parameter, or the third message may indicate the third capability. Therefore, after receiving the third message, the terminal device can also learn that the configured capability of working at the first frequency is the third capability, so that the terminal device can perform communication at the first frequency based on the third capability.

With reference to the first aspect or the first possible implementation of the first aspect, in a fifth possible implementation of the first aspect, the method further includes:

when the first capability is greater than the second capability, determining a second communications parameter of the terminal device of working at the first frequency, to schedule communication of the terminal device at the first frequency based on the second capability; and sending a fourth message to the terminal device, where the fourth message is used to indicate the terminal device to measure the second frequency, the fourth message does not include the configuration of the first measurement gap, and the first measurement gap is used to measure the second frequency.

If the first capability is greater than the second capability, and if the terminal device measures the second frequency without a gap at the first frequency, a capability of the terminal device corresponding to the first radio access technology is deteriorated. In this case, another method may be used in this embodiment of this application. For example, the network device configures a communications parameter of the terminal device of working at the first frequency as the second communications parameter. The second communications parameter corresponds to the second capability of the terminal device. In other words, if the second communications parameter is configured for the terminal device, the terminal device works with the second capability. In other words, the second communications parameter is a communications parameter used to configure a capability of the terminal device as the second capability. In this case, both the network device and the terminal device determine that the capability of the terminal device corresponding to the first frequency in the first frequency combination is the second capability. Therefore, the network device does not need to configure the second communications parameter for the terminal device, but only needs to schedule communication of the terminal device at the first frequency based on the second capability.

With reference to the first aspect or the first possible implementation of the first aspect, in a sixth possible implementation of the first aspect, the method further includes:

when the first capability is greater than the second capability, configuring a third communications parameter of the terminal device of working at the first frequency in a second measurement gap, to schedule communication of the terminal device at the first frequency in the second measurement gap based on a fourth capability, where the fourth capability is less than or equal to the first capability, and the second measurement gap is used to measure the second frequency; and sending a fifth message to the terminal device, where the fifth message is used to indicate the terminal device to measure the second frequency, the fifth message includes a configuration of the second measurement gap, and the second measurement gap is used to measure the second frequency.

If the first capability is greater than the second capability, and if the terminal device measures the second frequency without a gap at the first frequency, a capability of the terminal device corresponding to the first radio access technology is deteriorated. In this case, still another method may be used in this embodiment of this application. For example, the network device determines a communications parameter of the terminal device of working at the first frequency in the second gap as the third communications parameter. The third communications parameter corresponds to the fourth capability of the terminal device. In other words, if the third communications parameter is configured for the terminal device, the terminal device works with the fourth capability. In other words, the third communications parameter is a communications parameter used to configure a capability of the terminal device as the fourth capability. The fourth capability is less than or equal to the first capability. After the network device configures the second communications parameter, the network device may schedule communication of the terminal device at the first frequency in the second gap based on the fourth capability, the terminal device also communicates with the network device at the first frequency in the second gap based on the fourth capability, and the fourth capability is less than or equal to the first capability. In this case, the capability of the terminal device is the fourth capability configured by the network device for the terminal device. Therefore, the fourth capability is known to the network device. The network device also schedules communication of the terminal device at the first frequency in the second gap based on the fourth capability, so that scheduling of the network device matches an actual capability of the terminal device, and the terminal device can normally communicate with the network device at the first frequency in the second gap based on the fourth capability. This reduces a bit error probability, and increases a transmission success rate.

With reference to the sixth possible implementation of the first aspect, in a seventh possible implementation of the first aspect, the fifth message further includes the third communications parameter, and the third communications parameter is a communications parameter used to configure a capability of the terminal device as the fourth capability.

The fifth message may include the third communications parameter, or the fifth message may indicate the fourth capability. Therefore, after receiving the fifth message, the terminal device can also learn that the configured capability of working at the first frequency in the second gap is the fourth capability, so that the terminal device can perform communication at the first frequency in the second gap based on the fourth capability.

With reference to the first aspect or the first possible implementation of the first aspect, in an eighth possible implementation of the first aspect, the method further includes:

when the first capability is greater than the second capability, determining a fourth communications parameter of the terminal device of working at the first frequency in a second measurement gap, to schedule communication of the terminal device at the first frequency in the second measurement gap based on the second capability; and sending a sixth message to the terminal device, where the sixth message is used to indicate the terminal device to measure the second frequency, the sixth message includes a configuration of the second measurement gap, and the second measurement gap is used to measure the second frequency.

If the first capability is greater than the second capability, and if the terminal device measures the second frequency without a gap at the first frequency, a capability of the terminal device corresponding to the first radio access technology is deteriorated. In this case, yet another method may be used in this embodiment of this application. For example, the network device determines a communications parameter of the terminal device of working at the first frequency in the second gap as the fourth communications parameter. The fourth communications parameter corresponds to the second capability of the terminal device. In other words, if the fourth communications parameter is configured for the terminal device, the terminal device works with the second capability. In other words, the fourth communications parameter is a communications parameter used to configure a capability of the terminal device as the second capability. In this case, both the network device and the terminal device determine that the capability of the terminal device corresponding to the first frequency in the first frequency combination is the second capability. Therefore, the network device does not need to configure the fourth communications parameter for the terminal device, but only needs to schedule communication of the terminal device at the first frequency based on the second capability. This can reduce signaling overheads.

With reference to any one of the first aspect or the first possible implementation of the first aspect to the eighth possible implementation of the first aspect, in a ninth possible implementation of the first aspect, the first frequency combination is a frequency combination supported by the terminal device; or the method further includes: if it is determined that the terminal device is in an activated state at the first frequency and a third frequency, and a frequency combination supported by the terminal device does not include a frequency combination including the first frequency, the second frequency, and the third frequency, deactivating the third frequency to obtain the first frequency combination, where the third frequency corresponds to the first radio access technology, and the first frequency combination is a frequency combination supported by the terminal device.

If no carrier aggregation is configured for the terminal device, there is only one serving cell of the terminal device, for example, there is only the first frequency. In this case, the terminal device only needs to determine whether a frequency combination including the first frequency and the second frequency is a frequency combination supported by the terminal device. In addition, in this embodiment of this application, an example in which the first frequency combination is a frequency combination supported by the terminal device is used. If carrier aggregation is configured for the terminal device, there may be a plurality of serving cells of the terminal device. For example, the serving cells of the terminal device include a primary cell and a secondary cell, and there may be one primary cell and one or more secondary cells. In this case, for the terminal device, if a quantity of activated-state serving cells is greater than or equal to 2, the network device initially determines one or more frequencies in addition to the first frequency and the second frequency, and the one or more frequencies all correspond to the first radio access technology. If the network device determines that the terminal device is in an activated state at the first frequency and the third frequency, the network device may determine whether the frequency combination including the first frequency, the second frequency, and the third frequency is a frequency combination supported by the terminal device. If the frequency combination supported by the terminal device does not include the frequency combination including the first frequency, the second frequency, and the third frequency, the network device may deactivate the third frequency to obtain the first frequency combination including the first frequency and the second frequency. In this manner, the terminal device can measure the second frequency as much as possible.

With reference to any one of the first aspect or the first possible implementation of the first aspect to the ninth possible implementation of the first aspect, in a tenth possible implementation of the first aspect, the determining whether a first capability of a terminal device is less than or equal to a second capability of the terminal device includes:

receiving capability information from the terminal device, where the capability information is used to indicate a capability of the terminal device of working at each of N frequencies when the terminal device supports only the first radio access technology, and indicate a capability of the terminal device corresponding to the third frequency in each of at least one supported frequency combination, the N frequencies include the first frequency, each frequency combination includes the third frequency and a fourth frequency, and the third frequency corresponds to the first radio access technology; and determining, based on the capability information, whether the first capability is less than or equal to the second capability.

The terminal device may send the capability information of the terminal device to the network device, so that the network device can determine a value relationship between the first capability and the second capability based on the capability information of the terminal device.

With reference to any one of the first aspect or the first possible implementation of the first aspect to the ninth possible implementation of the first aspect, in an eleventh possible implementation of the first aspect, the determining whether a first capability of a terminal device is less than or equal to a second capability of the terminal device includes:

receiving indication information from the terminal device, where the indication information indicates one or more frequency combinations, a capability of the terminal device corresponding to a fifth frequency in each of the one or more frequency combinations is greater than a capability of the terminal device of working at the fifth frequency when the terminal device supports only the first radio access technology, or a capability of the terminal device corresponding to a fifth frequency in each of the one or more frequency combinations is less than or equal to a capability of the terminal device of working at the fifth frequency when the terminal device supports only the first radio access technology, each frequency combination includes the fifth frequency and a sixth frequency, the fifth frequency corresponds to the first radio access technology, and the sixth frequency corresponds to the second radio access technology; and determining, based on the indication information, whether the first capability is less than or equal to the second capability.

The indication information may only need to indicate the one or more frequency combinations, and does not need to indicate a specific capability. This is equivalent to that the terminal device determines the indication information after analyzing the capability of the terminal device. The indication information may be used by the network device to determine the capability of the terminal device. When determining the capability of the terminal device, the network device does not need to query capability information of the terminal device. This helps simplify an operation process of the network device. In addition, an information amount of the indication information is obviously less than an information amount of the capability information. This helps reduce signaling overheads.

With reference to any one of the first aspect or the first possible implementation of the first aspect to the eleventh possible implementation of the first aspect, in a twelfth possible implementation of the first aspect, the first capability is a capability of a quantity of MIMO layers, a quantity of SRS ports, or a quantity of antenna ports that can be supported by the terminal device; and/or the second capability is a capability of a quantity of MIMO layers, a quantity of SRS ports, or a quantity of antenna ports that can be supported by the terminal device.

The foregoing descriptions are capability examples herein. In addition, the first capability or the second capability may alternatively include another capability of the terminal device. This is not specifically limited.

According to a second aspect, a second communications method is provided. The method includes: determining one or more frequency combinations, where a capability of a terminal device corresponding to a fifth frequency in each of the one or more frequency combinations is greater than a capability of the terminal device of working at the fifth frequency when the terminal device supports only a first radio access technology, or a capability of a terminal device corresponding to a fifth frequency in each of the one or more frequency combinations is less than or equal to a capability of the terminal device of working at the fifth frequency when the terminal device supports only a first radio access technology, each frequency combination includes the fifth frequency and a sixth frequency, the fifth frequency corresponds to the first radio access technology, and the sixth frequency corresponds to a second radio access technology; and sending indication information to a network device, where the indication information indicates the one or more frequency combinations.

The method may be performed by a second communications apparatus. The second communications apparatus may be a communications device, or may be a communications apparatus, for example, a chip, that can support a communications device in implementing a function required in the method. For example, the second communications apparatus is the terminal device, a chip that is disposed in the terminal device and that is configured to implement a function of the terminal device, or another component that is configured to implement a function of the terminal device. In the following description process, an example in which the second communications apparatus is the terminal device is used.

With reference to the second aspect, in a first possible implementation of the second aspect, the method further includes:
sending capability information of the terminal device to the network device, where the capability information is used to indicate a capability of the terminal device of working at each of N frequencies when the terminal device supports only the first radio access technology, and indicate a capability of the terminal device corresponding to a third frequency in each of at least one supported frequency combination, the N frequencies include a first frequency, each frequency combination includes the third frequency and a fourth frequency, and the third frequency corresponds to the first radio access technology.

With reference to the second aspect or the first possible implementation of the second aspect, in a second possible implementation of the second aspect, the method further includes:
receiving a first message from the network device, where the first message is used to indicate to measure a second frequency, the terminal device works at the first frequency, the first frequency and the second frequency belong to a first frequency combination supported by the terminal device, the first frequency corresponds to the first radio access technology, the second frequency corresponds to the second radio access technology, the first message does not include a configuration of a first measurement gap, and the first measurement gap is used to measure the second frequency.

With reference to the second aspect or the first possible implementation of the second aspect, in a third possible implementation of the second aspect, the method further includes:
receiving a second message from the network device, where the second message is used to indicate to measure a second frequency, the terminal device works at the first frequency, the first frequency and the second frequency belong to a first frequency combination supported by the terminal device, the first frequency corresponds to the first radio access technology, the second frequency corresponds to the second radio access technology, the second message includes a configuration of a first measurement gap, and the first measurement gap is used to measure the second frequency.

With reference to the second aspect or the first possible implementation of the second aspect, in a fourth possible implementation of the second aspect, the method further includes:
receiving a third message from the network device, where the third message is used to indicate the terminal device to measure a second frequency, the third message does not include a configuration of a first measurement gap, the first measurement gap is used to measure the second frequency, the third message further includes a first communications parameter, and the first communications parameter is a communications parameter used to configure a capability of the terminal device as a third capability.

With reference to the second aspect or the first possible implementation of the second aspect, in a fifth possible implementation of the second aspect, the method further includes:
receiving a fourth message from the network device, where the fourth message is used to indicate the terminal device to measure a second frequency, the fourth message does not include a configuration of a first measurement gap, the first measurement gap is used to measure the second frequency, the terminal device can perform communication at the first frequency when measuring the second frequency, and a capability of the terminal device corresponding to the first frequency is a second capability.

With reference to the second aspect or the first possible implementation of the second aspect, in a sixth possible implementation of the second aspect, the method further includes:
receiving a fifth message from the network device, where the fifth message is used to indicate to measure a second frequency, the terminal device works at the first frequency, the first frequency and the second frequency belong to a first frequency combination supported by the terminal device, the first frequency corresponds to the first radio access technology, the second frequency corresponds to the second radio access technology, the fifth message includes a configuration of a second measurement gap, the second measurement gap is used to measure the second frequency, the fifth message further includes a third communications parameter corresponding to the second measurement gap, the third communications parameter is a communications parameter used to configure a capability of the terminal device corresponding to the first frequency as a fourth capability, the fourth capability is less than or equal to a first capability, and the first capability is a capability of the terminal device of working at the first frequency when the terminal device supports only the first radio access technology.

With reference to the second aspect or the first possible implementation of the second aspect, in a seventh possible implementation of the second aspect, the method further includes:
receiving a sixth message from the network device, where the sixth message is used to indicate to measure a second frequency, the terminal device works at the first frequency, the first frequency and the second frequency belong to a first frequency combination supported by the terminal device, the first frequency corresponds to the first radio access technology, the second frequency corresponds to the second radio access technology, the sixth message includes a configuration of a second measurement gap, the second measurement gap is used to measure the second frequency, the terminal device can perform communication at the first frequency when measuring the second frequency in the second measurement gap, and a capability of the terminal device corresponding to the first frequency in the second measurement gap is a second capability.

For technical effects brought by the second aspect or the optional implementations of the second aspect, refer to the descriptions of the technical effects brought by the first aspect or the corresponding implementations of the first aspect.

According to a third aspect, a communications apparatus is provided. For example, the communications apparatus is the first communications apparatus described above. The first communications apparatus is configured to perform the method according to any one of the first aspect or the possible implementations. Specifically, the first communications apparatus may include modules configured to perform the method according to any one of the first aspect or the possible implementations, for example, include a processing module and a transceiver module. For example, the transceiver module may include a sending module and a receiving module. The sending module and the receiving module may be different function modules, or may be a same function module but can implement different functions. For example, the first communications apparatus is a communications device, or is a chip or another component disposed in the communications device. For example, the communications device is a network device. An example in which the first communications apparatus is a network device is used below. For example, the transceiver module may alternatively be implemented as a transceiver, and the processing module may alternatively be implemented as a processor. Alternatively, the sending module may be implemented as a transmitter, and the receiving module may be implemented as a receiver. The transmitter and the receiver may be different function modules, or may be a same function module but can implement different functions. If the first communications apparatus is a communications device, the transceiver is implemented, for example, as an antenna, a feeder, and a codec in the communications device. Alternatively, if the first communications apparatus is a chip disposed in a communications device, the transceiver (or the transmitter and the receiver) is, for example, a communications interface in the chip. The communications interface is connected to a radio frequency transceiver component in the communications device, to send and receive information through the radio frequency transceiver component. In a description process of the third aspect, an example in which the first communications apparatus is the network device including the processing module and the transceiver module is still used for description.

The processing module is configured to determine whether a first capability of a terminal device is less than or equal to a second capability of the terminal device, where the first capability is a capability of the terminal device of working at a first frequency when the terminal device supports only a first radio access technology, the second capability is a capability of the terminal device corresponding to the first frequency in a first frequency combination, the first frequency combination includes the first frequency and a second frequency, the first frequency corresponds to the first radio access technology, and the second frequency corresponds to a second radio access technology.

The transceiver module is configured to: when the processing module determines that the first capability is less than or equal to the second capability, send a first message to the terminal device, where the first message is used to indicate the terminal device to measure the second frequency, the first message does not include a configuration of a first measurement gap, and the first measurement gap is used to measure the second frequency.

With reference to the third aspect, in a first possible implementation of the third aspect, the terminal device measures the second frequency when working at the first frequency.

With reference to the third aspect or the first possible implementation of the third aspect, in a second possible implementation of the third aspect, the transceiver module is further configured to: when the processing module determines that the first capability is greater than the second capability, send a second message to the terminal device, where the second message is used to indicate the terminal device to measure the second frequency, and the second message includes the configuration of the first measurement gap.

With reference to the third aspect or the first possible implementation of the third aspect, in a third possible implementation of the third aspect,
  the processing module is further configured to: when the first capability is greater than the second capability, configure a first communications parameter of the terminal device of working at the first frequency, to schedule communication of the terminal device at the first frequency based on a third capability, where the third capability is less than or equal to the second capability; and
  the transceiver module is further configured to send a third message to the terminal device, where the third message is used to indicate the terminal device to measure the second frequency, the third message does not include the configuration of the first measurement gap, and the first measurement gap is used to measure the second frequency.

With reference to the third possible implementation of the third aspect, in a fourth possible implementation of the third aspect, the third message further includes the first communications parameter, and the first communications parameter is a communications parameter used to configure a capability of the terminal device as the third capability.

With reference to the third aspect or the first possible implementation of the third aspect, in a fifth possible implementation of the third aspect,
  the processing module is further configured to: when the first capability is greater than the second capability, determine a second communications parameter of the terminal device of working at the first frequency, to schedule communication of the terminal device at the first frequency based on the second capability; and
  the transceiver module is further configured to send a fourth message to the terminal device, where the fourth message is used to indicate the terminal device to measure the second frequency, the fourth message does not include the configuration of the first measurement gap, and the first measurement gap is used to measure the second frequency.

With reference to the third aspect or the first possible implementation of the third aspect, in a sixth possible implementation of the third aspect,
  the processing module is further configured to: when the first capability is greater than the second capability, configure a third communications parameter of the terminal device of working at the first frequency in a second measurement gap, to schedule communication of the terminal device at the first frequency in the second measurement gap based on a fourth capability, where the fourth capability is less than or equal to the first capability, and the second measurement gap is used to measure the second frequency; and
  the transceiver module is further configured to send a fifth message to the terminal device, where the fifth message is used to indicate the terminal device to measure the second frequency, the fifth message includes a configuration of the second measurement gap, and the second measurement gap is used to measure the second frequency.

With reference to the sixth possible implementation of the third aspect, in a seventh possible implementation of the third aspect, the fifth message further includes the third communications parameter, and the third communications parameter is a communications parameter used to configure a capability of the terminal device as the fourth capability.

With reference to the third aspect or the first possible implementation of the third aspect, in an eighth possible implementation of the third aspect, the processing module is further configured to: when the first capability is greater than the second capability, determine a fourth communications parameter of the terminal device of working at the first frequency in a second measurement gap, to schedule communication of the terminal device at the first frequency in the second measurement gap based on the second capability; and the transceiver module is further configured to send a sixth message to the terminal device, where the sixth message is used to indicate the terminal device to measure the second frequency, the sixth message includes a configuration of the second measurement gap, and the second measurement gap is used to measure the second frequency.

With reference to any one of the third aspect or the first possible implementation of the third aspect to the eighth possible implementation of the third aspect, in a ninth possible implementation of the third aspect, the first frequency combination is a frequency combination supported by the terminal device; or the processing module is further configured to: when determining that the terminal device is in an activated state at the first frequency and a third frequency, and a frequency combination supported by the terminal device does not include a frequency combination including the first frequency, the second frequency, and the third frequency, deactivate the third frequency to obtain the first frequency combination, where the third frequency corresponds to the first radio access technology, and the first frequency combination is a frequency combination supported by the terminal device.

With reference to any one of the third aspect or the first possible implementation of the third aspect to the ninth possible implementation of the third aspect, in a tenth possible implementation of the third aspect, the processing module is configured to determine, in the following manner, whether the first capability of the terminal device is less than or equal to the second capability of the terminal device:

receiving capability information from the terminal device by using the transceiver module, where the capability information is used to indicate a capability of the terminal device of working at each of N frequencies when the terminal device supports only the first radio access technology, and indicate a capability of the terminal device corresponding to the third frequency in each of at least one supported frequency combination, the N frequencies include the first frequency, each frequency combination includes the third frequency and a fourth frequency, and the third frequency corresponds to the first radio access technology; and determining, based on the capability information, whether the first capability is less than or equal to the second capability.

With reference to any one of the third aspect or the first possible implementation of the third aspect to the ninth possible implementation of the third aspect, in an eleventh possible implementation of the third aspect, the processing module is configured to determine, in the following manner, whether the first capability of the terminal device is less than or equal to the second capability of the terminal device:

receiving indication information from the terminal device by using the transceiver module, where the indication information indicates one or more frequency combinations, a capability of the terminal device corresponding to a fifth frequency in each of the one or more frequency combinations is greater than a capability of the terminal device of working at the fifth frequency when the terminal device supports only the first radio access technology, or a capability of the terminal device corresponding to a fifth frequency in each of the one or more frequency combinations is less than or equal to a capability of the terminal device of working at the fifth frequency when the terminal device supports only the first radio access technology, each frequency combination includes the fifth frequency and a sixth frequency, the fifth frequency corresponds to the first radio access technology, and the sixth frequency corresponds to the second radio access technology; and determining, based on the indication information, whether the first capability is less than or equal to the second capability.

With reference to any one of the third aspect or the first possible implementation of the third aspect to the eleventh possible implementation of the third aspect, in a twelfth possible implementation of the third aspect, the first capability is a capability of a quantity of MIMO layers, a quantity of SRS ports, or a quantity of antenna ports that can be supported by the terminal device; and/or the second capability is a capability of a quantity of MIMO layers, a quantity of SRS ports, or a quantity of antenna ports that can be supported by the terminal device.

According to a fourth aspect, a communications apparatus is provided. For example, the communications apparatus is the second communications apparatus described above. The second communications apparatus is configured to perform the method according to any one of the second aspect or the possible implementations. Specifically, the second communications apparatus may include modules configured to perform the method according to any one of the second aspect or the possible implementations, for example, include a processing module and a transceiver module. For example, the transceiver module may include a sending module and a receiving module. The sending module and the receiving module may be different function modules, or may be a same function module but can implement different functions. For example, the second communications apparatus is a communications device, or is a chip or another component disposed in the communications device. For example, the communications device is a network device. An example in which the second communications apparatus is a terminal device is used below. For example, the transceiver module may alternatively be implemented as a transceiver, and the processing module may alternatively be implemented as a processor. Alternatively, the sending module may be implemented as a transmitter, and the receiving module may be implemented as a receiver. The transmitter and the receiver may be different function modules, or may be a same function module but can implement different functions. If the second communications apparatus is a communications device, the transceiver is implemented, for example, as an antenna, a feeder, and a codec in the communications device. Alternatively, if the second communications apparatus is a chip disposed in a communications device, the transceiver (or the transmitter and the receiver) is, for example, a communications interface in the chip. The communications interface is connected to a radio frequency transceiver component in the communications device, to send and receive information through the radio frequency transceiver component. In a description process of the fourth aspect, an example in which the second communications apparatus is the terminal device including the processing module and the transceiver module is still used for description.

The processing module is configured to determine one or more frequency combinations, where a capability of the terminal device corresponding to a fifth frequency in each of the one or more frequency combinations is greater than a capability of the terminal device of working at the fifth frequency when the terminal device supports only a first radio access technology, or a capability of the terminal device corresponding to a fifth frequency in each of the one or more frequency combinations is less than or equal to a capability of the terminal device of working at the fifth frequency when the terminal device supports only a first radio access technology, each frequency combination includes the fifth frequency and a sixth frequency, the fifth frequency corresponds to the first radio access technology, and the sixth frequency corresponds to a second radio access technology.

The transceiver module is configured to send indication information to a network device, where the indication information indicates the one or more frequency combinations.

With reference to the fourth aspect, in a first possible implementation of the fourth aspect, the transceiver module is further configured to send capability information of the terminal device to the network device, where the capability information is used to indicate a capability of the terminal device of working at each of N frequencies when the terminal device supports only the first radio access technology, and indicate a capability of the terminal device corresponding to a third frequency in each of at least one supported frequency combination, the N frequencies include a first frequency, each frequency combination includes the third frequency and a fourth frequency, and the third frequency corresponds to the first radio access technology.

With reference to the fourth aspect or the first possible implementation of the fourth aspect, in a second possible implementation of the fourth aspect, the transceiver module is further configured to receive a first message from the network device, where the first message is used to indicate to measure a second frequency, the terminal device works at the first frequency, the first frequency and the second frequency belong to a first frequency combination supported by the terminal device, the first frequency corresponds to the first radio access technology, the second frequency corresponds to the second radio access technology, the first message does not include a configuration of a first measurement gap, and the first measurement gap is used to measure the second frequency.

With reference to the fourth aspect or the first possible implementation of the fourth aspect, in a third possible implementation of the fourth aspect, the transceiver module is further configured to receive a second message from the network device, where the second message is used to indicate to measure a second frequency, the terminal device works at the first frequency, the first frequency and the second frequency belong to a first frequency combination supported by the terminal device, the first frequency corresponds to the first radio access technology, the second frequency corresponds to the second radio access technology, the second message includes a configuration of a first measurement gap, and the first measurement gap is used to measure the second frequency.

With reference to the fourth aspect or the first possible implementation of the fourth aspect, in a fourth possible implementation of the fourth aspect, the transceiver module is further configured to receive a third message from the network device, where the third message is used to indicate the terminal device to measure a second frequency, the third message does not include a configuration of a first measurement gap, the first measurement gap is used to measure the second frequency, the third message further includes a first communications parameter, and the first communications parameter is a communications parameter used to configure a capability of the terminal device as a third capability.

With reference to the fourth aspect or the first possible implementation of the fourth aspect, in a fifth possible implementation of the fourth aspect, the transceiver module is further configured to receive a fourth message from the network device, where the fourth message is used to indicate the terminal device to measure a second frequency, the fourth message does not include a configuration of a first measurement gap, the first measurement gap is used to measure the second frequency, the terminal device can perform communication at the first frequency when measuring the second frequency, and a capability of the terminal device corresponding to the first frequency is a second capability.

With reference to the fourth aspect or the first possible implementation of the fourth aspect, in a sixth possible implementation of the fourth aspect, the transceiver module is further configured to receive a fifth message from the network device, where the fifth message is used to indicate to measure a second frequency, the terminal device works at the first frequency, the first frequency and the second frequency belong to a first frequency combination supported by the terminal device, the first frequency corresponds to the first radio access technology, the second frequency corresponds to the second radio access technology, the fifth message includes a configuration of a second measurement gap, the second measurement gap is used to measure the second frequency, the fifth message further includes a third communications parameter corresponding to the second measurement gap, the third communications parameter is a communications parameter used to configure a capability of the terminal device corresponding to the first frequency as a fourth capability, the fourth capability is less than or equal to a first capability, and the first capability is a capability of the terminal device of working at the first frequency when the terminal device supports only the first radio access technology.

With reference to the fourth aspect or the first possible implementation of the fourth aspect, in a seventh possible implementation of the fourth aspect, the transceiver module is further configured to receive a sixth message from the network device, where the sixth message is used to indicate to measure a second frequency, the terminal device works at the first frequency, the first frequency and the second frequency belong to a first frequency combination supported by the terminal device, the first frequency corresponds to the first radio access technology, the second frequency corresponds to the second radio access technology, the sixth message includes a configuration of a second measurement gap, the second measurement gap is used to measure the second frequency, the terminal device can perform communication at the first frequency when measuring the second frequency in the second measurement gap, and a capability of the terminal device corresponding to the first frequency in the second measurement gap is a second capability.

For technical effects brought by the fourth aspect or the optional implementations of the fourth aspect, refer to the descriptions of the technical effects brought by the second aspect or the corresponding implementations of the second aspect.

According to a fifth aspect, a communications apparatus is provided. The communications apparatus is, for example, the first communications apparatus described above. The communications apparatus includes a processor and a communications interface. The communications interface may be configured to communicate with another apparatus or device. Optionally, the communications apparatus may further include a memory, configured to store computer instructions. The processor and the memory are coupled to each other, to implement the method according to any one of the first aspect or the possible implementations. Alternatively, the first communications apparatus may not include a memory, and the memory may be located outside the first communications apparatus. The processor, the memory, and the communications interface are coupled to each other, to implement the method according to any one of the first aspect or the possible implementations. For example, when the processor executes the computer instructions stored in the memory, the first communications apparatus is enabled to perform the method according to any one of the first aspect or the possible implementations. For example, the first communications apparatus is a communications device, or is a chip or another component disposed in the communications device. For example, the communications device is a network device.

If the first communications apparatus is a communications device, the communications interface is implemented, for example, as a transceiver (or a transmitter and a receiver) in the communications device, and the transceiver is implemented, for example, as an antenna, a feeder, and a codec in the communications device. Alternatively, if the first communications apparatus is a chip disposed in the communications device, the communications interface is, for example, an input/output interface such as an input/output pin of the chip. The communications interface is connected to a radio frequency transceiver component in the communications device, to send and receive information through the radio frequency transceiver component.

According to a sixth aspect, a communications apparatus is provided. The communications apparatus is, for example, the second communications apparatus described above. The communications apparatus includes a processor and a communications interface. The communications interface may be configured to communicate with another apparatus or device. Optionally, the communications apparatus may further include a memory, configured to store computer instructions. The processor and the memory are coupled to each other, to implement the method according to any one of the second aspect or the possible implementations. Alternatively, the second communications apparatus may not include a memory, and the memory may be located outside the second communications apparatus. The processor, the memory, and the communications interface are coupled to each other, to implement the method according to any one of the second aspect or the possible implementations. For example, when the processor executes the computer instructions stored in the memory, the second communications apparatus is enabled to perform the method according to any one of the second aspect or the possible implementations. For example, the second communications apparatus is a communications device, or is a chip or another component disposed in the communications device. For example, the communications device is a terminal device.

If the second communications apparatus is a communications device, the communications interface is implemented, for example, as a transceiver (or a transmitter and a receiver) in the communications device, and the transceiver is implemented, for example, as an antenna, a feeder, and a codec in the communications device. Alternatively, if the second communications apparatus is a chip disposed in the communications device, the communications interface is, for example, an input/output interface such as an input/output pin of the chip. The communications interface is connected to a radio frequency transceiver component in the communications device, to send and receive information through the radio frequency transceiver component.

According to a seventh aspect, a communications system is provided. The communications system includes the communications apparatus according to the third aspect or the communications apparatus according to the fifth aspect, and includes the communications apparatus according to the fourth aspect or the communications apparatus according to the sixth aspect.

According to an eighth aspect, a computer-readable storage medium is provided. The computer-readable storage medium is configured to store a computer program. When the computer program is run on a computer, the computer is enabled to perform the method according to any one of the first aspect or the possible implementations.

According to a ninth aspect, a computer-readable storage medium is provided. The computer-readable storage medium is configured to store a computer program. When the computer program is run on a computer, the computer is enabled to perform the method according to any one of the second aspect or the possible implementations.

According to a tenth aspect, a computer program product including instructions is provided. The computer program product is configured to store a computer program. When the computer program is run on a computer, the computer is enabled to perform the method according to any one of the first aspect or the possible implementations.

According to an eleventh aspect, a computer program product including instructions is provided. The computer program product is configured to store a computer program. When the computer program is run on a computer, the computer is enabled to perform the method according to any one of the second aspect or the possible implementations.

In embodiments of this application, if the first capability is less than or equal to the second capability of the terminal device, it indicates that the radio frequency capability of the terminal device corresponding to the first radio access technology in the first frequency combination is not deteriorated. In this case, no measurement gap may be configured for the terminal device. Therefore, the terminal device can not only measure the second frequency, but also can communicate with the network device at the first frequency. This can improve transmission efficiency. In addition, when the network device is unknown, the terminal device does not need to deteriorate the radio frequency capability corresponding to the first radio access technology. This reduces a probability that a bit error occurs in a service corresponding to the first radio access technology.

BRIEF DESCRIPTION OF DRAWINGS

FIG. 3A and FIG. 3B are a flowchart of a communications method according to an embodiment of this application;

FIG. 4 to FIG. 9A and FIG. 9B are flowcharts of examples of the communications method provided in FIG. 3A and FIG. 3B according to an embodiment of this application;

DESCRIPTION OF EMBODIMENTS

Figure 1:
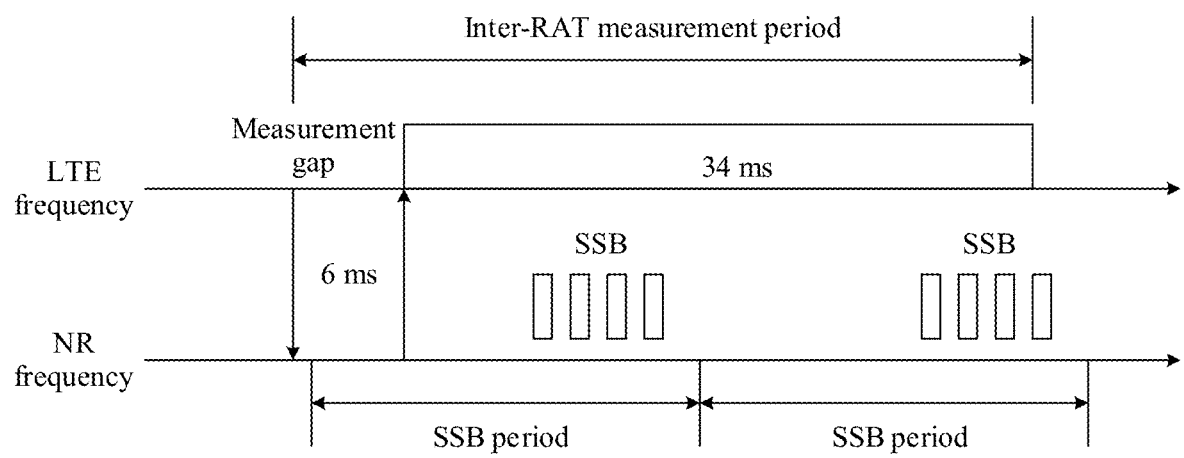
FIG. 1 is a schematic diagram in which a gap configured by an LTE base station cannot cover an SSB of an NR base station.

To make objectives, technical solution, and advantages of embodiments of this application clearer, the following further describes embodiments of this application in detail with reference to the accompanying drawings.

The following describes some terms in embodiments of this application, to facilitate understanding of a person skilled in the art.

(1) Terminal device: The terminal device includes a device that provides voice and/or data connectivity for a user. Specifically, the terminal device includes a device that provides voice for the user, or includes a device that provides data connectivity for the user, or includes a device that provides voice and data connectivity for the user. For example, the terminal device may include a handheld device having a wireless connection function or a processing device connected to a wireless modem. The terminal device may communicate with a core network through a radio access network (RAN), and exchange voice or data with the RAN, or exchange voice and data with the RAN. The terminal device may include user equipment (UE), a wireless terminal device, a mobile terminal device, a device-to-device (D2D) communications terminal device, a vehicle-to-everything (V2X) terminal device, a machine-to-machine/machine type communications (M2M/MTC) terminal device, an internet of things (IoT) terminal device, a subscriber unit, a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, a portable, pocket-sized, handheld, or computer built-in mobile apparatus, or the like. For example, the terminal device may be a device such as a personal communications service (PCS) phone, a cordless telephone set, a session initiation protocol (SIP) phone, a wireless local loop (WLL) station, or a personal digital assistant (PDA). The terminal device may alternatively include a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

By way of example, and not limitation, in embodiments of this application, the terminal device may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on the body or integrated into user's clothes or accessories. The wearable device is not only a hardware device, but also implements a powerful function through software support, data exchange, and cloud interaction. Broadly, wearable intelligent devices include full-featured and large-sized devices that can implement all or some functions without depending on smartphones, for example, smart watches or smart glasses, and include devices that focus only on one type of application functions and need to collaboratively work with other devices such as smartphones, for example, various smart bands, smart helmets, or smart jewelry for monitoring physical signs.

If the various terminal devices described above are located on a vehicle (for example, placed in the vehicle or installed in the vehicle), the terminal devices all may be considered as vehicle-mounted terminal devices. The vehicle-mounted terminal devices are also referred to as, for example, on-board units (OBU).

In embodiments of this application, the terminal device may further include a relay. Alternatively, it can be understood that any device that can perform data communication with a base station may be considered as a terminal device.

(2) Network device: The network device includes, for example, an access network (AN) device such as a base station (for example, an access point), and may be a device that communicates with a wireless terminal device through an air interface by using one or more cells in an access network. Alternatively, the network device is, for example, a road side unit (RSU) in a vehicle-to-everything (V2X) technology. The base station may be configured to perform mutual conversion between a received over-the-air frame and an IP packet, to serve as a router between the terminal device and the remaining part of the access network. The remaining part of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (NodeB, eNB, or e-NodeB, evolved NodeB) in an LTE system or a long term evolution-advanced (LTE-A) system, or may include a next generation NodeB (gNB) in a fifth generation (5G) mobile communications technology NR system (also briefly referred to as an NR system), or may include a centralized unit (CU) and a distributed unit (DU) in a cloud radio access network (Cloud RAN) system. This is not limited in embodiments of this application.

The network device may alternatively include a core network device. The core network device includes, for example, an access and mobility management function (AMF) or a user plane function (UPF). Because embodiments of this application mainly relate to an access network device, the network device below is an access network device unless otherwise specified.

In embodiments of this application, an apparatus configured to implement a function of the network device may be a network device, or may be an apparatus that can support the network device in implementing the function, for example, a chip system. The apparatus may be installed in the network device. In the technical solutions provided in embodiments of this application, an example in which the apparatus configured to implement a function of the network device is a network device is used to describe the technical solutions provided in embodiments of this application.

(3) Multi-radio access technology dual connectivity (multi-RAT dual connectivity, MR-DC): In an LTE system, a terminal device supports access to two network devices. This access manner is referred to as dual connectivity (DC). One network device is a primary network device, and the other network device is a secondary network device. In a development and evolution process of a wireless communications system, an operator deploys both a 5G NR system and an LTE system, and a terminal device also supports access to both an LTE network device and an NR network device. Because LTE is also referred to as evolved universal terrestrial radio access (E-UTRA), this access manner is referred to as EN-DC. In the EN-DC mode, the LTE network device is a primary network device, and the NR network device is a secondary network device. Certainly, with system evolution, new radio evolved universal terrestrial radio access dual connectivity (NR E-UTRA dual connectivity, NE-DC) may also be supported in the future. In other words, the NR network device is a primary network device, and the LTE network device is a secondary network device. Because a terminal device in the EN-DC and a terminal device in the NE-DC each access two network devices using different radio access technologies, these DC modes may also be collectively referred to as MR-DC.

(4) Terms "system" and "network" may be used interchangeably in embodiments of this application. In addition, "at least one" means one or more, and "a plurality of" means two or more. A term "and/or" describes an association relationship between associated objects and represents that three relationships may exist. For example, A and/or B may represent the following three cases: Only A exists, both A and B exist, and only B exists, where A and B may be singular or plural. A character "/" generally indicates an "or" relationship between the associated objects. Moreover, "at least one of the following items (pieces)" or a similar expression thereof means any combination of these items, including a singular item (piece) or any combination of plural items (pieces). For example, at least one item (piece) of a, b, or c may indicate: a, b, c, a and b, a and c, b and c, or a, b, and c, where a, b, and c may be singular or plural.

In addition, unless otherwise specified, in embodiments of this application, ordinal numbers such as "first" and "second" are intended to distinguish between a plurality of objects, but are not intended to limit orders, time sequences, priorities, importance, or the like of the plurality of objects. For example, a first frequency and a second frequency are merely intended to distinguish between different data packets, but do not indicate that the two frequencies are different in size, priority, or importance.

The foregoing describes some noun concepts used in embodiments of this application. The following describes technical features of embodiments of this application.

In an LTE system, when a network is deployed between base stations, time alignment cannot be implemented. After a DC architecture is configured for an LTE base station, an LTE primary base station configures a gap for a terminal device, and the terminal device measures a synchronization signal from an LTE secondary base station in the gap. However, because a time of the LTE primary base station may not be aligned with a time of the LTE secondary base station, the gap configured by the LTE primary base station is not aligned with the time of the LTE secondary base station. In this case, the gap configured by the LTE primary base station cannot fully cover or cannot cover the synchronization signal from the LTE secondary base station. Consequently, a measurement result obtained by the terminal device may be inaccurate, or the terminal device may fail to complete measurement. Therefore, system frame number and subframe timing difference (SFN and subframe timing difference, SSTD) measurement is introduced. A terminal device having an SSTD measurement capability may measure a cell of the LTE secondary base station without configuring a gap, to obtain a time difference between the cell of the LTE secondary base station and a cell of the LTE primary base station. The terminal device sends the time difference to the LTE primary base station, so that the LTE primary base station can configure a gap for the terminal device based on the time difference.

In an NR system, due to network deployment of an EN-DC architecture, a time of an LTE primary base station still cannot be aligned with a time of an NR secondary base station. Because a terminal device measures the secondary base station by using a synchronization/physical broadcast channel block (SSB) that is periodically broadcast by the NR secondary base station, the LTE primary base station currently needs to configure a gap for the terminal device, so that the terminal device receives the SSB from the secondary base station in the gap. However, because the time of the LTE primary base station cannot be aligned with the time of the NR secondary base station, the gap configured by the LTE primary base station may not include the SSB of the NR secondary base station. Consequently, the terminal device cannot receive the SSB from the NR secondary base station in the gap, and cannot complete measurement. For example, as shown in FIG. 1, a measurement period of an inter-RAT system (for example, for the LTE system, the NR system is an inter-RAT system) is, for example, 40 ms, and duration of a gap is 6 ms. However, an SSB of a cell from an NR secondary base station is within remaining 34 ms. Consequently, the gap cannot cover the SSB of the cell of the NR secondary base station, and the terminal device cannot complete measurement.

Currently, to resolve a problem that a primary base station does not know a time difference between an added secondary base station and the primary base station, SFTD measurement is introduced. A difference from SSTD measurement is that a base station may configure a terminal device having an SFTD measurement capability, measure a time difference between the primary base station and a possible secondary base station before the secondary base station is added, and then report the measured time difference to the primary base station, to assist the primary base station in configuring a gap for the terminal device or another terminal device in a cell based on the time difference, so that the configured gap can cover an SSB of the secondary base station as much as possible, to ensure that the terminal device can detect the SSB from the secondary base station in the gap.

It can be learned that, when the terminal device having an SFTD measurement capability measures a time difference of another NR cell when no NR secondary station is configured, the terminal device may not configure a gap, but may directly measure the time difference. However, currently, if the primary base station needs to configure the terminal device to measure signal quality of a cell of a potential secondary base station, for example, when an LTE base station needs to configure the terminal device to measure a cell of an NR base station, the primary base station still configures a gap for the terminal device, and the terminal device performs measurement in the gap. In a time period corresponding to the gap, the terminal device cannot communicate with a serving cell of the terminal device. In other words, the gap configured by the primary base station actually occupies a transmission time between the terminal device and the serving cell of the terminal device. However, it can be learned from the foregoing descriptions that, for the terminal device having an SFTD capability, when measuring another cell, the terminal device can complete measurement without a gap. In this case, the base station configures a gap for such a terminal device. Consequently, transmission resources are wasted.

Some terminal devices each may have two transceiver systems. Therefore, to reduce transmission resources, the network device currently has an optimized implementation, for a terminal device that supports the EN-DC architecture. For example, when a serving cell of the terminal device is an LTE cell, and no NR secondary station is added, if the terminal device needs to measure a corresponding NR cell, when an LTE base station identifies that the terminal device performs only inter-RAT measurement (in other words, does not measure another LTE cell but measures only the NR cell), and a to-be-measured frequency and a frequency of the current serving cell belong to an EN-DC frequency combination supported by the terminal device (in other words, it indicates that the terminal device may support simultaneous sending and receiving on a band on which the LTE serving cell is located and a band on which a to-be-measured NR secondary cell is located), the LTE base station may not configure a gap for the terminal device, and the terminal device may measure the NR cell when there is no gap. Therefore, the terminal device can not only measure the NR cell, but also can communicate with the serving cell. This improves transmission efficiency.

However, an LTE radio frequency capability of the terminal device in the supported EN-DC frequency combination may be less than an LTE radio frequency capability of the terminal device used when the terminal device supports only an LTE system. For example, the terminal device has four receive antennas in total. If the terminal device supports only an LTE band, all the four antennas may be used to receive an LTE signal. However, if the terminal device supports an EN-DC frequency combination, and the terminal device measures an NR cell when there is no gap, only two of the four antennas may be used to receive an LTE signal, and the other two antennas need to be used to receive an NR signal during measurement.

It can be learned that an LTE radio frequency capability of the terminal device may be deteriorated due to a measurement process of the terminal device. If the terminal device does not measure an NR cell to prevent LTE signal receiving from being damaged, the terminal device cannot obtain a measurement result of the NR cell. Alternatively, if the terminal device measures an NR cell when there is no gap and normally receives an LTE signal, because the LTE radio frequency capability of the terminal device is limited when the NR cell is measured, the terminal device can receive the LTE signal only by using a relatively low radio frequency capability. However, because the LTE base station previously configures a relatively high LTE radio frequency capability for the terminal device, the LTE base station still schedules the terminal device by using the relatively high capability. Consequently, a signaling or data bit error may occur.

In view of this, the technical solutions in embodiments of this application are provided. In embodiments of this application, it may be determined whether a first capability of the terminal device is less than or equal to a second capability of the terminal device. A capability of the terminal device includes, for example, a radio frequency capability of the terminal device. For example, it is determined whether an LTE radio frequency capability of the terminal device used when the terminal device supports only an LTE system is less than or equal to an LTE radio frequency capability of the terminal device in an EN-DC frequency combination. If the first capability is less than or equal to the second capability of the terminal device, it indicates that the LTE radio frequency capability of the terminal device in the EN-DC frequency combination is not deteriorated. In this case, no measurement gap may be configured for the terminal device. Therefore, when working at a first frequency, the terminal device can not only measure a second frequency, but also can communicate with the network device at the first frequency. This can improve transmission efficiency. When it is determined that the LTE radio frequency capability is not deteriorated, no measurement gap is configured for the terminal device, so that the terminal device can normally complete measurement, and can find a relatively good EN-DC secondary station. In addition, when the network device is unknown, the terminal device does not need to deteriorate the LTE radio frequency capability either. This reduces a probability that a bit error occurs in an LTE service.

The following describes a network architecture used in embodiments of this application.

Figure 2:
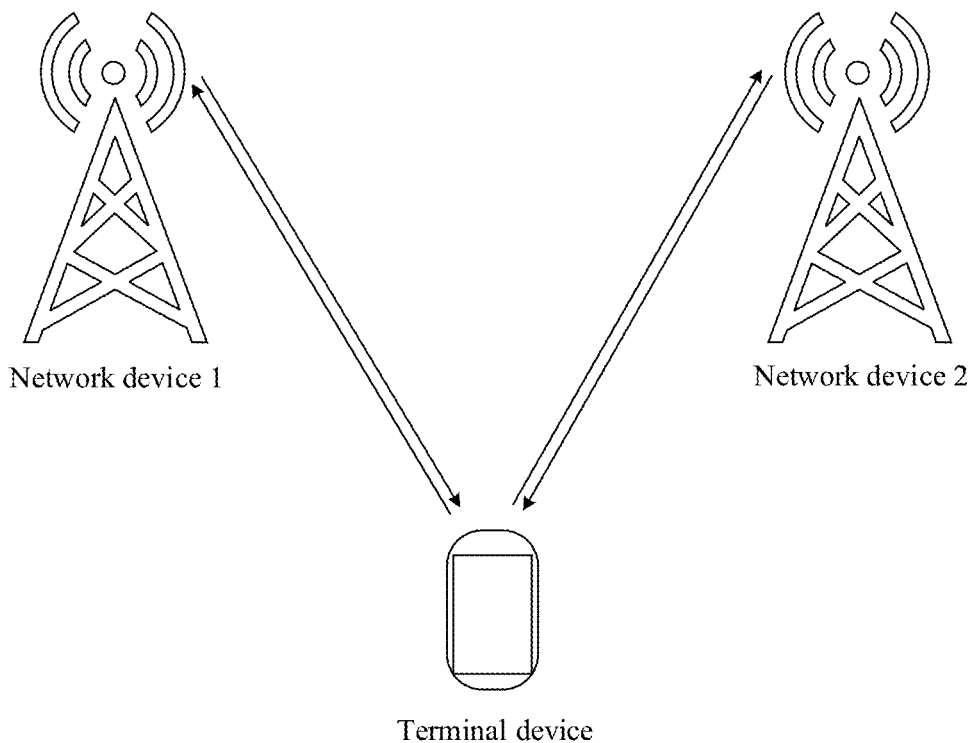
FIG. 2 is a schematic diagram of an application scenario according to an embodiment of this application.

FIG. 2 shows a network architecture used in an embodiment of this application.

In FIG. 2, there are two network devices and one terminal device. There is a dual-connectivity architecture between the two network devices. The network device 1 is, for example, a primary network device, and the network device 2 is, for example, a secondary network device. The terminal device may communicate with the two network devices. Certainly, a quantity of terminal devices in FIG. 2 is merely an example. During actual application, the network device may serve a plurality of terminal devices.

The network device in FIG. 2 is, for example, an access network device, such as a base station. The access network device corresponds to different devices in different systems. For example, the access network device may correspond to an eNB in a 4G system, corresponds to an access network device such as a gNB in 5G in a 5G system, or is an access network device in a subsequently evolved communications system. For example, if FIG. 2 shows an EN-DC architecture, the network device 1 is an LTE network device, and the network device 2 is an NR network device; or if FIG. 2 shows an NE-DC architecture, the network device 1 is an NR network device, and the network device 2 is an LTE network device.

The following describes the technical solutions provided in embodiments of this application with reference to the accompanying drawings.

When the terminal device is just powered on, the terminal device reports a capability of the terminal device to the network device. Alternatively, when the terminal device is handed over to a new cell, the network device requests the terminal device to report a capability of the terminal device. When a user prepares to perform a service by using the terminal device, for example, when the user needs to access a network by using the terminal device, a network device that serves the terminal device (which is considered as a primary network device in this case) may want to add a secondary network device for the terminal device, to form a DC architecture. This increases a throughput and increases a network speed. In the DC architecture, the primary network device configures the terminal device to measure another cell in a gap, and the gap occupies a time of transmission between the terminal device and a serving cell of the terminal device. Alternatively, for example, a serving cell of the terminal device is an LTE cell. If the terminal device needs to measure a corresponding NR cell, when an LTE base station identifies that the terminal device performs only inter-RAT measurement (in other words, does not measure another LTE cell but measures only the NR cell), and a to-be-measured frequency and a frequency of the current serving cell belong to an EN-DC frequency combination supported by the terminal device, the LTE base station may not configure a gap for the terminal device, and the terminal device may measure the NR cell when there is no gap. However, an LTE radio frequency capability of the terminal device in the supported EN-DC frequency combination may be less than an LTE radio frequency capability of the terminal device used when the terminal device supports only an LTE system. In other words, an LTE radio frequency capability of the terminal device is deteriorated due to a measurement process of the terminal device. In this scenario, the solutions provided in embodiments of this application may be used, to reduce a performance loss caused when the LTE radio frequency capability of the terminal device is deteriorated due to measurement.

Figure 3A:
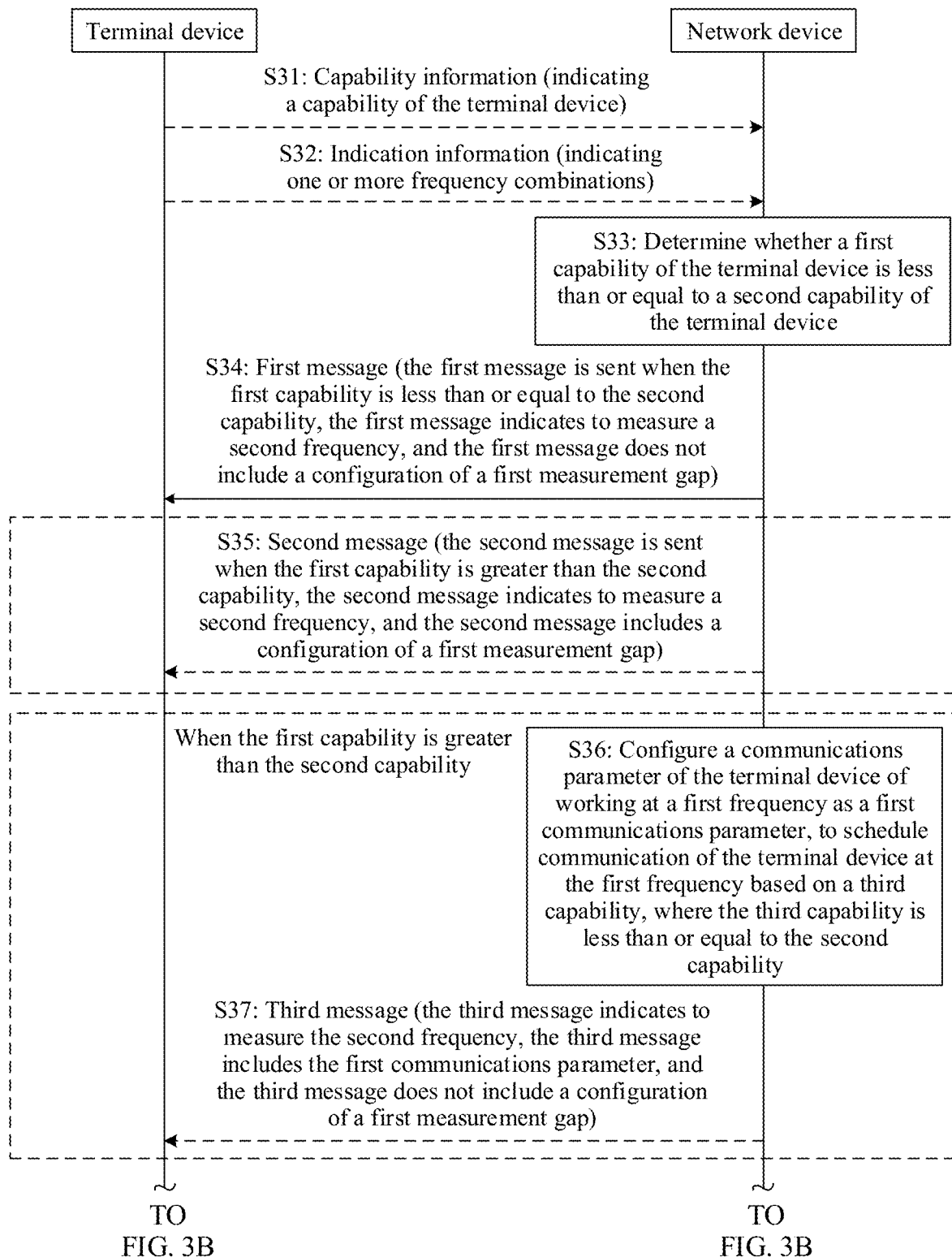

An embodiment of this application provides a first communications method. FIG. 3A and FIG. 3B are a flowchart of the method. In the following description process, an example in which the method is applied to the network architecture shown in FIG. 2 is used.

If this embodiment of this application is applied to the network architecture shown in FIG. 2, a terminal device described below may implement a function of the terminal device in the network architecture shown in FIG. 2, and a network device described below may implement a function of the network device 1 or the network device 2 in the network architecture shown in FIG. 2.

S31: The terminal device sends capability information to the network device, and the network device receives the capability information from the terminal device.

For example, the capability information may be added to a UE capability information message and then sent to the network device. The UE capability information message may be a radio resource control (RRC) message. Alternatively, the capability information may be added to another RRC message and then sent to the network device. Alternatively, the capability information may be added to a message other than an RRC message and then sent to the network device. For example, the capability information may be added to a physical layer message and then sent to the network device. For example, the physical layer message may be added to a physical uplink control channel (PUCCH) or a physical uplink shared channel (PUSCH). Alternatively, the capability information may be added to a media access control (MAC) control element (CE) and then sent to the network device, or the like.

The capability information includes capabilities of the terminal device at different frequencies and in different frequency combinations. For example, the capability information includes a capability of the terminal device at each frequency in a frequency combination corresponding to a first radio access technology, and includes a capability of the terminal device at each frequency in a frequency combination corresponding to the first radio access technology and a second radio access technology. For example, the capability information may indicate a capability of the terminal device of working at each of N frequencies when the terminal device supports only the first radio access technology, and indicate a capability of the terminal device corresponding to a third frequency in each of at least one supported frequency combination, the N frequencies include a first frequency, each frequency combination includes the third frequency and a fourth frequency, and the third frequency corresponds to the first radio access technology. Herein, N is an integer greater than or equal to 1. A capability of the terminal device in this embodiment of this application is, for example, a radio frequency capability of the terminal device. The radio frequency capability of the terminal device includes, for example, one or more of a quantity of multiple-input multiple-output (MIMO) layers, a quantity of sounding reference signal (SRS) ports, or a quantity of antenna ports supported by the terminal device. For example, a first capability of the terminal device described below may include one or more of the quantity of MIMO layers of the terminal device, the quantity of SRS ports of the terminal device, or the quantity of antenna ports supported by the terminal device. Similarly, a second capability of the terminal device may include one or more of the quantity of MIMO layers of the terminal device, the quantity of SRS ports of the terminal device, or the quantity of antenna ports supported by the terminal device.

The terminal device may work in a dual-connectivity architecture. In this case, the terminal device may support the first radio access technology and the second radio access technology. For example, the first radio access technology is an LTE technology, and the second radio access technology is an NR technology; or the first radio access technology is an NR technology, and the second radio access technology is an LTE technology; or the first radio access technology or the second radio access technology may be another technology. For example, the first radio access technology is the LTE technology, and the second radio access technology is the NR technology. For example, if the terminal device works in only an LTE system instead of an NR system, the terminal device may support N frequencies in the LTE system, and the N frequencies may be all or some frequencies supported by the terminal device in the LTE system. When the terminal device works at different frequencies of the N frequencies, capabilities of the terminal device may be the same or may be different. The capability information may indicate capabilities corresponding to the N frequencies, that is, indicate N capabilities of the terminal device corresponding to the N frequencies.

If the terminal device works in both the first radio access technology and the second radio access technology, the terminal device may support M frequency combinations, where M is an integer greater than or equal to 1. Each of the M frequency combinations may include a frequency of the first radio access technology and a frequency of the second radio access technology. For example, each frequency combination includes the third frequency and the fourth frequency. The third frequency is a frequency corresponding to the first radio access technology, and the fourth frequency is a frequency corresponding to the second radio access technology. For example, if the terminal device works in EN-DC, that is, the terminal device works in both an LTE system and an NR system, the terminal device may support M frequency combinations, each of the M frequency combinations may include an LTE frequency and an NR frequency, and the terminal device can normally work in these supported frequency combinations. If the terminal device works in a supported frequency combination, the terminal device has corresponding capabilities for both an LTE frequency and an NR frequency included in the frequency combination. For example, if a frequency combination 1 supported by the terminal device includes an LTE frequency 1 and an NR frequency 1, it indicates that the terminal device can work at both the LTE frequency 1 in the LTE system and the NR frequency 1 in the NR system. In addition, if the terminal device works in the frequency combination 1, the terminal device has a capability 1 for the LTE frequency 1 in the frequency combination 1, and the terminal device has a capability 2 for the NR frequency 1 in the frequency combination 1. The capability information may indicate the capability of the terminal device corresponding to the third frequency in each of the at least one supported frequency combination. For example, if the M frequency combinations are all frequency combinations supported by the terminal device, the at least one frequency combination may include all or some of the M frequency combinations. If the first radio access technology is the LTE technology, and the second radio access technology is the NR technology, the capability information may indicate a capability of the terminal device corresponding to an LTE frequency in each of the at least one supported frequency combination.

For example, the first radio access technology is the LTE technology, and the second radio access technology is the NR technology, which is equivalent to that the capability information includes both a capability of the terminal device of working in only the LTE system and a capability of the terminal device corresponding to the LTE system when the terminal device works in the LTE system and the NR system. Therefore, after receiving the capability information, the network device may determine the capability of the terminal device of working in only the LTE system and the capability of the terminal device corresponding to the LTE system when the terminal device works in the LTE system and the NR system.

S32: The terminal device sends indication information to the network device, and the network device receives the indication information from the terminal device.

For example, the indication information may be added to a UE capability information message and then sent to the network device. Alternatively, the indication information may be added to another RRC message and then sent to the network device. Alternatively, the indication information may be added to a message other than an RRC message and then sent to the network device. For example, the indication information may be added to a physical layer message and then sent to the network device. For example, the physical layer message may be added to a PUCCH or a PUSCH. Alternatively, the indication information may be added to a MAC CE and then sent to the network device, or the like.

The indication information indicates one or more frequency combinations. A capability of the terminal device corresponding to a fifth frequency in each of the one or more frequency combinations is greater than a capability of the terminal device of working at the fifth frequency when the terminal device supports only the first radio access technology, or a capability of the terminal device corresponding to a fifth frequency in each of the one or more frequency combinations is less than or equal to a capability of the terminal device of working at the fifth frequency when the terminal device supports only the first radio access technology. Each frequency combination includes the fifth frequency and a sixth frequency, the fifth frequency corresponds to the first radio access technology, and the sixth frequency corresponds to the second radio access technology. When the terminal device supports only the first radio access technology, the terminal device may work at only the fifth frequency; or may work at a frequency combination including the fifth frequency, and each frequency included in the frequency combination is a frequency corresponding to the first radio access technology. In other words, when the terminal device supports only the first radio access technology, the terminal device may work at only the fifth frequency; or may work at a plurality of frequencies, and the plurality of frequencies include the fifth frequency. Therefore, as described in this embodiment of this application, the capability of the terminal device of working at the fifth frequency when the terminal device supports only the first radio access technology may be a capability of the terminal device of working at only the fifth frequency when the terminal device supports only the first radio access technology, or may be a capability of the terminal device corresponding to the fifth frequency when the terminal device supports only the first radio access technology and works in the frequency combination including the fifth frequency. Understanding of similar content below is also consistent, and therefore details are not described again below.

As described above, if the terminal device works in both the first radio access technology and the second radio access technology, the terminal device may support M frequency combinations. Each of the M frequency combinations may include a frequency of the first radio access technology and a frequency of the second radio access technology. For one frequency combination, when the terminal device works in the frequency combination, the terminal device can determine a capability of the terminal device corresponding to the third frequency included in the frequency combination. If the terminal device does not work in the frequency combination, but works in only the first radio access technology, the terminal device can also determine a capability of the terminal device corresponding to the third frequency. Therefore, in this embodiment of this application, the terminal device may determine one or more frequency combinations from the M frequency combinations. The one or more frequency combinations may include all or some of the M frequency combinations. For ease of distinguishing from another frequency combination in the M frequency combinations, in each of the one or more frequency combinations, a frequency corresponding to the first radio access technology is referred to as the fifth frequency, and a frequency corresponding to the second radio access technology is referred to as the sixth frequency. In other words, each of the one or more frequency combinations includes the fifth frequency and the sixth frequency, the fifth frequency is a frequency corresponding to the first radio access technology, and the sixth frequency is a frequency corresponding to the second radio access technology. The third frequency, the fourth frequency, the fifth frequency, the sixth frequency, and the like are merely general terms. For example, both the third frequency and the fifth frequency generally mean frequencies corresponding to the first radio access technology in a frequency combination, and both the fourth frequency and the sixth frequency generally mean frequencies corresponding to the second radio access technology in a frequency combination.

For example, the capability of the terminal device corresponding to the fifth frequency in each of the one or more frequency combinations is greater than the capability of the terminal device of working at the fifth frequency when the terminal device supports only the first radio access technology; or the capability of the terminal device corresponding to the fifth frequency in each of the one or more frequency combinations is less than or equal to the capability of the terminal device of working at the fifth frequency when the terminal device supports only the first radio access technology; or a capability of the terminal device corresponding to the fifth frequency in each of a part of the one or more frequency combinations is greater than the capability of the terminal device of working at the fifth frequency when the terminal device supports only the first radio access technology, and a capability of the terminal device corresponding to the fifth frequency in each of the remaining part of the one or more frequency combinations is less than or equal to the capability of the terminal device of working at the fifth frequency when the terminal device supports only the first radio access technology.

For example, if the terminal device works in EN-DC, that is, the terminal device works in both an LTE system and an NR system, the terminal device may support M frequency combinations, each frequency combination may include an LTE frequency and an NR frequency, and the terminal device can normally work in these supported frequency combinations. For example, if a frequency combination 1 supported by the terminal device includes an LTE frequency 1 and an NR frequency 1, the terminal device can work at both the LTE frequency 1 in the LTE system and the NR frequency 1 in the NR system. In addition, if the terminal device works in the frequency combination 1, the terminal device has a capability 1 for the LTE frequency 1 in the frequency combination 1, and the terminal device has a capability 2 for the NR frequency 1 in the frequency combination 1. However, if the terminal device works in only the LTE system, the terminal device has a capability 3 when working at the LTE frequency 1.

In this case, the terminal device may determine a value relationship between the capability 1 and the capability 3. When the capability 1 is equal to the capability 3, if the one or more frequency combinations meet a condition that the capability of the terminal device corresponding to the fifth frequency in each of the one or more frequency combinations is less than or equal to the capability of the terminal device of working at the fifth frequency when the terminal device supports only the first radio access technology, the frequency combination 1 may be included in the one or more frequency combinations; or if the one or more frequency combinations meet a condition that the capability of the terminal device corresponding to the fifth frequency in each of the one or more frequency combinations is greater than the capability of the terminal device of working at the fifth frequency when the terminal device supports only the first radio access technology, the frequency combination 1 may be not included in the one or more frequency combinations.

Alternatively, when the capability 1 is greater than the capability 3, if the one or more frequency combinations meet a condition that the capability of the terminal device corresponding to the fifth frequency in each of the one or more frequency combinations is greater than the capability of the terminal device of working at the fifth frequency when the terminal device supports only the first radio access technology, the frequency combination 1 may be included in the one or more frequency combinations; or if the one or more frequency combinations meet a condition that the capability of the terminal device corresponding to the fifth frequency in each of the one or more frequency combinations is less than or equal to the capability of the terminal device of working at the fifth frequency when the terminal device supports only the first radio access technology, the frequency combination 1 may be not included in the one or more frequency combinations.

Alternatively, when the capability 1 is less than the capability 3, if the one or more frequency combinations meet a condition that the capability of the terminal device corresponding to the fifth frequency in each of the one or more frequency combinations is less than or equal to the capability of the terminal device of working at the fifth frequency when the terminal device supports only the first radio access technology, the frequency combination 1 may be included in the one or more frequency combinations; or if the one or more frequency combinations meet a condition that the capability of the terminal device corresponding to the fifth frequency in each of the one or more frequency combinations is greater than the capability of the terminal device of working at the fifth frequency when the terminal device supports only the first radio access technology, the frequency combination 1 may be not included in the one or more frequency combinations.

The capability of the terminal device may be described by using one or more radio frequency features in a quantity of antennas, a quantity of antenna ports, a quantity of MIMO layers, and a quantity of SRS ports. For example, the capability of the terminal device is represented by the quantity of antennas supported by the terminal device. For example, if the capability 1 corresponds to two antennas, and the capability 3 corresponds to three antennas, the capability 1 is less than the capability 3.

The indication information may only need to indicate the one or more frequency combinations, and does not need to indicate a specific capability. For example, if the one or more frequency combinations indicated by the indication information are that the capability of the terminal device corresponding to the fifth frequency in each of the one or more frequency combinations is greater than the capability of the terminal device of working at the fifth frequency when the terminal device supports only the first radio access technology, the indication information only needs to indicate the one or more frequency combinations (for example, indicate identifiers of the one or more frequency combinations), and does not need to indicate a specific capability corresponding to the one or more frequency combinations. The capability information in S31 indicates a specific capability, and it may be considered that the capability information includes the specific capability.

Both S31 and S32 are optional steps, and are not necessarily performed. Therefore, S31 and S32 are represented by dashed lines in FIG. 3A and FIG. 3B. In addition, only one of S31 and S32 may be performed, and not the two steps are performed. If only S31 is performed, the network device can obtain relatively detailed capability information. However, if only S31 is performed, an information amount of the indication information is obviously less than an information amount of the capability information. This helps reduce signaling overheads. Alternatively, both S31 and S32 may be performed. For example, the terminal device may send actual capability information of the terminal device to the network device, and the network device may schedule the terminal device based on the capability information. In addition, the terminal device may further send the indication information to the network device, so that the network device can determine the capability of the terminal device. When determining the capability of the terminal device, the network device does not need to query the capability information of the terminal device. This helps simplify an operation process of the network device. For example, the terminal device may alternatively send the actual capability information and the indication information to the network device by using a same message, and perform indication for each frequency combination, to distinguish between EN-DC frequency combinations in which a capability of an LTE frequency is less than or greater than a capability of independently working at an LTE frequency.

S33: The network device determines whether the first capability of the terminal device is less than or equal to the second capability of the terminal device.

The first capability indicates a capability of the terminal device of working at the first frequency when the terminal device supports only the first radio access technology. The second capability indicates a capability of the terminal device corresponding to the first frequency when the terminal device works in a first frequency combination. The first frequency combination may be one of the M frequency combinations supported by the terminal device. The first frequency combination includes the first frequency and the second frequency, the first frequency corresponds to the first radio access technology, and the second frequency corresponds to the second radio access technology. The first frequency included in the first frequency combination may be the third frequency included in the first frequency combination described above, and the second frequency included in the first frequency combination may be the fourth frequency included in the first frequency combination described above.

For example, if a frequency of a current serving cell of the terminal device is the first frequency, and the network device needs to configure the terminal device to measure the second frequency when the terminal device works at the first frequency, before performing S33, the network device may first determine whether the first frequency combination is a frequency combination supported by the terminal device. The first frequency is a working frequency of the terminal device. In other words, a frequency of a serving cell of the terminal device is the first frequency. For example, if the network device has received the capability information of the terminal device in S31, the network device may determine, based on the capability information, a frequency combination supported by the terminal device, so that the network device can determine whether the first frequency combination is a frequency combination supported by the terminal device. If the first frequency combination is a frequency combination supported by the terminal device, the network device may perform S33. If the first frequency combination is not a frequency combination supported by the terminal device, the network device may not need to perform S33 and a subsequent procedure. For example, the network device may reconfigure a to-be-measured frequency for the terminal device, or the network device may not configure the terminal device to perform measurement, or the network device may configure a gap such as the third gap for the terminal device, so that the terminal device can measure the second frequency at the first frequency by using the third gap. In this embodiment of this application, an example in which the first frequency combination is a frequency combination supported by the terminal device is used.

In an optional implementation, the network device may determine, based on the capability information received in S31, whether the first capability is less than or equal to the second capability. The capability information may indicate the N capabilities of the terminal device of working at the N frequencies when the terminal device supports only the first radio access technology, and indicate the capability of the terminal device corresponding to the third frequency in each of the at least one supported frequency combination. In this case, the capability information can indicate the first capability, and can also indicate the second capability. Therefore, the network device may determine, based on the capability information, whether the first capability is less than or equal to the second capability. For example, if the capability information indicates that the first capability is two antennas and the second capability is four antennas, the network device determines that the first capability is less than the second capability; or if the capability information indicates that the first capability is two antennas and the second capability is two antennas, the network device determines that the first capability is equal to the second capability; or if the capability information indicates that the first capability is two antennas and the second capability is one antenna, the network device determines that the first capability is greater than the second capability. For another example, if the capability information indicates that the first capability is two MIMO layers and the second capability is four MIMO layers, the network device determines that the first capability is less than the second capability; or if the capability information indicates that the first capability is two MIMO layers and the second capability is two MIMO layers, the network device determines that the first capability is equal to the second capability; or if the capability information indicates that the first capability is two MIMO layers and the second capability is one MIMO layer, the network device determines that the first capability is greater than the second capability.

Alternatively, in another optional implementation, the network device may determine, based on the indication information received in S32, whether the first capability is less than or equal to the second capability. The indication information indicates the one or more frequency combinations. For example, the capability of the terminal device corresponding to the fifth frequency in each of the one or more frequency combinations is greater than the capability of the terminal device of working at the fifth frequency when the terminal device supports only the first radio access technology. In this case, the terminal device may determine whether the first frequency combination is included in the one or more frequency combinations. If the one or more frequency combinations include the first frequency combination, the network device may determine that the first capability is less than or equal to the second capability. If the one or more frequency combinations include the first frequency combination, the network device may determine that the first capability is greater than the second capability.

Alternatively, the capability of the terminal device corresponding to the fifth frequency in each of the one or more frequency combinations is less than or equal to the capability of the terminal device of working at the fifth frequency when the terminal device supports only the first radio access technology. In this case, the terminal device may determine whether the first frequency combination is included in the one or more frequency combinations. If the one or more frequency combinations include the first frequency combination, the network device may determine that the first capability is greater than or equal to the second capability. If the one or more frequency combinations include the first frequency combination, the network device may determine that the first capability is less than or equal to the second capability.

Alternatively, the capability of the terminal device corresponding to the fifth frequency in each of the part of the one or more frequency combinations is greater than the capability of the terminal device of working at the fifth frequency when the terminal device supports only the first radio access technology, or the capability of the terminal device corresponding to the fifth frequency in each of the remaining part of the one or more frequency combinations is less than the capability of the terminal device of working at the fifth frequency when the terminal device supports only the first radio access technology. It can be understood that the indication information includes first sub information and second sub information. The first sub information indicates K1 frequency combinations, and a capability of the terminal device corresponding to the fifth frequency in each of the K1 frequency combinations is greater than the capability of the terminal device of working at the fifth frequency when the terminal device supports only the first radio access technology. The second sub information indicates K2 frequency combinations, and a capability of the terminal device corresponding to the fifth frequency in each of the K2 frequency combinations is less than the capability of the terminal device of working at the fifth frequency when the terminal device supports only the first radio access technology. Herein, K1 and K2 each are an integer greater than or equal to 0. In this case, the terminal device may determine whether the first frequency combination is included in the K1 frequency combinations. If the K1 frequency combinations include the first frequency combination, the network device may determine that the first capability is less than or equal to the second capability. If the K1 frequency combinations do not include the first frequency combination, the terminal device may determine whether the first frequency combination is included in the K2 frequency combinations, and if the K2 frequency combinations include the first frequency combination, the network device may determine that the first capability is greater than the second capability.

Alternatively, the network device may determine, by using another manner instead of using the capability information or the indication information, whether the first capability is less than or equal to the second capability. This is not limited in this embodiment of this application.

S34: When the first capability is less than or equal to the second capability, the network device sends a first message to the terminal device, and the terminal device receives the first message from the network device. The first message may indicate to measure the second frequency, and the first message does not include a configuration of a first measurement gap. The first measurement gap is used to measure the second frequency.

The first message is, for example, a physical layer message. For example, the first message may be added to a PUCCH or a PUSCH. Alternatively, the first message may be a MAC CE, an RRC message, or the like.

In this specification, that the terminal device measures the second frequency may mean that the terminal device measures a cell at the second frequency, that is, measures a cell whose frequency is the second frequency. There may be a plurality of cells at the second frequency, and the terminal device may measure some or all of the plurality of cells. The terminal device measures one cell, for example, receives a system message from the cell, and performs measurement based on the system message.

In other words, if the first capability is less than or equal to the second capability, it indicates that the capability of the terminal device corresponding to the first radio access technology when the terminal device works in the first frequency combination is not deteriorated, so that the network device can configure the terminal device to normally measure the second frequency. In this case, the network device does not need to configure a gap for the terminal device, and the terminal device only needs to measure the second frequency when there is no gap. Therefore, when working at the first frequency, the terminal device may measure the second frequency, and may also communicate with the network device at the first frequency. This helps improve transmission efficiency, and can make full use of the capability of the terminal device.

The network device determines the capability of the terminal device based on the capability of the terminal device corresponding to the first frequency and the capability of the terminal device corresponding to the first frequency in the first frequency combination. Therefore, in this embodiment of this application, when measuring the second frequency based on an indication of the network device, the terminal device needs to work at the first frequency. Otherwise, if the terminal device works at another frequency to measure the second frequency, a determining condition of the network device is already inapplicable, and a measurement problem may occur. For example, the terminal device measures the second frequency when working at the third frequency, a frequency combination including the third frequency and the second frequency is a frequency combination supported by the terminal device, and the third frequency corresponds to the first radio access technology. A capability of the terminal device corresponding to the third frequency in the frequency combination may be less than a capability of the terminal device of working at the third frequency when the terminal device supports only the first radio access technology. In this case, the terminal device may not start measurement to ensure current LTE service quality. Consequently, the terminal device cannot measure an NR band, and cannot find a good EN-DC secondary station. Alternatively, the terminal device starts measurement. When a base station is unknown, the terminal device deteriorates the LTE radio frequency capability. Consequently, a bit error may occur in an LTE service, or the like.

When S34 is performed, the terminal device may work at the first frequency, or may not work at the first frequency. If the terminal device does not work at the first frequency when S34 is performed, the terminal device needs to measure the second frequency after working at the first frequency. If the terminal device already works at the first frequency when 5334 is performed, the terminal device may measure the second frequency as required.

S35: When the first capability is greater than the second capability, the network device sends a second message to the terminal device, and the terminal device receives the second message from the network device. The second message may indicate to measure the second frequency, and the second message includes a configuration of a first measurement gap. Similarly, if the terminal device needs to measure the second frequency, the terminal device also needs to work at the first frequency.

The second message is, for example, a physical layer message. For example, the second message may be added to a PUCCH or a PUSCH. Alternatively, the second message may be a MAC CE, an RRC message, or the like.

S35 and S34 are parallel steps, that is, only one of S34 and S35 is performed, and not the two steps are performed. S35 is an optional step, and is not necessarily performed. Therefore, S35 is represented by dashed lines in FIG. 3A and FIG. 3B.

If the first capability is greater than the second capability, and if the terminal device measures the second frequency without a gap when working at the first frequency, a capability of the terminal device corresponding to the first radio access technology is deteriorated. In this case, a method may be used in this embodiment of this application. To be specific, the terminal device may continue to be configured to measure the second frequency when working at the first frequency, but a first gap is configured for the terminal device, and the terminal device may measure the second frequency in the first gap when working at the first frequency. In this way, when working at the first frequency, the terminal device does not simultaneously measure the second frequency and communicate with the network device at the first frequency. Beyond the first gap, the terminal device may communicate with a device such as the network device or the like at the first frequency by using the first capability, so that communication performance of the terminal device corresponding to the first radio access technology is not deteriorated. In the first gap, the terminal device may measure the second frequency. In this manner, a measurement requirement of the terminal device can be met, and the capability of the terminal device corresponding to the first radio access technology is not deteriorated.

Figure 4:
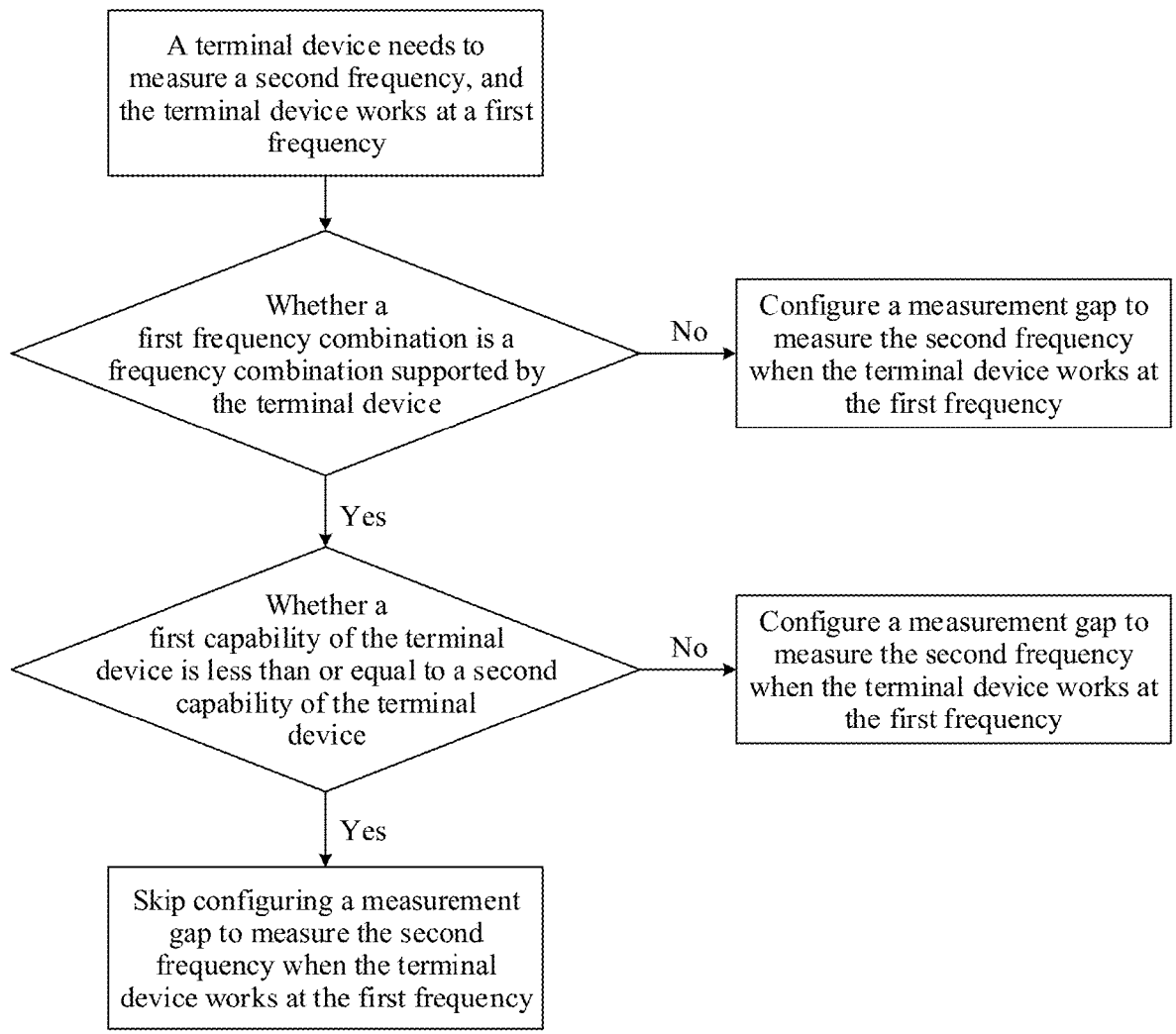

For ease of understanding, refer to FIG. 4 that is a flowchart including S33 to S35, a step before S33, and some other steps. In FIG. 4, if the network device determines that the first frequency combination is not a frequency combination supported by the terminal device, an example in which the network device configures the third gap for the terminal device to measure the second frequency is used.

S36: When the first capability is greater than the second capability, the network device configures a communications parameter of the terminal device of working at the first frequency as a first communications parameter, to schedule communication of the terminal device at the first frequency based on a third capability, where the third capability is less than or equal to the second capability.

If the first capability is greater than the second capability, and if the terminal device measures the second frequency without a gap when working at the first frequency, a capability of the terminal device corresponding to the first radio access technology is deteriorated. In this case, another method different from S35 may be used in this embodiment of this application. For example, the network device configures a communications parameter of working at the first frequency as the first communications parameter for the terminal device. The first communications parameter corresponds to the third capability of the terminal device. In other words, if the first communications parameter is configured for the terminal device, the terminal device works with the third capability. In other words, the first communications parameter is a communications parameter used to configure a capability of the terminal device as the third capability. Therefore, after the network device configures the first communications parameter, the network device may schedule communication of the terminal device at the first frequency based on the third capability, the terminal device also communicates with the network device at the first frequency based on the third capability, and the third capability is less than or equal to the second capability. In this case, the capability of the terminal device is the third capability configured by the network device for the terminal device. Therefore, the third capability is known to the network device. The network device also schedules communication of the terminal device at the first frequency based on the third capability, so that scheduling of the network device matches an actual capability of the terminal device, and the terminal device can normally communicate with the network device at the first frequency based on the third capability. This reduces a bit error probability, and increases a transmission success rate.

For example, the first radio access technology is the LTE technology, the second radio access technology is the NR technology, the first capability is four antennas, and the second capability is two antennas. In this case, the network device may configure the communications parameter of the terminal device of working at the first frequency as the first communications parameter, and a capability of the terminal device of meeting the first communications parameter is, for example, referred to as the third capability, so that the third capability is less than or equal to the second capability. For example, the network device may configure the first communications parameter as using two antennas or using one antenna, that is, the third capability of meeting the first communications parameter is two antennas or one antenna. However, to improve LTE communications quality, the network device may configure the first communications parameter as large as possible on the premise that the third capability is less than or equal to the second capability. In this way, the corresponding third capability may be higher, to improve communications quality. For example, if the network device can configure the third capability corresponding to the first communications parameter as two antennas or one antenna, the network device may configure the third capability corresponding to the first communications parameter as two antennas.

S37: The network device sends a third message to the terminal device, and the terminal device receives the third message from the network device. The third message may indicate the terminal device to measure the second frequency, and the third message does not include a configuration of a first measurement gap. The first measurement gap is used to measure the second frequency. Similarly, if the terminal device needs to measure the second frequency, the terminal device also needs to work at the first frequency.

The third message is, for example, a physical layer message. For example, the third message may be added to a PUCCH or a PUSCH. Alternatively, the third message may be a MAC CE, an RRC message, or the like.

Optionally, the third message may further include the first communications parameter, or the third message may indicate the third capability. Therefore, after receiving the third message, the terminal device can also learn that the configured capability of working at the first frequency is the third capability, so that the terminal device can perform communication at the first frequency based on the third capability. In FIG. 3A and FIG. 3B, an example in which the third message includes the first communications parameter is used.

S34, S35, and S36 and S37 are parallel steps, that is, only one of S34, S35, and S36 and S37 is performed, and not all the steps are performed. S36 and S37 are optional steps, and are not necessarily performed. Therefore, S36 and S37 are represented by dashed lines in FIG. 3A and FIG. 3B.

Alternatively, S34 and S37 may be considered as a same step, and the third message and the first message may be a same message.

In other words, if the third capability is less than or equal to the second capability, it indicates that the capability of the terminal device corresponding to the first radio access technology when the terminal device works in the first frequency combination is not deteriorated, so that the network device can configure the terminal device to normally measure the second frequency. In this case, the network device does not need to configure a gap for the terminal device, and the terminal device only needs to measure the second frequency when there is no gap. Therefore, when working at the first frequency, the terminal device may measure the second frequency, and may also communicate with the network device at the first frequency. This helps improve transmission efficiency, and can make full use of the capability of the terminal device.

For example, the first radio access technology is the LTE technology, the second radio access technology is the NR technology, the third capability is two antennas, and the second capability is two antennas. In this case, when working at the first frequency, the terminal device may communicate with the network device at the first frequency by using two antennas, and may also measure the second frequency by using the other two antennas.

Figure 5:
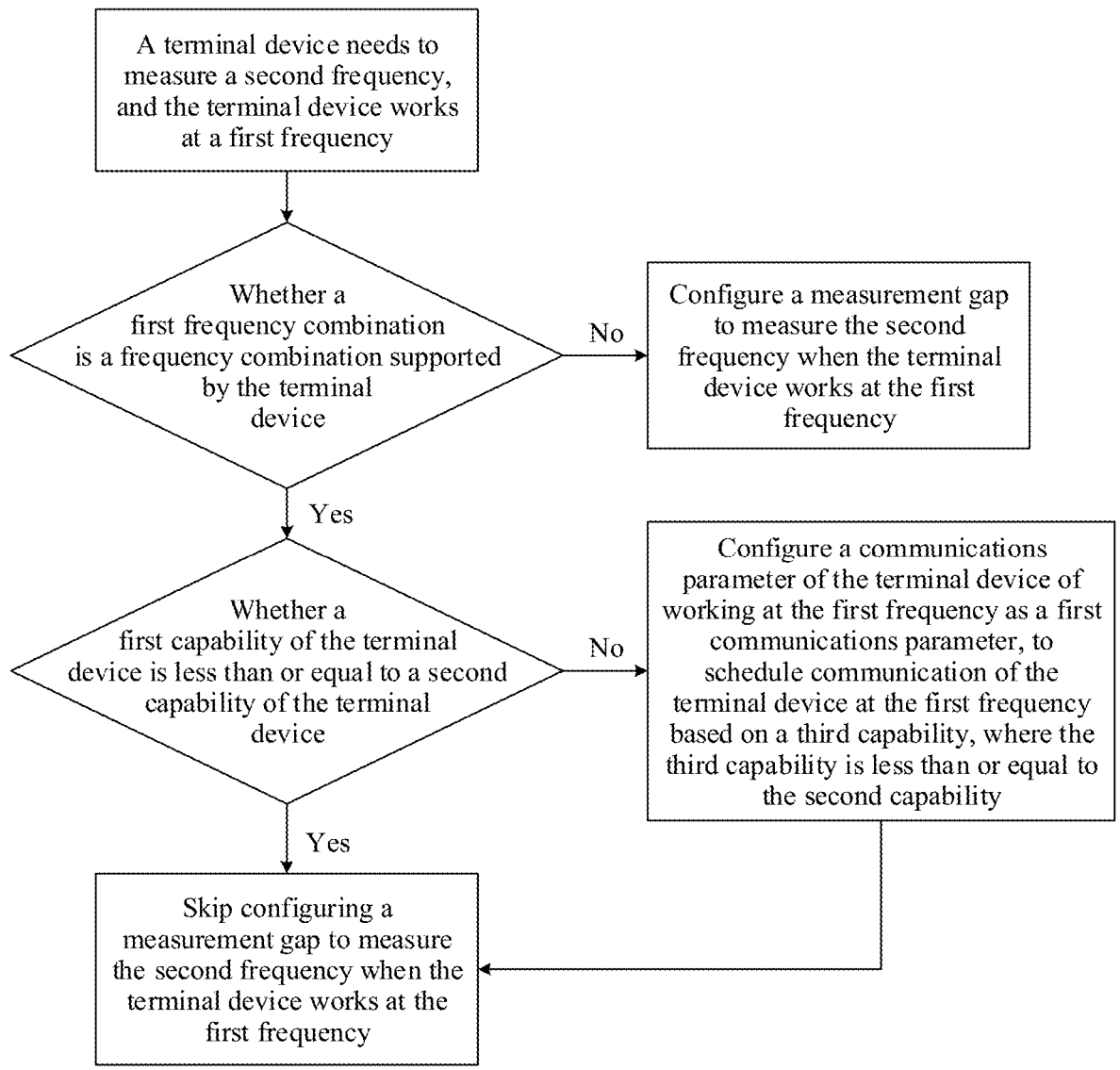

For ease of understanding, refer to FIG. 5 that is a flowchart including S33 and S34, S36 and S37, a step before S33, and some other steps. In FIG. 5, if the network device determines that the first frequency combination is not a frequency combination supported by the terminal device, an example in which the network device configures the third gap for the terminal device to measure the second frequency is used, and an example in which S34 and S37 are a same step is used in FIG. 5.

S38: When the first capability is greater than the second capability, the network device determines a second communications parameter of the terminal device of working at the first frequency, to schedule communication of the terminal device at the first frequency based on the second capability.

If the first capability is greater than the second capability, and if the terminal device measures the second frequency without a gap when working at the first frequency, a capability of the terminal device corresponding to the first radio access technology is deteriorated. In this case, another method different from S35 may be used in this embodiment of this application. For example, the network device configures a communications parameter of the terminal device of working at the first frequency as the second communications parameter. The second communications parameter corresponds to the second capability of the terminal device. In other words, if the second communications parameter is configured for the terminal device, the terminal device works with the second capability. In other words, the second communications parameter is a communications parameter used to configure a capability of the terminal device as the second capability. In this case, both the network device and the terminal device determine that the capability of the terminal device corresponding to the first frequency in the first frequency combination is the second capability. Therefore, the network device does not need to configure the second communications parameter for the terminal device, but only needs to schedule communication of the terminal device at the first frequency based on the second capability.

S39: The network device sends a fourth message to the terminal device, and the terminal device receives the fourth message from the network device.

The fourth message is, for example, a physical layer message. For example, the fourth message may be added to a PUCCH or a PUSCH. Alternatively, the fourth message may be a MAC CE, an RRC message, or the like.

The fourth message may indicate the terminal device to measure the second frequency, and the fourth message does not include a configuration of a first measurement gap. The first measurement gap is used to measure the second frequency. Similarly, if the terminal device needs to measure the second frequency, the terminal device also needs to work at the first frequency.

The network device schedules communication of the terminal device at the first frequency based on the second capability, and the terminal device also communicates with the network device at the first frequency based on the second capability. It is equivalent to that, it may be agreed in advance that, if the first capability is greater than the second capability, the network device schedules communication of the terminal device at the first frequency based on the second capability, and the terminal device also communicates with the network device at the first frequency based on the second capability. In this manner, the network device does not need to configure the capability of working at the first frequency for the terminal device, that is, does not need to configure the second communications parameter corresponding to the first frequency for the terminal device, so that operations of the network device are reduced, and the network device does not need to send the second communications parameter to the terminal device, thereby reducing signaling overheads. Both the network device and the terminal device can determine that the terminal device works at the first frequency based on the second capability, so that scheduling of the network device matches an actual capability of the terminal device, and the terminal device can normally communicate with the network device at the first frequency based on the second capability. This reduces a bit error probability, and increases a transmission success rate.

S34, S35, S36 and S37, and S38 and S39 are parallel steps, that is, only one of S34, S35, S36 and S37, and S38 and S39 is performed, and not all the steps are performed. S38 and S39 are optional steps, and are not necessarily performed. Therefore, S38 and S39 are represented by dashed lines in FIG. 3A and FIG. 3B. Alternatively, S34 and S39 may be considered as a same step, and the third message and the fourth message may be a same message.

S40: When the first capability is greater than the second capability, the network device configures a third communications parameter of the terminal device of working at the first frequency in a second measurement gap, to schedule communication of the terminal device at the first frequency in the second measurement gap based on a fourth capability, where the fourth capability is less than or equal to the first capability, and the second measurement gap is used to measure the second frequency.

If the first capability is greater than the second capability, and if the terminal device measures the second frequency without a gap when working at the first frequency, a capability of the terminal device corresponding to the first radio access technology is deteriorated. In this case, still another method may be used in this embodiment of this application. For example, the network device determines a communications parameter of the terminal device of working at the first frequency in the second gap as the third communications parameter. The third communications parameter corresponds to the fourth capability of the terminal device. In other words, if the third communications parameter is configured for the terminal device, the terminal device works with the fourth capability. In other words, the third communications parameter is a communications parameter used to configure a capability of the terminal device as the fourth capability. The fourth capability is less than or equal to the first capability.

After the network device configures the second communications parameter, the network device may schedule communication of the terminal device at the first frequency in the second gap based on the fourth capability, the terminal device also communicates with the network device at the first frequency in the second gap based on the fourth capability, and the fourth capability is less than or equal to the first capability. In this case, the capability of the terminal device is the fourth capability configured by the network device for the terminal device. Therefore, the fourth capability is known to the network device. The network device also schedules communication of the terminal device at the first frequency in the second gap based on the fourth capability, so that scheduling of the network device matches an actual capability of the terminal device, and the terminal device can normally communicate with the network device at the first frequency in the second gap based on the fourth capability. This reduces a bit error probability, and increases a transmission success rate.

S41: The network device sends a fifth message to the terminal device, and the terminal device receives the fifth message from the network device. The fifth message may indicate to measure the second frequency. Similarly, if the terminal device needs to measure the second frequency, the terminal device also needs to work at the first frequency. In addition, the fifth message further includes a configuration of the second gap, and the second gap is used to measure the second frequency.

The fifth message is, for example, a physical layer message. For example, the fifth message may be added to a PUCCH or a PUSCH. Alternatively, the fifth message may be a MAC CE, an RRC message, or the like.

When measuring the second frequency in the second gap, the terminal device can perform communication at the first frequency based on the fourth capability.

Optionally, the fifth message may further include the third communications parameter, or the fifth message may indicate the fourth capability. Therefore, after receiving the fifth message, the terminal device can also learn that the configured capability of working at the first frequency in the second gap is the fourth capability, so that the terminal device can perform communication at the first frequency in the second gap based on the fourth capability.

S34, S35, S36 and S37, S38 and S39, and S40 and S41 are parallel steps, that is, only one of S34, S35, S36 and S37, S38 and S39, and S40 and S41 is performed, and not all the steps are performed. S40 and S41 are optional steps, and are not necessarily performed. Therefore, S40 and S41 are represented by dashed lines in FIG. 3A and FIG. 3B.

In addition, beyond the second gap, the network device may continue to schedule communication at the first frequency for the terminal device based on the first capability. For the terminal device, when the terminal device works at the first frequency, the capability of the terminal device corresponding to the first frequency is still the first capability beyond the second gap. In this way, when the terminal device does not measure the second frequency, the terminal device may still communicate with the network device at the first frequency based on the first capability. This can increase capability utilization of the terminal device, and can also improve communications quality.

According to an existing solution, the network device configures the third gap for the terminal device, and the terminal device measures the second frequency at the first frequency by using the third gap. In this case, the terminal device cannot communicate with the network device at the first frequency in the third gap. However, in this embodiment of this application, the network device configures the second gap for the terminal device. In the second gap, in addition to measuring the second frequency, the terminal device may still communicate with the network device at the first frequency based on the fourth capability. The terminal device can communicate with the network device at the first frequency based on the first capability beyond the second gap. In this way, for example, the terminal device supports four antennas in total, the first capability of the terminal device is four antennas, and the fourth capability is two antennas. If the network device configures the third gap for the terminal device according to the existing solution, in the third gap, the terminal device can measure only the second frequency, but cannot communicate with the network device at the first frequency. However, actually, when the terminal device measures the second frequency, there are still two antennas that can be used to communicate with the network device at the first frequency. Consequently, communications resources are wasted. However, in this embodiment of this application, the network device configures the second gap for the terminal device. In the second gap, the terminal device may measure the second frequency by using two antennas, and may continue to communicate with the network device at the first frequency by using the remaining two antennas. In addition, beyond the second gap, the terminal device may continue to communicate with the network device at the first frequency by using four antennas. This manner can increase capability utilization of the terminal device to a relatively large extent, and reduce a capability waste of the terminal device.

S42: When the first capability is greater than the second capability, the network device determines a fourth communications parameter of the terminal device of working at the first frequency in a second measurement gap, to schedule communication of the terminal device at the first frequency in the second measurement gap based on the second capability. The second measurement gap is used to measure the second frequency.

If the first capability is greater than the second capability, and if the terminal device measures the second frequency without a gap when working at the first frequency, a capability of the terminal device corresponding to the first radio access technology is deteriorated. In this case, yet another method may be used in this embodiment of this application. For example, the network device determines a communications parameter of the terminal device of working at the first frequency in the second gap as the fourth communications parameter. The fourth communications parameter corresponds to the second capability of the terminal device. In other words, if the fourth communications parameter is configured for the terminal device, the terminal device works with the second capability. In other words, the fourth communications parameter is a communications parameter used to configure a capability of the terminal device as the second capability. In this case, both the network device and the terminal device determine that the capability of the terminal device corresponding to the first frequency in the first frequency combination is the second capability. Therefore, the network device does not need to configure the fourth communications parameter for the terminal device, but only needs to schedule communication of the terminal device at the first frequency based on the second capability.

The fourth communications parameter is used to configure the capability of the terminal device as the second capability, and the foregoing second communications parameter is also used to configure the capability of the terminal device as the second capability. Therefore, the fourth communications parameter and the second communications parameter may be a same communications parameter, or may be different communications parameters.

S43: The network device sends a sixth message to the terminal device, and the terminal device receives the sixth message from the network device. The sixth message may indicate to measure the second frequency. Similarly, if the terminal device needs to measure the second frequency, the terminal device also needs to work at the first frequency. In addition, the sixth message further includes a configuration of the second gap, and the second gap is used to measure the second frequency.

The sixth message is, for example, a physical layer message. For example, the sixth message may be added to a PUCCH or a PUSCH. Alternatively, the sixth message may be a MAC CE, an RRC message, or the like.

When measuring the second frequency in the second gap, the terminal device can perform communication at the first frequency based on the second capability.

In this manner, the network device does not need to configure the capability of working at the first frequency for the terminal device, that is, does not need to configure the fourth communications parameter corresponding to the first frequency for the terminal device, so that operations of the network device are reduced, and the network device does not need to send the fourth communications parameter to the terminal device, thereby reducing signaling overheads. Both the network device and the terminal device can determine that the terminal device works at the first frequency in the second gap based on the second capability, so that scheduling of the network device matches an actual capability of the terminal device, and the terminal device can normally communicate with the network device at the first frequency based on the second capability. This reduces a bit error probability, and increases a transmission success rate.

S34, S35, S36 and S37, S38 and S39, S40 and S41, and S42 and S43 are parallel steps, that is, only one of S34, S35, S36 and S37, S38 and S39, S40 and S41, and S42 and S43 is performed, and not all the steps are performed. S42 and S43 are optional steps, and are not necessarily performed. Therefore, S42 and S43 are represented by dashed lines in FIG. 3A and FIG. 3B.

In addition, beyond the second gap, the network device may continue to schedule communication at the first frequency for the terminal device based on the first capability. For the terminal device, the capability of the terminal device corresponding to the first frequency is still the first capability beyond the second gap. In this way, when the terminal device does not measure the second frequency, the terminal device may still communicate with the network device at the first frequency based on the first capability. This can increase capability utilization of the terminal device, and can also improve communications quality.

Figure 6:
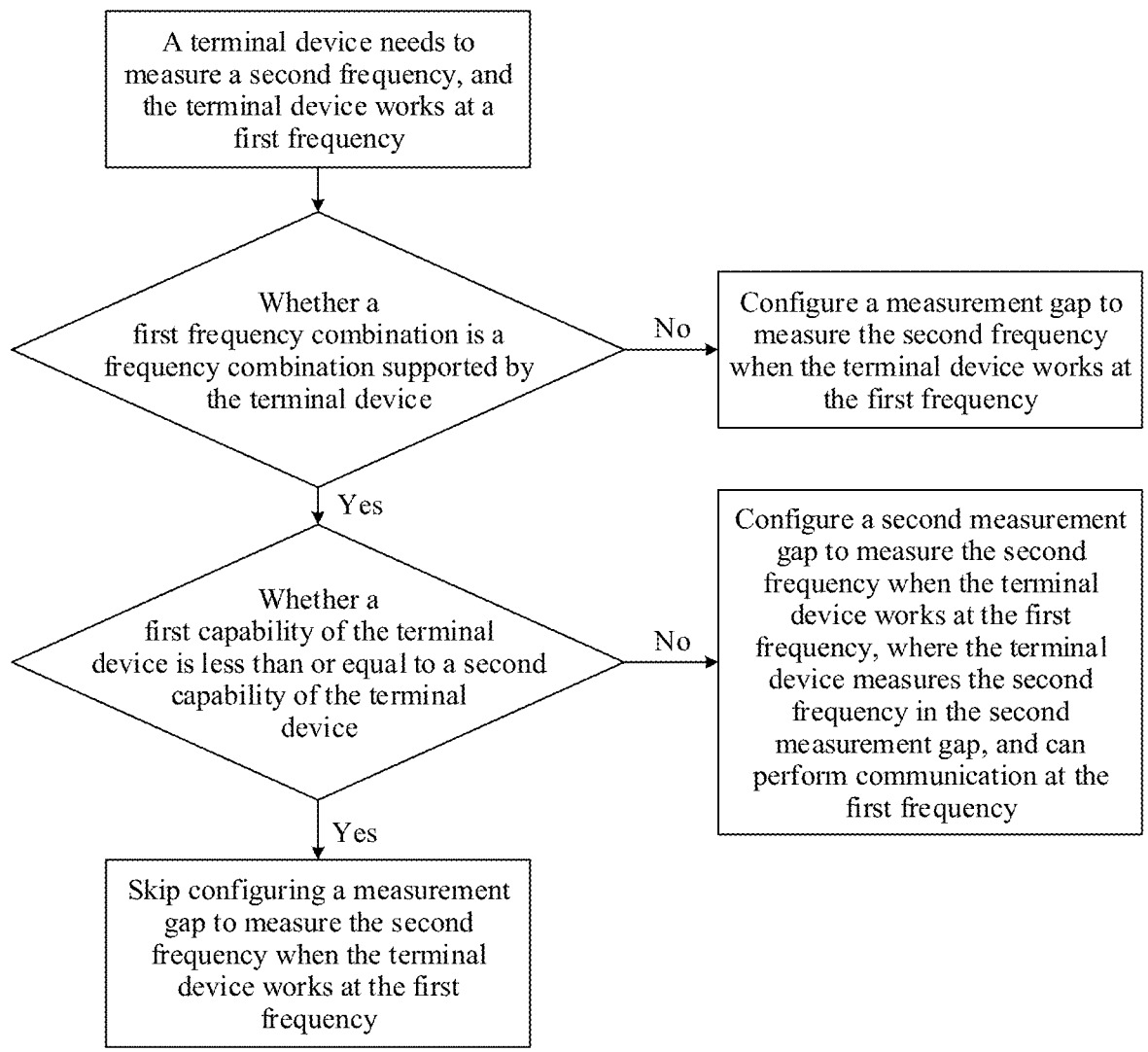

For ease of understanding, refer to FIG. 6 that is a flowchart including S33 and S34, S38, a step before S33, and some other steps. In FIG. 6, if the network device determines that the first frequency combination is not a frequency combination supported by the terminal device, an example in which the network device configures the third gap for the terminal device to measure the second frequency is used. In addition, an example in which the network device schedules communication at the first frequency for the terminal device in the second gap based on the fourth capability is used.

The foregoing describes a case in which no carrier aggregation (CA) is configured for the terminal device. If no CA is configured for the terminal device, there is only one serving cell of the terminal device, for example, there is only the first frequency. In this case, the terminal device only needs to determine whether a frequency combination including the first frequency and the second frequency is a frequency combination supported by the terminal device. In addition, in this embodiment of this application, an example in which the first frequency combination is a frequency combination supported by the terminal device is used. In this case, S33 and S34 are performed, or S33 and S35 are performed, or S33, S36, and S37 are performed, or S33, S38, and S39 are performed, or S33, S40, and S41 are performed, or S33, S42, and S43 are performed. If CA is configured for the terminal device, there may be a plurality of serving cells of the terminal device. For example, the serving cells of the terminal device include a primary cell and a secondary cell, and there may be one primary cell and one or more secondary cells. In this case, for the terminal device, if a quantity of activated-state serving cells is greater than or equal to 2, the network device initially determines one or more frequencies in addition to the first frequency and the second frequency, and the one or more frequencies all correspond to the first radio access technology. For example, if the terminal device has one secondary cell, and the secondary cell is in an activated state for the terminal device, the network device may determine the first frequency, the second frequency, and the third frequency, where the third frequency is a frequency corresponding to the secondary cell of the terminal device, and the third frequency corresponds to the first radio access technology; or if the terminal device has two secondary cells, and the two secondary cells each are in an activated state for the terminal device, the network device may determine the first frequency, the second frequency, the third frequency, and the fourth frequency, where the third frequency is a frequency corresponding to one secondary cell of the terminal device, the fourth frequency is a frequency corresponding to the other secondary cell of the terminal device, and both the third frequency and the fourth frequency correspond to the first radio access technology; and so on. Certainly, if CA is configured for the terminal device, but none of secondary cells of the terminal device is activated for the terminal device, the network device determines that the first frequency combination does not include another frequency, and performs S33 and S34, or performs S33 and S35, or performs S33, S36, and S37, or performs S33, S38, and S39, or performs S33, S40, and S41, or performs S33, S42, and S43. Herein, a case in which the secondary cell of the terminal device is in an activated is mainly discussed. For example, the terminal device has one secondary cell, the secondary cell is in an activated state for the terminal device, and a frequency of the secondary cell is the third frequency. In this case, if the network device determines that the terminal device is in an activated state at the first frequency and the third frequency, the network device may determine whether the frequency combination including the first frequency, the second frequency, and the third frequency is a frequency combination supported by the terminal device. If the frequency combination supported by the terminal device does not include the frequency combination including the first frequency, the second frequency, and the third frequency, the network device may deactivate the third frequency to obtain the first frequency combination including the first frequency and the second frequency. Certainly, the network device may continue to determine whether the first frequency combination is a frequency combination supported by the terminal device. In this embodiment of this application, an example in which the first frequency combination is a frequency combination supported by the terminal device is used.

If the secondary cell of the terminal device is in an activated state, a frequency determined by the network device may also be considered as a frequency combination, for example, a second frequency combination. For ease of description, the second frequency combination is described below. For example, the second frequency combination includes the first frequency, the second frequency, and the third frequency, or includes the first frequency, the second frequency, the third frequency, and the fourth frequency. However, it should be noted that the second frequency combination may be an actually existing frequency combination, that is, the network device determines a frequency combination. Alternatively, the second frequency combination may not exist, that is, the network device only determines frequencies, and these frequencies do not form a frequency combination. If the second frequency combination does not exist, the second frequency combination described below may be understood as frequencies determined by the network device.

The network device may first determine whether the second frequency combination is a frequency combination supported by the terminal device. If the second frequency combination is a frequency combination supported by the terminal device, the network device may continue to perform S33. If the second frequency combination is not a frequency combination supported by the terminal device, the network device may not need to perform S33 and a subsequent procedure. For example, the network device may reconfigure a to-be-measured frequency for the terminal device, or the network device may not configure the terminal device to perform measurement, or the network device may configure a gap such as the third gap for the terminal device, so that the terminal device can measure the second frequency in the third gap when working at the first frequency. Alternatively, the network device may deactivate the frequency corresponding to the secondary cell of the terminal device from the second frequency combination, and then determine whether a combination of the remaining frequencies included in the second frequency combination is a frequency combination supported by the terminal device; and so on. The following describes this method by using an example.

Figure 7A:
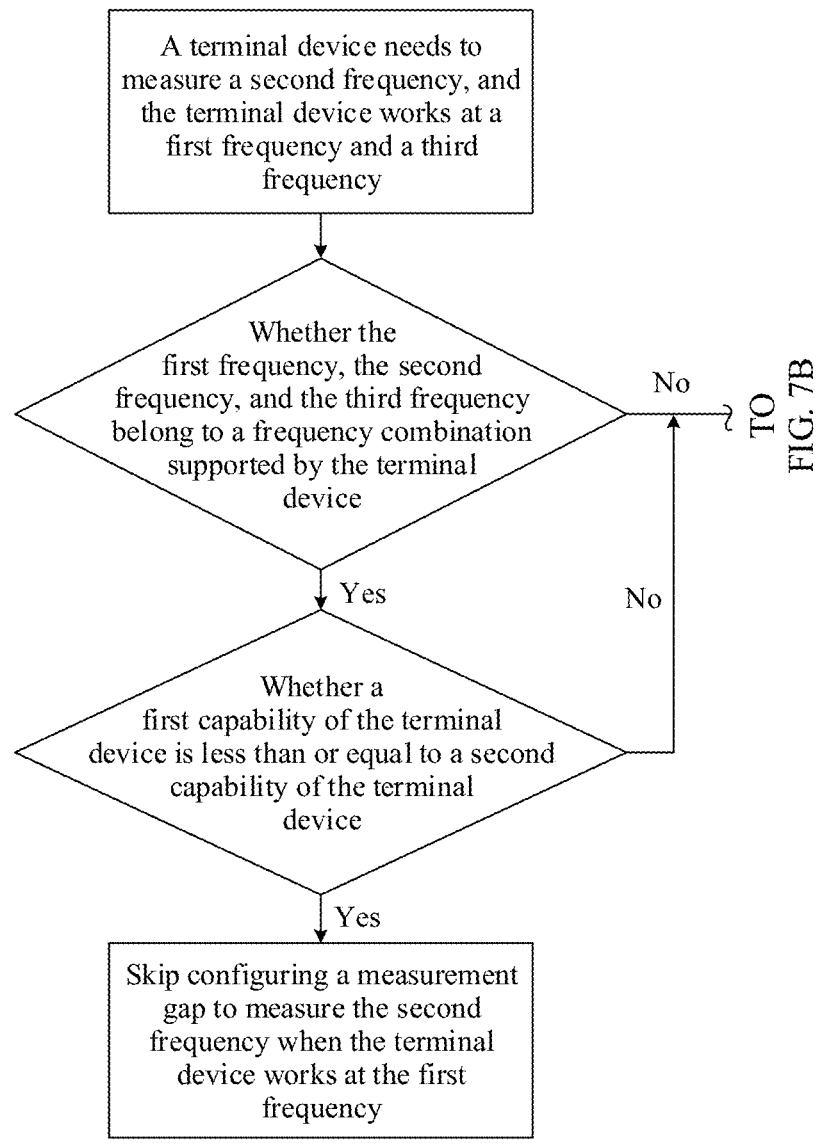
Figure 7B:
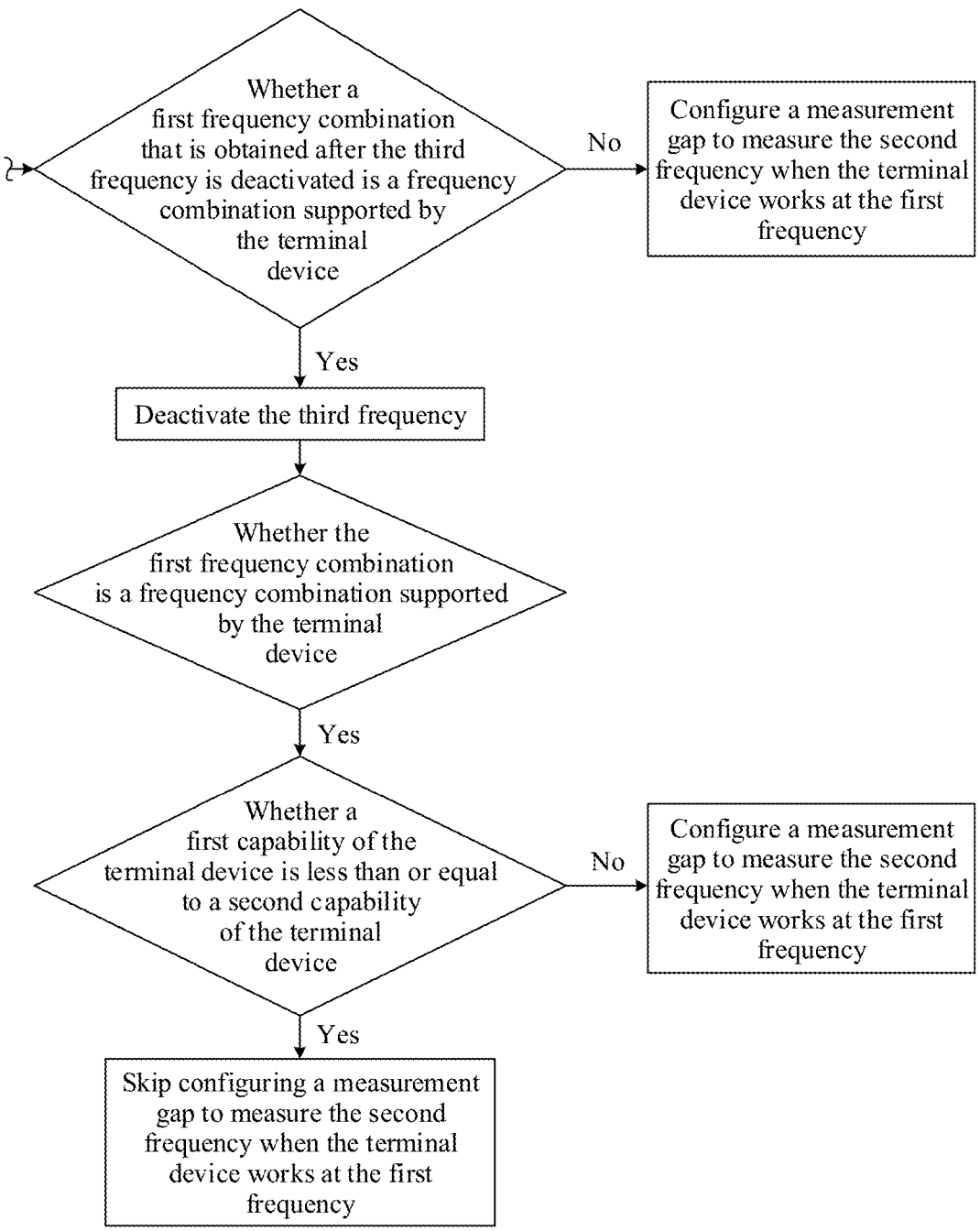

For example, the second frequency combination includes the first frequency, the second frequency, and the third frequency. In this case, the network device may first determine whether the second frequency combination is a frequency combination supported by the terminal device. If the second frequency combination is a frequency combination supported by the terminal device, the network device may perform S33. After performing S33, if the first capability is greater than the second capability, the network device may determine whether a combination that is of the remaining frequencies in the second frequency combination and that is obtained if a frequency corresponding to a secondary cell of the terminal device is deactivated from the second frequency combination is a frequency combination supported by the terminal device. For example, the network device may determine whether the first frequency combination that is obtained if the third frequency is deactivated is a frequency combination supported by the terminal device. If the first frequency combination is a frequency combination supported by the terminal device, the network device may deactivate the third frequency, and then perform S33. Alternatively, if the second frequency combination is not a frequency combination supported by the terminal device, the network device may determine whether a combination that is of the remaining frequencies in the second frequency combination and that is obtained if a frequency corresponding to a secondary cell of the terminal device is deactivated from the second frequency combination is a frequency combination supported by the terminal device. For example, the network device may determine whether the first frequency combination that is obtained if the third frequency is deactivated is a frequency combination supported by the terminal device. If the first frequency combination is a frequency combination supported by the terminal device, the network device may deactivate the third frequency, and perform S33. After performing S33, if the first capability is less than or equal to the second capability, the network device does not need to configure a gap to measure the second frequency when the terminal device works at the first frequency; or if the first capability is greater than the second capability, the network device may reconfigure a to-be-measured frequency for the terminal device, or the network device may not configure the terminal device to perform measurement, or the network device may configure a gap such as the third gap for the terminal device, so that the terminal device can measure the second frequency in the third gap when working at the first frequency, or the like. Alternatively, if the first frequency combination is not a frequency combination supported by the terminal device, the network device may not need to deactivate the third frequency, and may not need to perform S33 and a subsequent procedure either. For example, the network device may reconfigure a to-be-measured frequency for the terminal device, or the network device may not configure the terminal device to perform measurement, or the network device may configure a gap such as the third gap for the terminal device, so that the terminal device can measure the second frequency in the third gap when working at the first frequency. Certainly, in this embodiment of this application, an example in which the first frequency combination is a frequency combination supported by the terminal device is used. For example, FIG. 7A and FIG. 7B are a flowchart of the example. In FIG. 7A and FIG. 7B, for example, S35 is performed.

Figure 8A:
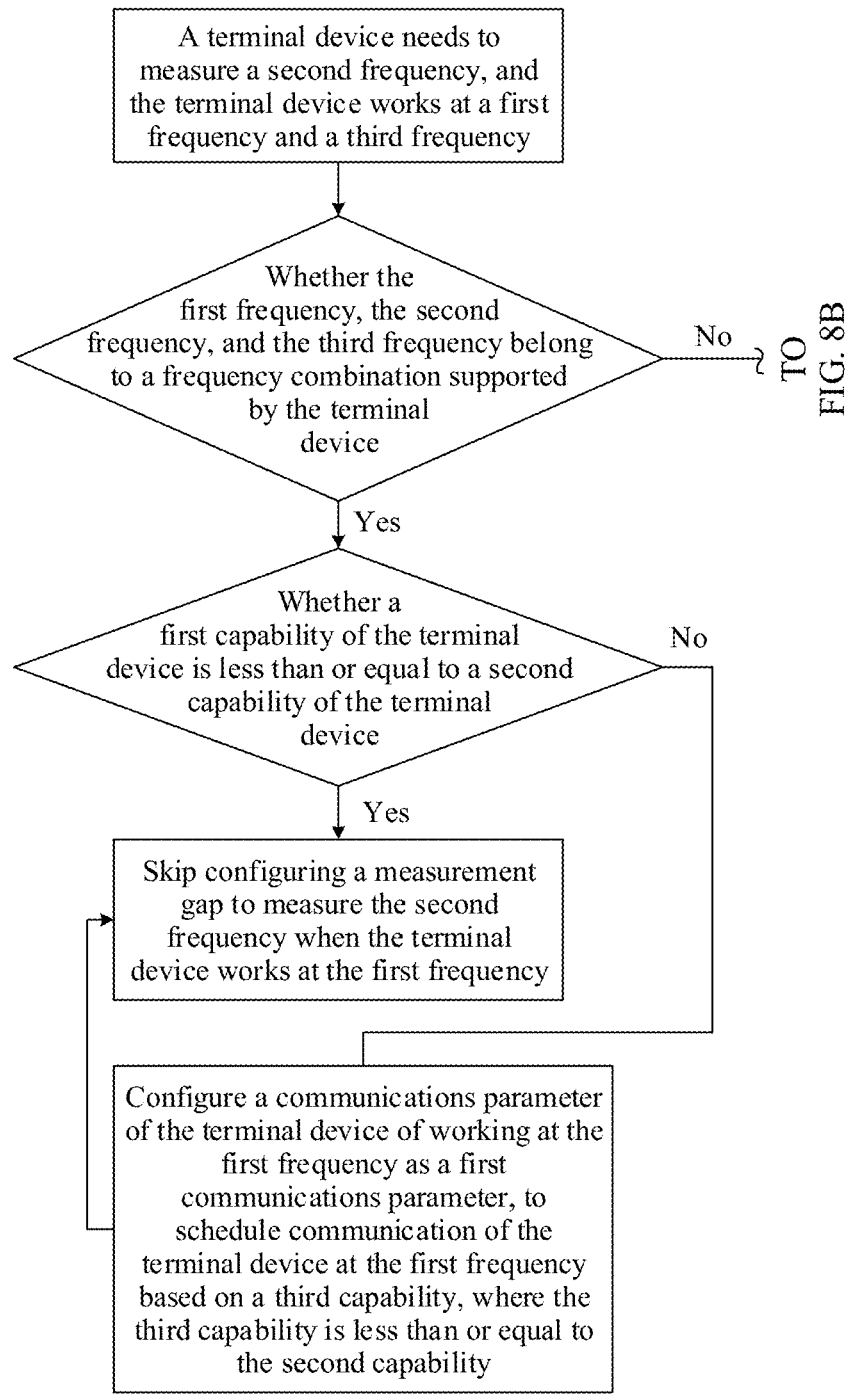
Figure 8B:
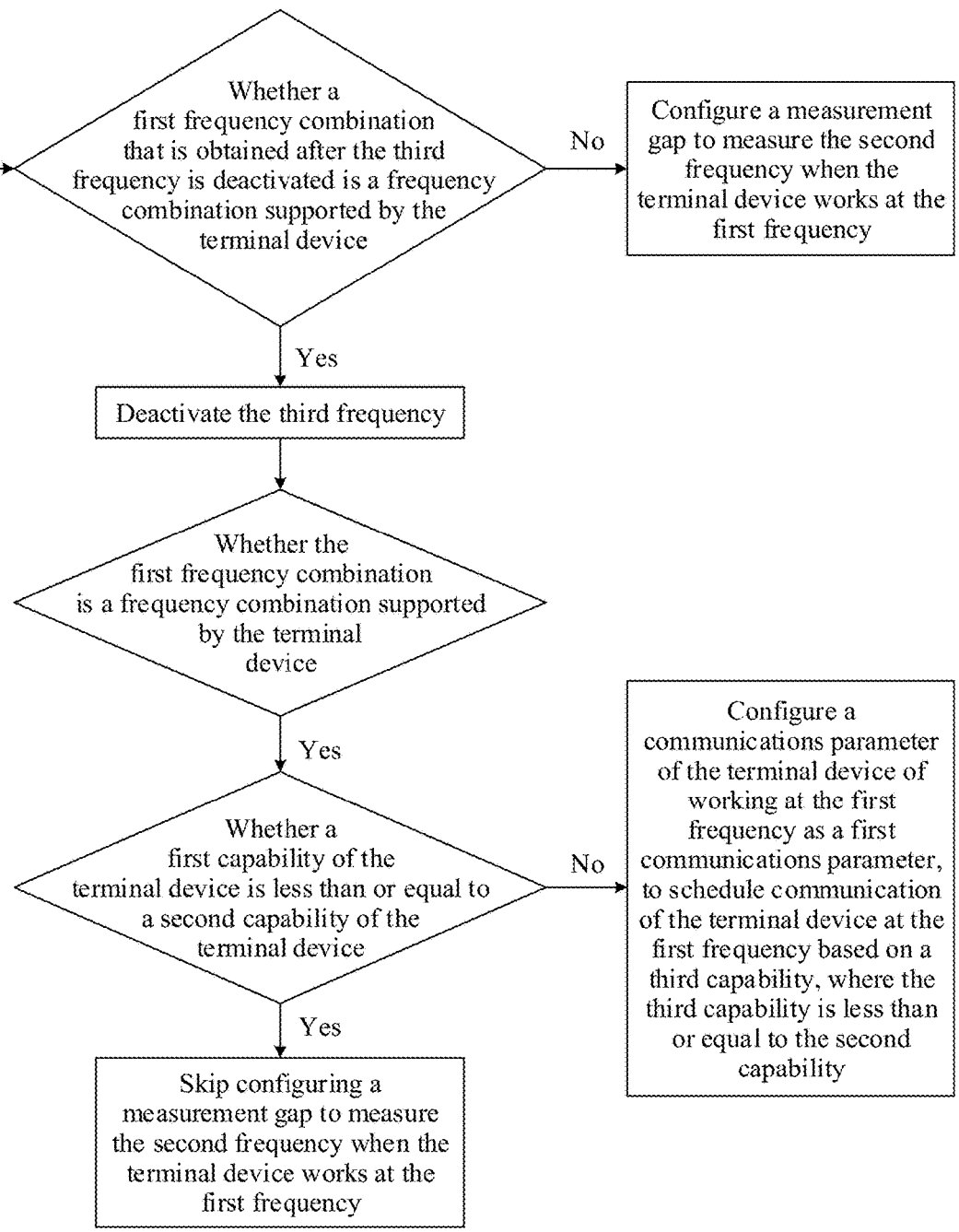

Alternatively, for example, the second frequency combination includes the first frequency, the second frequency, and the third frequency. In this case, the network device may first determine whether the second frequency combination is a frequency combination supported by the terminal device. If the second frequency combination is a frequency combination supported by the terminal device, the network device may perform S33. After performing S33, if the first capability is greater than the second capability, the network device may configure, for the terminal device, a communications parameter of working at the first frequency when the terminal device supports only the first radio access technology, where a capability of the terminal device corresponding to the communications parameter is the third capability; and then perform S33 Alternatively, if the second frequency combination is not a frequency combination supported by the terminal device, the network device may determine whether a combination that is of the remaining frequencies in the second frequency combination and that is obtained if a frequency corresponding to a secondary cell of the terminal device is deactivated from the second frequency combination is a frequency combination supported by the terminal device. For example, the network device may determine whether the first frequency combination that is obtained if the third frequency is deactivated is a frequency combination supported by the terminal device. If the first frequency combination is a frequency combination supported by the terminal device, the network device may deactivate the third frequency, and perform S33. After performing S33, if the first capability is less than or equal to the second capability, the network device does not need to configure a gap to measure the second frequency when the terminal device works at the first frequency; or if the first capability is greater than the second capability, the network device may reconfigure a to-be-measured frequency for the terminal device, or the network device may not configure the terminal device to perform measurement, or the network device may configure, for the terminal device, a communications parameter of working at the first frequency when the terminal device supports only the first radio access technology, where a capability of the terminal device corresponding to the communications parameter is the third capability, or the like. Alternatively, if the first frequency combination is not a frequency combination supported by the terminal device, the network device may not need to deactivate the third frequency, and may not need to perform S33 and a subsequent procedure either. For example, the network device may reconfigure a to-be-measured frequency for the terminal device, or the network device may not configure the terminal device to perform measurement, or the network device may configure a gap such as the third gap for the terminal device, so that the terminal device can measure the second frequency in the third gap when working at the first frequency. Certainly, in this embodiment of this application, an example in which the first frequency combination is a frequency combination supported by the terminal device is used. FIG. 8A and FIG. 8B are a flowchart of the example. In FIG. 8A and FIG. 8B, for example, S36 and S37 are performed.

Figure 9A:
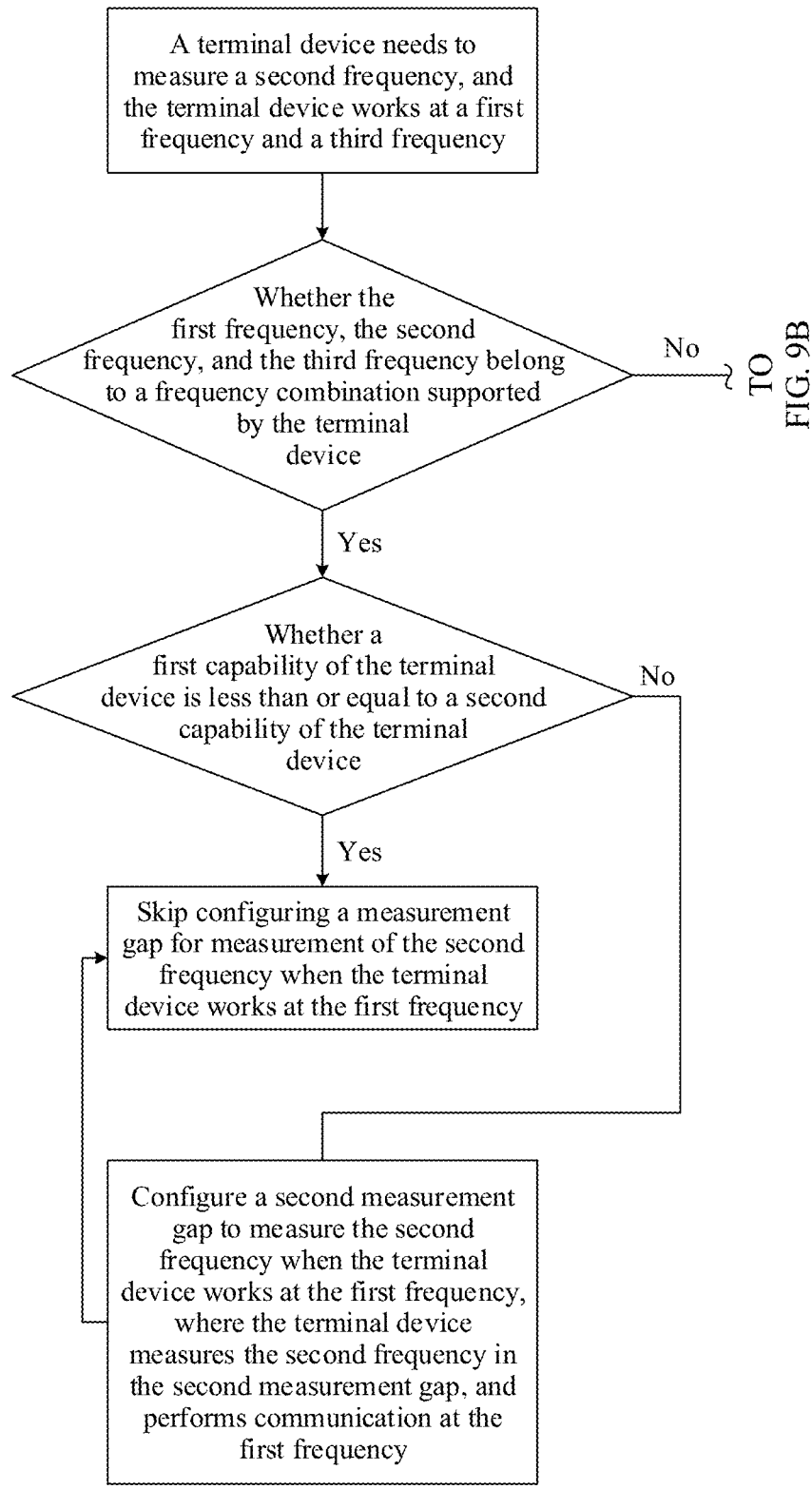
Figure 9B:
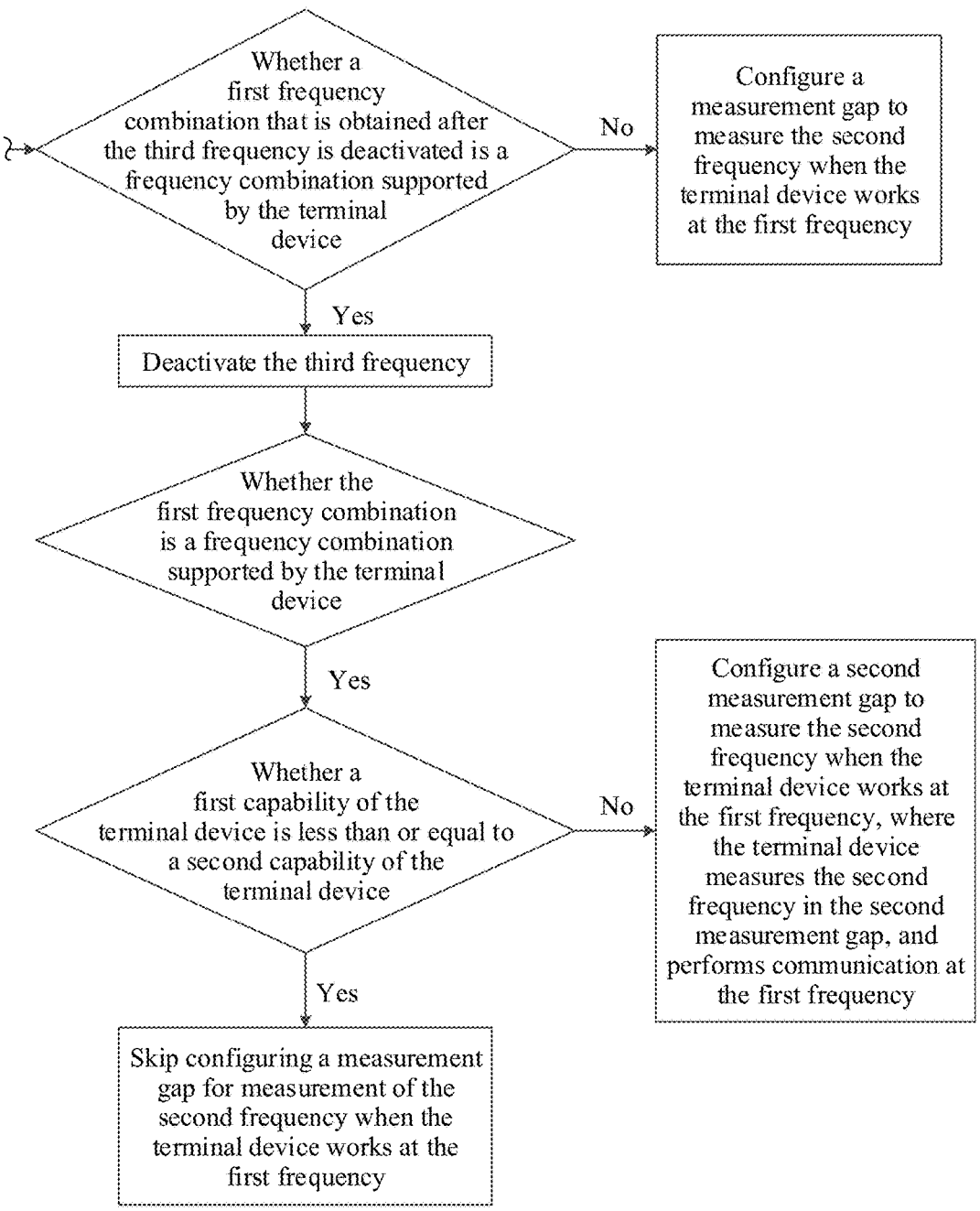

Alternatively, for example, the second frequency combination includes the first frequency, the second frequency, and the third frequency. In this case, the network device may first determine whether the second frequency combination is a frequency combination supported by the terminal device. If the second frequency combination is a frequency combination supported by the terminal device, the network device may perform S33. After performing S33, if the first capability is greater than the second capability, the network device may configure a second gap for the terminal device to measure the second frequency, and then perform S33. Alternatively, if the second frequency combination is not a frequency combination supported by the terminal device, the network device may determine whether a combination that is of the remaining frequencies in the second frequency combination and that is obtained if a frequency corresponding to a secondary cell of the terminal device is deactivated from the second frequency combination is a frequency combination supported by the terminal device. For example, the network device may determine whether the first frequency combination that is obtained if the third frequency is deactivated is a frequency combination supported by the terminal device. If the first frequency combination is a frequency combination supported by the terminal device, the network device may deactivate the third frequency, and perform S33. After performing S33, if the first capability is less than or equal to the second capability, the network device does not need to configure a gap to measure the second frequency when the terminal device works at the first frequency; or if the first capability is greater than the second capability, the network device may reconfigure a to-be-measured frequency for the terminal device, or the network device may not configure the terminal device to perform measurement, or the network device may configure the second gap for the terminal device to measure the second frequency, or the like. Alternatively, if the first frequency combination is not a frequency combination supported by the terminal device, the network device may not need to deactivate the third frequency, and may not need to perform S33 and a subsequent procedure either. For example, the network device may reconfigure a to-be-measured frequency for the terminal device, or the network device may not configure the terminal device to perform measurement, or the network device may configure a gap such as the third gap for the terminal device, so that the terminal device can measure the second frequency in the third gap when working at the first frequency. Certainly, in this embodiment of this application, an example in which the first frequency combination is a frequency combination supported by the terminal device is used. FIG. 9A and FIG. 9B are a flowchart of the example. In FIG. 9A and FIG. 9B, for example, S40 or S42 is performed.

For another example, the second frequency combination includes the first frequency, the second frequency, the third frequency, and the fourth frequency. In this case, the network device may first determine whether the second frequency combination is a frequency combination supported by the terminal device. If the second frequency combination is a frequency combination supported by the terminal device, the network device may perform S33. After performing S33, if the first capability is greater than the second capability, the network device may determine whether a combination that is of the remaining frequencies in the second frequency combination and that is obtained if a frequency corresponding to a secondary cell of the terminal device is deactivated from the second frequency combination is a frequency combination supported by the terminal device. For example, the network device may determine whether a frequency combination that is obtained if the third frequency and the fourth frequency are deactivated is a frequency combination supported by the terminal device. If the obtained frequency combination is a frequency combination supported by the terminal device, the network device may deactivate the third frequency and the fourth frequency, and then perform S33. Alternatively, if the second frequency combination is not a frequency combination supported by the terminal device, the network device may determine whether a combination that is of the remaining frequencies in the second frequency combination and that is obtained if a frequency corresponding to a secondary cell of the terminal device is deactivated from the second frequency combination is a frequency combination supported by the terminal device. In this case, secondary cells of the terminal device correspond to two frequencies (the third frequency and the fourth frequency), and the network device may determine whether a combination that is of the remaining frequencies in the second frequency combination and that is obtained after the two frequencies are deactivated is a frequency combination supported by the terminal device. If the network device deactivates the third frequency and the fourth frequency to obtain the first frequency combination, the network device continues to determine whether the first frequency combination is a frequency combination supported by the terminal device. If the first frequency combination is a frequency combination supported by the terminal device, the network device may deactivate the third frequency and the fourth frequency, and perform S33. After performing S33, if the first capability is less than or equal to the second capability, the network device does not need to configure a gap to measure the second frequency when the terminal device works at the first frequency; or if the first capability is greater than the second capability, the network device may reconfigure a to-be-measured frequency for the terminal device, or the network device may not configure the terminal device to perform measurement, or the network device may configure a gap such as the third gap for the terminal device, so that the terminal device can measure the second frequency in the third gap when working at the first frequency, or the like. Alternatively, if the first frequency combination is not a frequency combination supported by the terminal device, the network device may not need to deactivate the third frequency and the fourth frequency, and may not need to perform S33 and a subsequent procedure either. For example, the network device may reconfigure a to-be-measured frequency for the terminal device, or the network device may not configure the terminal device to perform measurement, or the network device may configure a gap such as the third gap for the terminal device, so that the terminal device can measure the second frequency in the third gap when working at the first frequency. Certainly, in this embodiment of this application, an example in which the first frequency combination is a frequency combination supported by the terminal device is used.

Alternatively, if the network device needs to deactivate a frequency corresponding to a secondary cell of the terminal device from the second frequency combination, the network device may first deactivate one frequency corresponding to a secondary cell of the terminal device, that is, separately deactivate a frequency corresponding to a secondary cell of the terminal device. Details are not described herein again.

In this embodiment of this application, if the terminal device has a plurality of frequencies corresponding to the first radio access technology, and a frequency combination including these frequencies and the second frequency is not a frequency combination supported by the terminal device, the network device may deactivate a frequency corresponding to a secondary cell of the terminal device to obtain, as much as possible, a frequency combination supported by the terminal device, so as not to configure a gap for the terminal device to measure the second frequency. This improves transmission efficiency.

With reference to the accompanying drawings, the following describes apparatuses configured to implement the foregoing methods in embodiments of this application. Therefore, all the foregoing content may be used in the following embodiments. Repeated content is not described again.

Figure 10:
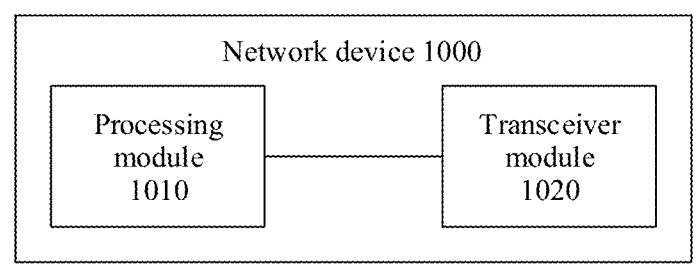
FIG. 10 is a schematic block diagram of a network device according to an embodiment of this application.

FIG. 10 is a schematic block diagram of a communications apparatus 1000 according to an embodiment of this application. For example, the communications apparatus 1000 is a network device 1000.

The network device 1000 includes a processing module 1010 and a transceiver module 1020. For example, the network device 1000 may be a network device, or may be a chip used in the network device or another combined device or a component that has a function of the foregoing network device. When the network device 1000 is a network device, the transceiver module 1020 may be a transceiver, and the transceiver may include an antenna, a radio frequency circuit, and the like; and the processing module 1010 may be a processor, for example, a baseband processor, and the baseband processor may include one or more central processing units (CPU). When the network device 1000 is a component having a function of the foregoing network device, the transceiver module 1020 may be a radio frequency unit; and the processing module 1010 may be a processor, for example, a baseband processor. When the network device 1000 is a chip system, the transceiver module 1020 may be an input/output interface of the chip (for example, a baseband chip); and the processing module 1010 may be a processor of the chip system, and may include one or more central processing units. It should be understood that, in this embodiment of this application, the processing module 1010 may be implemented as a processor or a processor-related circuit component, and the transceiver module 1020 may be implemented as a transceiver or a transceiver-related circuit component.

For example, the processing module 1010 may be configured to: perform all operations such as S33, S36, S38, S40, and S42 performed by the network device in the embodiment shown in FIG. 3A and FIG. 3B other than receiving and sending operations, and/or support another process of the technology described in this specification; and the transceiver module 1020 may be configured to: perform all receiving and sending operations such as S31, S32, S34, S35, S37, S39, S41, and S43 performed by the network device in the embodiment shown in FIG. 3A and FIG. 3B, and/or support another process of the technology described in this specification.

In addition, the transceiver module 1020 may be a function module, and the function module can complete both a sending operation and a receiving operation. For example, the transceiver module 1020 may be configured to perform all sending operations and receiving operations performed by the network device in the embodiment shown in FIG. 3A and FIG. 3B. For example, when performing the sending operation, the transceiver module 1020 may be considered as a sending module, and when performing the receiving operation, the transceiver module 1020 may be considered as a receiving module. Alternatively, the transceiver module 1020 may be two function modules. The transceiver module 1020 may be considered as a general term of the two function modules. The two function modules are respectively a sending module and a receiving module. The sending module is configured to complete a sending operation. For example, the sending module may be configured to perform all sending operations performed by the network device in the embodiment shown in FIG. 3A and FIG. 3B. The receiving module is configured to complete a receiving operation. For example, the receiving module may be configured to perform all receiving operations performed by the network device in the embodiment shown in FIG. 3A and FIG. 3B.

The processing module 1010 is configured to determine whether a first capability of a terminal device is less than or equal to a second capability of the terminal device, where the first capability is a capability of the terminal device of working at a first frequency when the terminal device supports only a first radio access technology, the second capability is a capability of the terminal device corresponding to the first frequency in a first frequency combination, the first frequency combination includes the first frequency and a second frequency, the first frequency corresponds to the first radio access technology, and the second frequency corresponds to a second radio access technology.

The transceiver module 1020 is configured to: when the processing module 1010 determines that the first capability is less than or equal to the second capability, send a first message to the terminal device, where the first message is used to indicate the terminal device to measure the second frequency, the first message does not include a configuration of a first measurement gap, and the first measurement gap is used to measure the second frequency.

In an optional implementation, the terminal device measures the second frequency when working at the first frequency.

In an optional implementation, the transceiver module 1020 is further configured to: when the processing module 1010 determines that the first capability is greater than the second capability, send a second message to the terminal device, where the second message is used to indicate the terminal device to measure the second frequency, and the second message includes the configuration of the first measurement gap.

In an optional implementation,
the processing module 1010 is further configured to: when the first capability is greater than the second capability, configure a first communications parameter of the terminal device of working at the first frequency, to schedule communication of the terminal device at the first frequency based on a third capability, where the third capability is less than or equal to the second capability; and
the transceiver module 1020 is further configured to send a third message to the terminal device, where the third message is used to indicate the terminal device to measure the second frequency, the third message does not include the configuration of the first measurement gap, and the first measurement gap is used to measure the second frequency.

In an optional implementation, the third message further includes the first communications parameter, and the first communications parameter is a communications parameter used to configure a capability of the terminal device as the third capability.

In an optional implementation,
the processing module 1010 is further configured to: when the first capability is greater than the second capability, determine a second communications parameter of the terminal device of working at the first frequency, to schedule communication of the terminal device at the first frequency based on the second capability; and
the transceiver module 1020 is further configured to send a fourth message to the terminal device, where the fourth message is used to indicate the terminal device to measure the second frequency, the fourth message does not include the configuration of the first measurement gap, and the first measurement gap is used to measure the second frequency.

In an optional implementation,
the processing module 1010 is further configured to: when the first capability is greater than the second capability, configure a third communications parameter of the terminal device of working at the first frequency in a second measurement gap, to schedule communication of the terminal device at the first frequency in the second measurement gap based on a fourth capability, where the fourth capability is less than or equal to the first capability, and the second measurement gap is used to measure the second frequency; and
the transceiver module 1020 is further configured to send a fifth message to the terminal device, where the fifth message is used to indicate the terminal device to measure the second frequency, the fifth message includes a configuration of the second measurement gap, and the second measurement gap is used to measure the second frequency.

In an optional implementation, the fifth message further includes the third communications parameter, and the third communications parameter is a communications parameter used to configure a capability of the terminal device as the fourth capability.

In an optional implementation,
the processing module 1010 is further configured to: when the first capability is greater than the second capability, determine a fourth communications parameter of the terminal device of working at the first frequency in a second measurement gap, to schedule communication of the terminal device at the first frequency in the second measurement gap based on the second capability; and
the transceiver module 1020 is further configured to send a sixth message to the terminal device, where the sixth message is used to indicate the terminal device to measure the second frequency, the sixth message includes a configuration of the second measurement gap, and the second measurement gap is used to measure the second frequency.

In an optional implementation,
the first frequency combination is a frequency combination supported by the terminal device; or
the processing module 1010 is further configured to: when determining that the terminal device is in an activated state at the first frequency and a third frequency, and a frequency combination supported by the terminal device does not include a frequency combination including the first frequency, the second frequency, and the third frequency, deactivate the third frequency to obtain the first frequency combination, where the third frequency corresponds to the first radio access technology, and the first frequency combination is a frequency combination supported by the terminal device.

In an optional implementation, the processing module 1010 is configured to determine, in the following manner, whether the first capability of the terminal device is less than or equal to the second capability of the terminal device:
receiving capability information from the terminal device by using the transceiver module 1020, where the capability information is used to indicate a capability of the terminal device of working at each of N frequencies when the terminal device supports only the first radio access technology, and indicate a capability of the terminal device corresponding to the third frequency in each of at least one supported frequency combination, the N frequencies include the first frequency, each frequency combination includes the third frequency and a fourth frequency, and the third frequency corresponds to the first radio access technology; and
determining, based on the capability information, whether the first capability is less than or equal to the second capability.

In an optional implementation, the processing module 1010 is configured to determine, in the following manner, whether the first capability of the terminal device is less than or equal to the second capability of the terminal device:
receiving indication information from the terminal device by using the transceiver module 1020, where the indication information indicates one or more frequency combinations, a capability of the terminal device corresponding to a fifth frequency in each of the one or more frequency combinations is greater than a capability of the terminal device of working at the fifth frequency when the terminal device supports only the first radio access technology, or a capability of the terminal device corresponding to a fifth frequency in each of the one or more frequency combinations is less than or equal to a capability of the terminal device of working at the fifth frequency when the terminal device supports only the first radio access technology, each frequency combination includes the fifth frequency and a sixth frequency, the fifth frequency corresponds to the first radio access technology, and the sixth frequency corresponds to the second radio access technology; and determining, based on the indication information, whether the first capability is less than or equal to the second capability.

In an optional implementation, the first capability is a capability of a quantity of MIMO layers, a quantity of SRS ports, or a quantity of antenna ports that can be supported by the terminal device; and/or the second capability is a capability of a quantity of MIMO layers, a quantity of SRS ports, or a quantity of antenna ports that can be supported by the terminal device.

For other functions that can be implemented by the network device 1000, refer to the related descriptions of the embodiment shown in FIG. 3A and FIG. 3B. Details are not described again.

Figure 11:
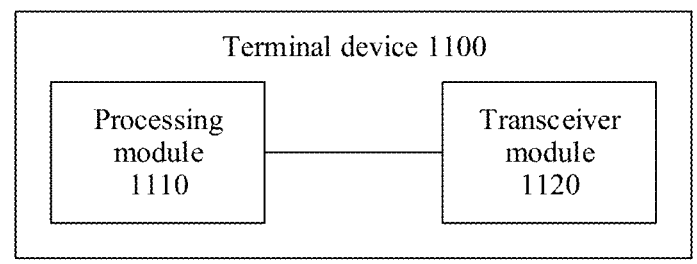
FIG. 11 is a schematic block diagram of a terminal device according to an embodiment of this application.

FIG. 11 is a schematic block diagram of a communications apparatus 1100 according to an embodiment of this application. For example, the communications apparatus 1100 is a terminal device 1100.

The terminal device 1100 includes a processing module 1110 and a transceiver module 1120. For example, the terminal device 1100 may be a terminal device, or may be a chip used in the terminal device or another combined device or a component that has a function of the foregoing terminal device. When the terminal device 1100 is a terminal device, the transceiver module 1120 may be a transceiver, and the transceiver may include an antenna, a radio frequency circuit, and the like; and the processing module 1110 may be a processor, for example, a baseband processor, and the baseband processor may include one or more CPUs. When the terminal device 1100 is a component having a function of the foregoing terminal device, the transceiver module 1120 may be a radio frequency unit; and the processing module 1110 may be a processor, for example, a baseband processor. When the terminal device 1100 is a chip system, the transceiver module 1120 may be an input/output interface of the chip (for example, a baseband chip); and the processing module 1110 may be a processor of the chip system, and may include one or more central processing units. It should be understood that, in this embodiment of this application, the processing module 1110 may be implemented as a processor or a processor-related circuit component, and the transceiver module 1120 may be implemented as a transceiver or a transceiver-related circuit component.

For example, the processing module 1110 may be configured to: perform all operations such as an operation of determining one or more frequency combinations (to send indication information to the network device 1000) performed by the terminal device in the embodiment shown in FIG. 3A and FIG. 3B other than receiving and sending operations, and/or support another process of the technology described in this specification; and the transceiver module 1120 may be configured to: perform all receiving and sending operations such as S31, S32, S34, S35, S37, S39, S41, and S43 performed by the terminal device in the embodiment shown in FIG. 3A and FIG. 3B, and/or support another process of the technology described in this specification.

In addition, the transceiver module 1120 may be a function module, and the function module can complete both a sending operation and a receiving operation. For example, the transceiver module 1120 may be configured to perform all sending operations and receiving operations performed by the terminal device in the embodiment shown in FIG. 3A and FIG. 3B. For example, when performing the sending operation, the transceiver module 1120 may be considered as a sending module, and when performing the receiving operation, the transceiver module 1120 may be considered as a receiving module. Alternatively, the transceiver module 1120 may be two function modules. The transceiver module 1120 may be considered as a general term of the two function modules. The two function modules are respectively a sending module and a receiving module. The sending module is configured to complete a sending operation. For example, the sending module may be configured to perform all sending operations performed by the terminal device in the embodiment shown in FIG. 3A and FIG. 3B. The receiving module is configured to complete a receiving operation. For example, the receiving module may be configured to perform all receiving operations performed by the terminal device in the embodiment shown in FIG. 3A and FIG. 3B.

The processing module 1110 is configured to determine one or more frequency combinations, where a capability of the terminal device corresponding to a fifth frequency in each of the one or more frequency combinations is greater than a capability of the terminal device of working at the fifth frequency when the terminal device supports only a first radio access technology, or a capability of the terminal device corresponding to a fifth frequency in each of the one or more frequency combinations is less than or equal to a capability of the terminal device of working at the fifth frequency when the terminal device supports only a first radio access technology, each frequency combination includes the fifth frequency and a sixth frequency, the fifth frequency corresponds to the first radio access technology, and the sixth frequency corresponds to a second radio access technology.

The transceiver module 1120 is configured to send indication information to a network device, where the indication information indicates the one or more frequency combinations.

In an optional implementation, the transceiver module 1120 is further configured to send capability information of the terminal device to the network device, where the capability information is used to indicate a capability of the terminal device of working at each of N frequencies when the terminal device supports only the first radio access technology, and indicate a capability of the terminal device corresponding to a third frequency in each of at least one supported frequency combination, the N frequencies include a first frequency, each frequency combination includes the third frequency and a fourth frequency, and the third frequency corresponds to the first radio access technology.

In an optional implementation, the transceiver module 1120 is further configured to receive a first message from the network device, where the first message is used to indicate to measure a second frequency, the terminal device works at the first frequency, the first frequency and the second frequency belong to a first frequency combination supported by the terminal device, the first frequency corresponds to the first radio access technology, the second frequency corresponds to the second radio access technology, the first message does not include a configuration of a first measurement gap, and the first measurement gap is used to measure the second frequency.

In an optional implementation, the transceiver module 1120 is further configured to receive a second message from the network device, where the second message is used to indicate to measure a second frequency, the terminal device works at the first frequency, the first frequency and the second frequency belong to a first frequency combination supported by the terminal device, the first frequency corresponds to the first radio access technology, the second frequency corresponds to the second radio access technology, the second message includes a configuration of a first measurement gap, and the first measurement gap is used to measure the second frequency.

In an optional implementation, the transceiver module 1120 is further configured to receive a third message from the network device, where the third message is used to indicate the terminal device to measure a second frequency, the third message does not include a configuration of a first measurement gap, the first measurement gap is used to measure the second frequency, the third message further includes a first communications parameter, and the first communications parameter is a communications parameter used to configure a capability of the terminal device as a third capability.

In an optional implementation, the transceiver module 1120 is further configured to receive a fourth message from the network device, where the fourth message is used to indicate the terminal device to measure a second frequency, the fourth message does not include a configuration of a first measurement gap, the first measurement gap is used to measure the second frequency, the terminal device can perform communication at the first frequency when measuring the second frequency, and a capability of the terminal device corresponding to the first frequency is a second capability.

In an optional implementation, the transceiver module 1120 is further configured to receive a fifth message from the network device, where the fifth message is used to indicate to measure a second frequency, the terminal device works at the first frequency, the first frequency and the second frequency belong to a first frequency combination supported by the terminal device, the first frequency corresponds to the first radio access technology, the second frequency corresponds to the second radio access technology, the fifth message includes a configuration of a second measurement gap, the second measurement gap is used to measure the second frequency, the fifth message further includes a third communications parameter corresponding to the second measurement gap, the third communications parameter is a communications parameter used to configure a capability of the terminal device corresponding to the first frequency as a fourth capability, the fourth capability is less than or equal to a first capability, and the first capability is a capability of the terminal device of working at the first frequency when the terminal device supports only the first radio access technology.

In an optional implementation, the transceiver module 1120 is further configured to receive a sixth message from the network device, where the sixth message is used to indicate to measure a second frequency, the terminal device works at the first frequency, the first frequency and the second frequency belong to a first frequency combination supported by the terminal device, the first frequency corresponds to the first radio access technology, the second frequency corresponds to the second radio access technology, the sixth message includes a configuration of a second measurement gap, the second measurement gap is used to measure the second frequency, the terminal device can perform communication at the first frequency when measuring the second frequency in the second measurement gap, and a capability of the terminal device corresponding to the first frequency in the second measurement gap is a second capability.

For other functions that can be implemented by the terminal device 1100, refer to the related descriptions of the embodiment shown in FIG. 3A and FIG. 3B. Details are not described again.

An embodiment of this application further provides a communications apparatus. The communications apparatus may be a terminal device or a circuit. The communications apparatus may be configured to perform actions performed by the terminal device in the foregoing method embodiments.

Figure 12:
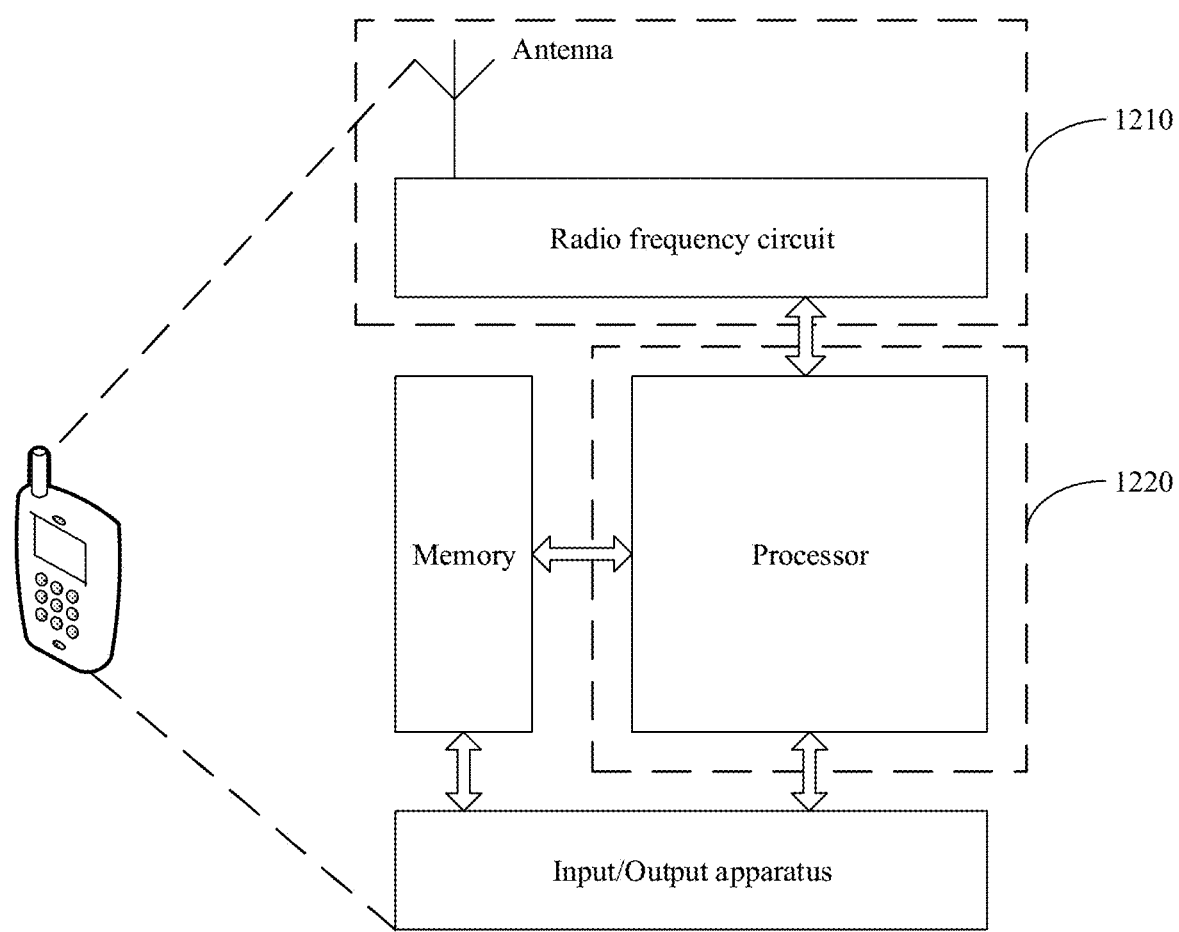
FIG. 12 is a schematic block diagram of a communications apparatus according to an embodiment of this application.

When the communications apparatus is a terminal device, FIG. 12 is a simplified schematic diagram of a structure of the terminal device. For ease of understanding and illustration, an example in which the terminal device is a mobile phone is used in FIG. 12. As shown in FIG. 12, the terminal device includes a processor, a memory, a radio frequency circuit, an antenna, and an input/output apparatus. The processor is mainly configured to: process a communications protocol and communications data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, for example, a touchscreen, a display, or a keyboard, is mainly configured to receive data entered by a user and output data to the user. It should be noted that some types of terminal devices may not have the input/output apparatus.

When the processor needs to send data, after performing baseband processing on the to-be-sent data, the processor outputs a baseband signal to the radio frequency circuit. The radio frequency circuit performs radio frequency processing on the baseband signal, and then sends the radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 12 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in embodiments of this application.

In this embodiment of this application, the antenna and the radio frequency circuit that have receiving and sending functions may be considered as a transceiver unit of the terminal device (the transceiver unit may be one function unit, and the function unit can implement a sending function and a receiving function; or the transceiver unit may include two function units: a receiving unit that can implement a receiving function and a sending unit that can implement a sending function), and a processor that has a processing function is considered as a processing unit of the terminal device. As shown in FIG. 12, the terminal device includes a transceiver unit 1210 and a processing unit 1220. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1210 and that is configured to implement a receiving function may be considered as a receiving unit, and a component that is in the transceiver unit 1210 and that is configured to implement a sending function may be considered as a sending unit. In other words, the transceiver unit 1210 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that, if a first device is a terminal device, the transceiver unit 1210 is configured to perform a sending operation and a receiving operation on a first device side in the foregoing method embodiment, and the processing unit 1220 is configured to perform an operation other than the receiving and sending operations performed by the first device in the foregoing method embodiment. Alternatively, if a second device is a terminal device, the transceiver unit 1210 is configured to perform a sending operation and a receiving operation on a second device side in the foregoing method embodiment, and the processing unit 1220 is configured to perform an operation other than the receiving and sending operations performed by the second device in the foregoing method embodiment.

For example, in an implementation, the processing unit 1220 may be configured to: perform all operations such as an operation of determining one or more frequency combinations (to send indication information to the network device 1000) performed by the terminal device in the embodiment shown in FIG. 3A and FIG. 3B other than receiving and sending operations, and/or support another process of the technology described in this specification; and the transceiver unit 1210 may be configured to: perform all receiving and sending operations such as S31, S32, S34, S35, S37, S39, S41, and S43 performed by the terminal device in the embodiment shown in FIG. 3A and FIG. 3B, and/or support another process of the technology described in this specification.

When the communications apparatus is a chip apparatus or circuit, the apparatus may include a transceiver unit and a processing unit. The transceiver unit may be an input/output circuit and/or a communications interface. The processing unit is an integrated processor, a microprocessor, or an integrated circuit.

Figure 13:
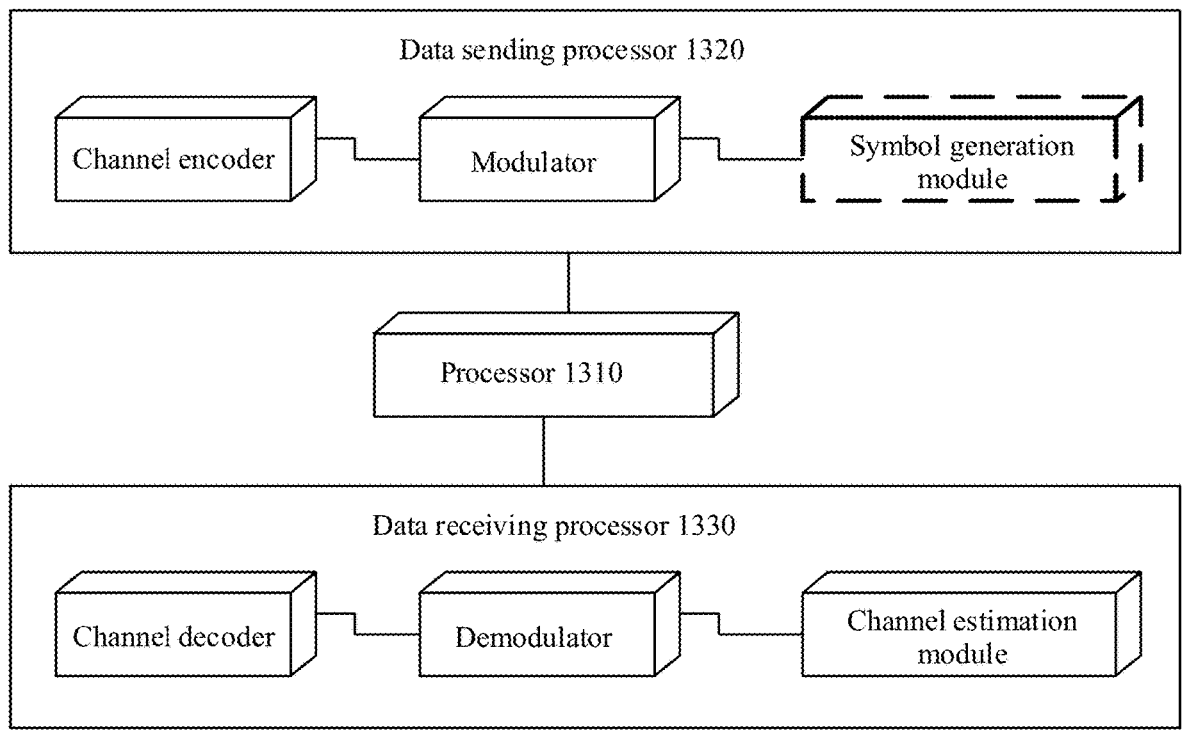
FIG. 13 is another schematic block diagram of a communications apparatus according to an embodiment of this application.

When the communications apparatus in this embodiment is a terminal device, refer to a device shown in FIG. 13. In an example, the device can complete a function similar to a function of the processing module 1110 in FIG. 11. In FIG. 13, the device includes a processor 1310, a data sending processor 1320, and a data receiving processor 1330. The processing module 1110 in the foregoing embodiment may be the processor 1310 in FIG. 13, and complete a corresponding function. The transceiver module 1120 in the foregoing embodiment may be the data sending processor 1320 and/or the data receiving processor 1330 in FIG. 13, and complete a corresponding function. Although FIG. 13 shows a channel encoder and a channel decoder, it can be understood that these modules are merely examples, and do not constitute a limitation on this embodiment.

Figure 14:
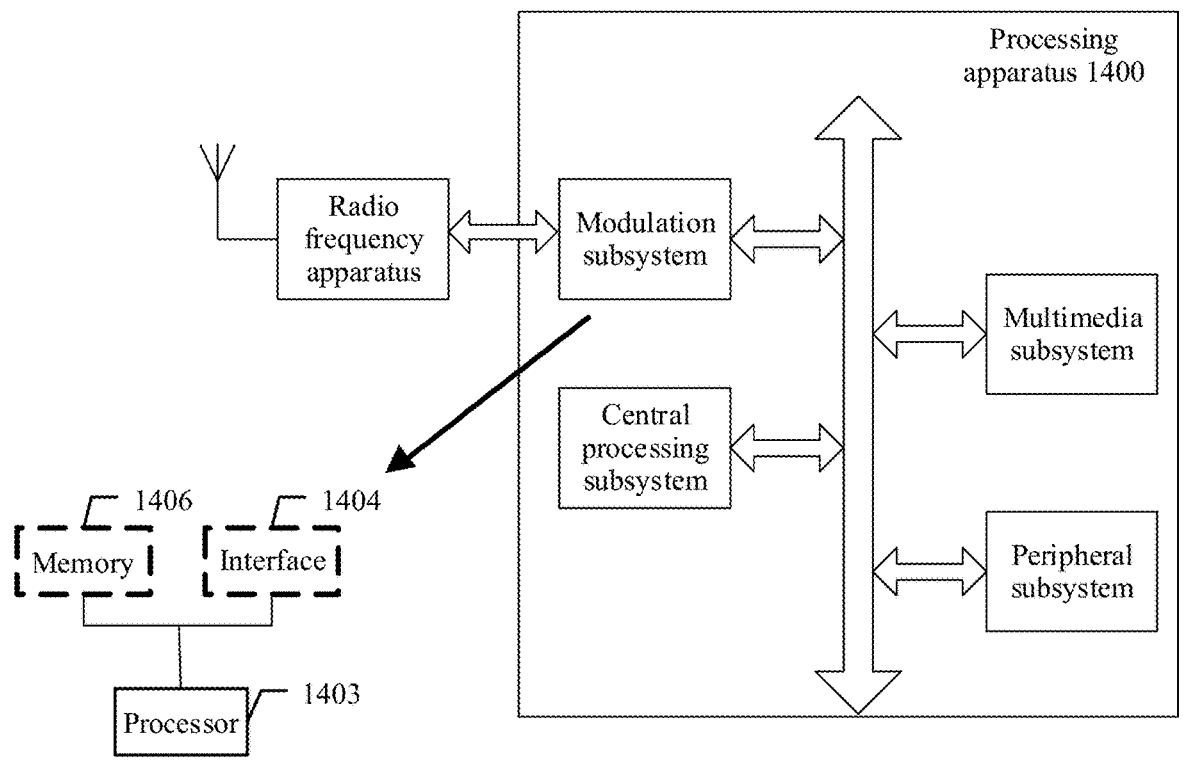
FIG. 14 is still another schematic block diagram of a communications apparatus according to an embodiment of this application.

FIG. 14 shows another form of this embodiment. A processing apparatus 1400 includes modules such as a modulation subsystem, a central processing subsystem, and a peripheral subsystem. The communications apparatus in this embodiment may be used as the modulation subsystem. Specifically, the modulation subsystem may include a processor 1403 and an interface 1404. The processor 1403 completes a function of the processing module 1110, and the interface 1404 completes a function of the transceiver module 1120. In another variant, the modulation subsystem includes a memory 1406, a processor 1403, and a program that is stored in the memory 1406 and that can be run on the processor. When executing the program, the processor 1403 implements the method on the terminal device side in the foregoing method embodiment. It should be noted that the memory 1406 may be nonvolatile or volatile, and may be located inside the modulation subsystem, or may be located in the processing apparatus 1400, provided that the memory 1406 can be connected to the processor 1403.

Figure 15:
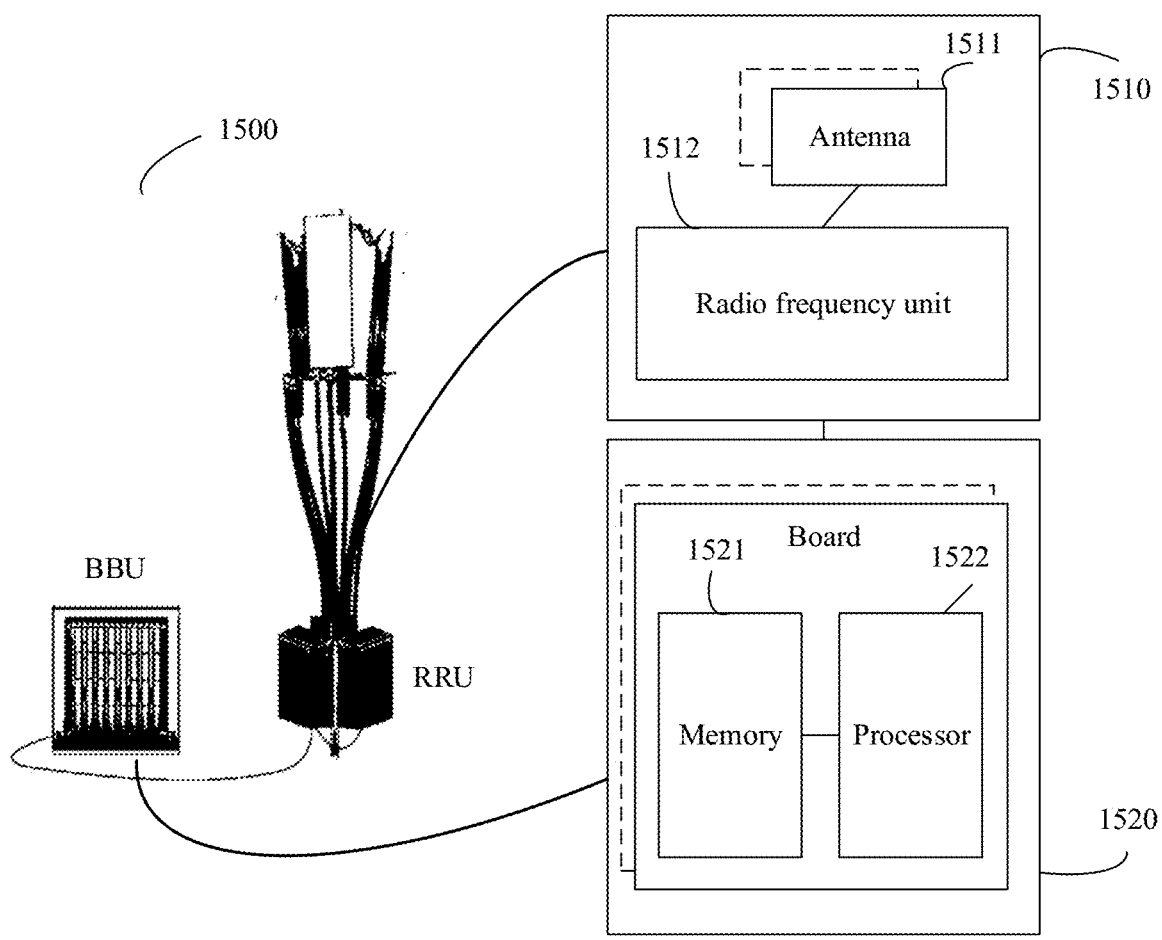
FIG. 15 is yet another schematic block diagram of a communications apparatus according to an embodiment of this application.

When the apparatus in this embodiment of this application is a network device, the apparatus may be shown in FIG. 15. An apparatus 1500 includes one or more radio frequency units, such as a remote radio unit (RRU) 1510 and one or more baseband units (BBU) (which may also be referred to as digital units (DU)) 1520. The RRU 1510 may be referred to as a transceiver module. The transceiver module may include a sending module and a receiving module, or the transceiver module may be a module that can implement sending and receiving functions. The transceiver module may correspond to the transceiver module 1020 in FIG. 10. Optionally, the transceiver module may also be referred to as a transceiver machine, a transceiver circuit, a transceiver, or the like, and may include at least one antenna 1511 and a radio frequency unit 1512. The RRU 1510 is mainly configured to: receive and send radio frequency signals, and perform conversion between a radio frequency signal and a baseband signal, for example, configured to send indication information to a terminal device. The BBU 1520 is mainly configured to: perform baseband processing, control a base station, and the like. The RRU 1510 and the BBU 1520 may be physically disposed together, or may be physically separated, that is, in a distributed base station.

The BBU 1520 is a control center of a base station, and may also be referred to as a processing module. The processing module may correspond to the processing module 1010 in FIG. 10, and is mainly configured to complete a baseband processing function such as channel encoding, multiplexing, modulation, or spreading. For example, the BBU (processing module) may be configured to control the base station to perform an operation procedure related to the network device in the foregoing method embodiments, for example, generate the indication information.

In an example, the BBU 1520 may include one or more boards, and a plurality of boards may jointly support a radio access network (for example, an LTE network) in a single access standard, or may separately support radio access networks (for example, an LTE network, a 5G network, and another network) in different access standards. The BBU 1520 further includes a memory 1521 and a processor 1522. The memory 1521 is configured to store necessary instructions and data. The processor 1522 is configured to control the base station to perform a necessary action, for example, configured to control the base station to perform the operation procedure related to the network device in the foregoing method embodiments. The memory 1521 and the processor 1522 may serve one or more boards. In other words, a memory and a processor may be disposed on each board. Alternatively, a plurality of boards may share a same memory and a same processor. In addition, a necessary circuit may be further disposed on each board.

An embodiment of this application provides a communications system. The communications system may include the network device in the embodiment shown in FIG. 3A and FIG. 3B, and include the terminal device in the embodiment shown in FIG. 3A and FIG. 3B. The network device is, for example, the network device 1000 in FIG. 10. The terminal device is, for example, the terminal device 1100 in FIG. 11.

An embodiment of this application further provides a computer-readable storage medium. The computer-readable storage medium stores a computer program. When the computer program is executed by a computer, the computer may implement the procedure related to the network device in the embodiment shown in FIG. 3A and FIG. 3B provided in the foregoing method embodiment.

An embodiment of this application further provides a computer-readable storage medium. The computer-readable storage medium is configured to store a computer program. When the computer program is executed by a computer, the computer may implement the procedure related to the terminal device in the embodiment shown in FIG. 3A and FIG. 3B provided in the foregoing method embodiment.

An embodiment of this application further provides a computer program product. The computer program product is configured to store a computer program. When the computer program is executed by a computer, the computer may implement the procedure related to the network device in the embodiment shown in FIG. 3A and FIG. 3B provided in the foregoing method embodiment.

An embodiment of this application further provides a computer program product. The computer program product is configured to store a computer program. When the computer program is executed by a computer, the computer may implement the procedure related to the terminal device in the embodiment shown in FIG. 3A and FIG. 3B provided in the foregoing method embodiment.

It should be understood that the processor in embodiments of this application may be a CPU, or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be further understood that the memory mentioned in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. By way of example, and not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

It should be noted that, when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one location, or may be distributed on a plurality of network units. Some or all of the units may be selected according to actual requirements to achieve the objectives of the solutions of embodiments.

In addition, function units in embodiments of this application may be integrated into one processing unit, or each of the units may exist alone physically, or two or more units may be integrated into one unit.

When the functions are implemented in the form of a software function unit and sold or used as an independent product, the functions may be stored in a computer-readable storage medium. Based on such an understanding, the technical solution of this application essentially, or the part contributing to a conventional technology, or some of the technical solution may be implemented in a form of a software product. The computer software product is stored in a storage medium, and includes several instructions for instructing a computer device (which may be a personal computer, a server, a network device, or the like) to perform all or some of the steps of the method described in embodiments of this application. The foregoing computer-readable storage medium may be any usable medium accessible by a computer. By way of example, and not limitation, the computer-readable medium may include a random access memory (RAM), a read-only memory (ROM), an electrically erasable programmable read-only memory (EEPROM), a compact disc read-only memory (CD-ROM), a universal serial bus flash disk, a removable hard disk or another compact disc storage, a magnetic disk storage medium or another magnetic storage device, or any other medium that can be used to carry or store expected program code in a form of an instruction or a data structure and that can be accessed by a computer.

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

With reference to the foregoing descriptions, this application further provides the following embodiments.

Embodiment 1: A communications method is provided, including:
  determining whether a first capability of a terminal device is less than or equal to a second capability of the terminal device, where the first capability is a capability of the terminal device of working at a first frequency when the terminal device supports only a first radio access technology, the second capability is a capability of the terminal device corresponding to the first frequency in a first frequency combination, the first frequency combination includes the first frequency and a second frequency, the first frequency corresponds to the first radio access technology, and the second frequency corresponds to a second radio access technology; and
  when the first capability is less than or equal to the second capability, sending a first message to the terminal device, where the first message is used to indicate the terminal device to measure the second frequency, the first message does not include a configuration of a first measurement gap, and the first measurement gap is used to measure the second frequency.

Embodiment 2: According to the method in Embodiment 1, the terminal device measures the second frequency when working at the first frequency.

Embodiment 3: According to the method in Embodiment 1 or Embodiment 2, the method further includes:
  when the first capability is greater than the second capability, sending a second message to the terminal device, where the second message is used to indicate the terminal device to measure the second frequency, and the second message includes the configuration of the first measurement gap.

Embodiment 4: According to the method in Embodiment 1 or Embodiment 2, the method further includes:
  when the first capability is greater than the second capability, configuring a first communications parameter of the terminal device of working at the first frequency, to schedule communication of the terminal device at the first frequency based on a third capability, where the third capability is less than or equal to the second capability; and
  sending a third message to the terminal device, where the third message is used to indicate the terminal device to measure the second frequency, the third message does not include the configuration of the first measurement gap, and the first measurement gap is used to measure the second frequency.

Embodiment 5: According to the method in Embodiment 4, the third message further includes the first communications parameter, and the first communications parameter is a communications parameter used to configure a capability of the terminal device as the third capability.

Embodiment 6: According to the method in Embodiment 1 or Embodiment 2, the method further includes:
  when the first capability is greater than the second capability, determining a second communications parameter of the terminal device of working at the first frequency, to schedule communication of the terminal device at the first frequency based on the second capability; and
  sending a fourth message to the terminal device, where the fourth message is used to indicate the terminal device to measure the second frequency, the fourth message does not include the configuration of the first measurement gap, and the first measurement gap is used to measure the second frequency.

Embodiment 7: According to the method in Embodiment 1 or Embodiment 2, the method further includes:
  when the first capability is greater than the second capability, configuring a third communications parameter of the terminal device of working at the first frequency in a second measurement gap, to schedule communication of the terminal device at the first frequency in the second measurement gap based on a fourth capability, where the fourth capability is less than or equal to the first capability, and the second measurement gap is used to measure the second frequency; and
  sending a fifth message to the terminal device, where the fifth message is used to indicate the terminal device to measure the second frequency, the fifth message includes a configuration of the second measurement gap, and the second measurement gap is used to measure the second frequency.

Embodiment 8: According to the method in Embodiment 7, the fifth message further includes the third communications parameter, and the third communications parameter is a communications parameter used to configure a capability of the terminal device as the fourth capability.

Embodiment 9: According to the method in Embodiment 1 or Embodiment 2, the method further includes:
  when the first capability is greater than the second capability, determining a fourth communications parameter of the terminal device of working at the first frequency in a second measurement gap, to schedule communication of the terminal device at the first frequency in the second measurement gap based on the second capability; and sending a sixth message to the terminal device, where the sixth message is used to indicate the terminal device to measure the second frequency, the sixth message includes a configuration of the second measurement gap, and the second measurement gap is used to measure the second frequency.

Embodiment 10: According to the method in any one of Embodiment 1 to Embodiment 9,
the first frequency combination is a frequency combination supported by the terminal device; or
the method further includes: if it is determined that the terminal device is in an activated state at the first frequency and a third frequency, and a frequency combination supported by the terminal device does not include a frequency combination including the first frequency, the second frequency, and the third frequency, deactivating the third frequency to obtain the first frequency combination, where the third frequency corresponds to the first radio access technology, and the first frequency combination is a frequency combination supported by the terminal device.

Embodiment 11: According to the method in any one of Embodiment 1 to Embodiment 10, the determining whether a first capability of a terminal device is less than or equal to a second capability of the terminal device includes:
receiving capability information from the terminal device, where the capability information is used to indicate a capability of the terminal device of working at each of N frequencies when the terminal device supports only the first radio access technology, and indicate a capability of the terminal device corresponding to the third frequency in each of at least one supported frequency combination, the N frequencies include the first frequency, each frequency combination includes the third frequency and a fourth frequency, and the third frequency corresponds to the first radio access technology; and
determining, based on the capability information, whether the first capability is less than or equal to the second capability.

Embodiment 12: According to the method in any one of Embodiment 1 to Embodiment 10, the determining whether a first capability of a terminal device is less than or equal to a second capability of the terminal device includes:
receiving indication information from the terminal device, where the indication information indicates one or more frequency combinations, a capability of the terminal device corresponding to a fifth frequency in each of the one or more frequency combinations is greater than a capability of the terminal device of working at the fifth frequency when the terminal device supports only the first radio access technology, or a capability of the terminal device corresponding to a fifth frequency in each of the one or more frequency combinations is less than or equal to a capability of the terminal device of working at the fifth frequency when the terminal device supports only the first radio access technology, each frequency combination includes the fifth frequency and a sixth frequency, the fifth frequency corresponds to the first radio access technology, and the sixth frequency corresponds to the second radio access technology; and
determining, based on the indication information, whether the first capability is less than or equal to the second capability.

Embodiment 13: According to the method in any one of Embodiment 1 to Embodiment 12,
the first capability is a capability of a quantity of MIMO layers, a quantity of SRS ports, or a quantity of antenna ports that can be supported by the terminal device; and/or
the second capability is a capability of a quantity of MIMO layers, a quantity of SRS ports, or a quantity of antenna ports that can be supported by the terminal device.

Embodiment 14: A communications method is provided, including:
determining one or more frequency combinations, where a capability of a terminal device corresponding to a fifth frequency in each of the one or more frequency combinations is greater than a capability of the terminal device of working at the fifth frequency when the terminal device supports only a first radio access technology, or a capability of a terminal device corresponding to a fifth frequency in each of the one or more frequency combinations is less than or equal to a capability of the terminal device of working at the fifth frequency when the terminal device supports only a first radio access technology, each frequency combination includes the fifth frequency and a sixth frequency, the fifth frequency corresponds to the first radio access technology, and the sixth frequency corresponds to a second radio access technology; and
sending indication information to a network device, where the indication information indicates the one or more frequency combinations.

Embodiment 15: According to the method in Embodiment 14, the method further includes:
sending capability information of the terminal device to the network device, where the capability information is used to indicate a capability of the terminal device of working at each of N frequencies when the terminal device supports only the first radio access technology, and indicate a capability of the terminal device corresponding to a third frequency in each of at least one supported frequency combination, the N frequencies include a first frequency, each frequency combination includes the third frequency and a fourth frequency, and the third frequency corresponds to the first radio access technology.

Embodiment 16: According to the method in Embodiment 14 or Embodiment 15, the method further includes:
receiving a first message from the network device, where the first message is used to indicate to measure a second frequency, the terminal device works at the first frequency, the first frequency and the second frequency belong to a first frequency combination supported by the terminal device, the first frequency corresponds to the first radio access technology, the second frequency corresponds to the second radio access technology, the first message does not include a configuration of a first measurement gap, and the first measurement gap is used to measure the second frequency.

Embodiment 17: According to the method in Embodiment 14 or Embodiment 15, the method further includes:
receiving a second message from the network device, where the second message is used to indicate to measure a second frequency, the terminal device works at the first frequency, the first frequency and the second frequency belong to a first frequency combination supported by the terminal device, the first frequency corresponds to the first radio access technology, the second frequency corresponds to the second radio access technology, the second message includes a configuration of a first measurement gap, and the first measurement gap is used to measure the second frequency.

Embodiment 18: According to the method in Embodiment 14 or Embodiment 15, the method further includes:
receiving a third message from the network device, where the third message is used to indicate the terminal device to measure a second frequency, the third message does not include a configuration of a first measurement gap, the first measurement gap is used to measure the second frequency, the third message further includes a first communications parameter, and the first communications parameter is a communications parameter used to configure a capability of the terminal device as a third capability.

Embodiment 19: According to the method in Embodiment 14 or Embodiment 15, the method further includes:
receiving a fourth message from the network device, where the fourth message is used to indicate the terminal device to measure a second frequency, the fourth message does not include a configuration of a first measurement gap, the first measurement gap is used to measure the second frequency, the terminal device can perform communication at the first frequency when measuring the second frequency, and a capability of the terminal device corresponding to the first frequency is a second capability.

Embodiment 20: According to the method in Embodiment 14 or Embodiment 15, the method further includes:
receiving a fifth message from the network device, where the fifth message is used to indicate to measure a second frequency, the terminal device works at the first frequency, the first frequency and the second frequency belong to a first frequency combination supported by the terminal device, the first frequency corresponds to the first radio access technology, the second frequency corresponds to the second radio access technology, the fifth message includes a configuration of a second measurement gap, the second measurement gap is used to measure the second frequency, the fifth message further includes a third communications parameter corresponding to the second measurement gap, the third communications parameter is a communications parameter used to configure a capability of the terminal device corresponding to the first frequency as a fourth capability, the fourth capability is less than or equal to a first capability, and the first capability is a capability of the terminal device of working at the first frequency when the terminal device supports only the first radio access technology.

Embodiment 21: According to the method in Embodiment 14 or Embodiment 15, the method further includes:
receiving a sixth message from the network device, where the sixth message is used to indicate to measure a second frequency, the terminal device works at the first frequency, the first frequency and the second frequency belong to a first frequency combination supported by the terminal device, the first frequency corresponds to the first radio access technology, the second frequency corresponds to the second radio access technology, the sixth message includes a configuration of a second measurement gap, the second measurement gap is used to measure the second frequency, the terminal device can perform communication at the first frequency when measuring the second frequency in the second measurement gap, and a capability of the terminal device corresponding to the first frequency in the second measurement gap is a second capability.

Embodiment 22: A communications apparatus is provided, including:
a processing module, configured to determine whether a first capability of a terminal device is less than or equal to a second capability of the terminal device, where the first capability is a capability of the terminal device of working at a first frequency when the terminal device supports only a first radio access technology, the second capability is a capability of the terminal device corresponding to the first frequency in a first frequency combination, the first frequency combination includes the first frequency and a second frequency, the first frequency corresponds to the first radio access technology, and the second frequency corresponds to a second radio access technology; and
a transceiver module, configured to: when the processing module determines that the first capability is less than or equal to the second capability, send a first message to the terminal device, where the first message is used to indicate the terminal device to measure the second frequency, the first message does not include a configuration of a first measurement gap, and the first measurement gap is used to measure the second frequency.

Embodiment 23: According to the communications apparatus in Embodiment 22, the terminal device measures the second frequency when working at the first frequency.

Embodiment 24: According to the communications apparatus in Embodiment 22 or Embodiment 23, the transceiver module is further configured to: when the processing module determines that the first capability is greater than the second capability, send a second message to the terminal device, where the second message is used to indicate the terminal device to measure the second frequency, and the second message includes the configuration of the first measurement gap.

Embodiment 25: According to the communications apparatus in Embodiment 22 or Embodiment 23,
the processing module is further configured to: when the first capability is greater than the second capability, configure a first communications parameter of the terminal device of working at the first frequency, to schedule communication of the terminal device at the first frequency based on a third capability, where the third capability is less than or equal to the second capability; and
the transceiver module is further configured to send a third message to the terminal device, where the third message is used to indicate the terminal device to measure the second frequency, the third message does not include the configuration of the first measurement gap, and the first measurement gap is used to measure the second frequency.

Embodiment 26: According to the communications apparatus in Embodiment 25, the third message further includes the first communications parameter, and the first communications parameter is a communications parameter used to configure a capability of the terminal device as the third capability.

Embodiment 27: According to the communications apparatus in Embodiment 22 or Embodiment 23,
the processing module is further configured to: when the first capability is greater than the second capability, determine a second communications parameter of the terminal device of working at the first frequency, to schedule communication of the terminal device at the first frequency based on the second capability; and the transceiver module is further configured to send a fourth message to the terminal device, where the fourth message is used to indicate the terminal device to measure the second frequency, the fourth message does not include the configuration of the first measurement gap, and the first measurement gap is used to measure the second frequency.

Embodiment 28: According to the communications apparatus in Embodiment 22 or Embodiment 23, the processing module is further configured to: when the first capability is greater than the second capability, configure a third communications parameter of the terminal device of working at the first frequency in a second measurement gap, to schedule communication of the terminal device at the first frequency in the second measurement gap based on a fourth capability, where the fourth capability is less than or equal to the first capability, and the second measurement gap is used to measure the second frequency; and the transceiver module is further configured to send a fifth message to the terminal device, where the fifth message is used to indicate the terminal device to measure the second frequency, the fifth message includes a configuration of the second measurement gap, and the second measurement gap is used to measure the second frequency.

Embodiment 29: According to the communications apparatus in Embodiment 28, the fifth message further includes the third communications parameter, and the third communications parameter is a communications parameter used to configure a capability of the terminal device as the fourth capability.

Embodiment 30: According to the communications apparatus in Embodiment 22 or Embodiment 23, the processing module is further configured to: when the first capability is greater than the second capability, determine a fourth communications parameter of the terminal device of working at the first frequency in a second measurement gap, to schedule communication of the terminal device at the first frequency in the second measurement gap based on the second capability; and the transceiver module is further configured to send a sixth message to the terminal device, where the sixth message is used to indicate the terminal device to measure the second frequency, the sixth message includes a configuration of the second measurement gap, and the second measurement gap is used to measure the second frequency.

Embodiment 31: According to the communications apparatus in any one of Embodiment 22 to Embodiment 30, the first frequency combination is a frequency combination supported by the terminal device; or the method further includes: if it is determined that the terminal device is in an activated state at the first frequency and a third frequency, and a frequency combination supported by the terminal device does not include a frequency combination including the first frequency, the second frequency, and the third frequency, deactivating the third frequency to obtain the first frequency combination, where the third frequency corresponds to the first radio access technology, and the first frequency combination is a frequency combination supported by the terminal device.

Embodiment 32: According to the communications apparatus in any one of Embodiment 22 to Embodiment 31, the processing module is configured to determine, in the following manner, whether the first capability of the terminal device is less than or equal to the second capability of the terminal device:

receiving capability information from the terminal device by using the transceiver module, where the capability information is used to indicate a capability of the terminal device of working at each of N frequencies when the terminal device supports only the first radio access technology, and indicate a capability of the terminal device corresponding to the third frequency in each of at least one supported frequency combination, the N frequencies include the first frequency, each frequency combination includes the third frequency and a fourth frequency, and the third frequency corresponds to the first radio access technology; and determining, based on the capability information, whether the first capability is less than or equal to the second capability.

Embodiment 33: According to the communications apparatus in any one of Embodiment 22 to Embodiment 31, the processing module is configured to determine, in the following manner, whether the first capability of the terminal device is less than or equal to the second capability of the terminal device:

receiving indication information from the terminal device by using the transceiver module, where the indication information indicates one or more frequency combinations, a capability of the terminal device corresponding to a fifth frequency in each of the one or more frequency combinations is greater than a capability of the terminal device of working at the fifth frequency when the terminal device supports only the first radio access technology, or a capability of the terminal device corresponding to a fifth frequency in each of the one or more frequency combinations is less than or equal to a capability of the terminal device of working at the fifth frequency when the terminal device supports only the first radio access technology, each frequency combination includes the fifth frequency and a sixth frequency, the fifth frequency corresponds to the first radio access technology, and the sixth frequency corresponds to the second radio access technology; and determining, based on the indication information, whether the first capability is less than or equal to the second capability.

Embodiment 34: According to the communications apparatus in any one of Embodiment 22 to Embodiment 33, the first capability is a capability of a quantity of MIMO layers, a quantity of SRS ports, or a quantity of antenna ports that can be supported by the terminal device; and/or the second capability is a capability of a quantity of MIMO layers, a quantity of SRS ports, or a quantity of antenna ports that can be supported by the terminal device.

Embodiment 35: A communications apparatus is provided, including:

a processing module, configured to determine one or more frequency combinations, where a capability of the communications apparatus corresponding to a fifth frequency in each of the one or more frequency combinations is greater than a capability of the communications apparatus of working at the fifth frequency when the communications apparatus supports only a first radio access technology, or a capability of the communications apparatus corresponding to a fifth frequency in each of the one or more frequency combinations is less than or equal to a capability of the communications apparatus of working at the fifth frequency when the communications apparatus supports only a first radio access technology, each frequency combination includes the fifth frequency and a sixth frequency, the fifth frequency corresponds to the first radio access technology, and the sixth frequency corresponds to a second radio access technology; and a transceiver module, configured to send indication information to a network device, where the indication information indicates the one or more frequency combinations.

Embodiment 36: According to the communications apparatus in Embodiment 35, the transceiver module is further configured to send capability information of the communications apparatus to the network device, where the capability information is used to indicate a capability of the communications apparatus of working at each of N frequencies when the communications apparatus supports only the first radio access technology, and indicate a capability of the communications apparatus corresponding to a third frequency in each of at least one supported frequency combination, the N frequencies include a first frequency, each frequency combination includes the third frequency and a fourth frequency, and the third frequency corresponds to the first radio access technology.

Embodiment 37: According to the communications apparatus in Embodiment 35 or Embodiment 36, the transceiver module is further configured to receive a first message from the network device, where the first message is used to indicate to measure a second frequency, the communications apparatus works at the first frequency, the first frequency and the second frequency belong to a first frequency combination supported by the communications apparatus, the first frequency corresponds to the first radio access technology, the second frequency corresponds to the second radio access technology, the first message does not include a configuration of a first measurement gap, and the first measurement gap is used to measure the second frequency.

Embodiment 38: According to the communications apparatus in Embodiment 36 or Embodiment 37, the transceiver module is further configured to receive a second message from the network device, where the second message is used to indicate to measure a second frequency, the communications apparatus works at the first frequency, the first frequency and the second frequency belong to a first frequency combination supported by the communications apparatus, the first frequency corresponds to the first radio access technology, the second frequency corresponds to the second radio access technology, the second message includes a configuration of a first measurement gap, and the first measurement gap is used to measure the second frequency.

Embodiment 39: According to the communications apparatus in Embodiment 35 or Embodiment 36, the transceiver module is further configured to receive a third message from the network device, where the third message is used to indicate the communications apparatus to measure a second frequency, the third message does not include a configuration of a first measurement gap, the first measurement gap is used to measure the second frequency, the third message further includes a first communications parameter, and the first communications parameter is a communications parameter used to configure a capability of the communications apparatus as a third capability.

Embodiment 40: According to the communications apparatus in Embodiment 35 or Embodiment 36, the transceiver module is further configured to receive a fourth message from the network device, where the fourth message is used to indicate the communications apparatus to measure a second frequency, the fourth message does not include a configuration of a first measurement gap, the first measurement gap is used to measure the second frequency, the communications apparatus can perform communication at the first frequency when measuring the second frequency, and a capability of the communications apparatus corresponding to the first frequency is a second capability.

Embodiment 41: According to the communications apparatus in Embodiment 35 or Embodiment 36, the transceiver module is further configured to receive a fifth message from the network device, where the fifth message is used to indicate to measure a second frequency, the communications apparatus works at the first frequency, the first frequency and the second frequency belong to a first frequency combination supported by the communications apparatus, the first frequency corresponds to the first radio access technology, the second frequency corresponds to the second radio access technology, the fifth message includes a configuration of a second measurement gap, the second measurement gap is used to measure the second frequency, the fifth message further includes a third communications parameter corresponding to the second measurement gap, the third communications parameter is a communications parameter used to configure a capability of the communications apparatus corresponding to the first frequency as a fourth capability, the fourth capability is less than or equal to a first capability, and the first capability is a capability of the communications apparatus of working at the first frequency when the communications apparatus supports only the first radio access technology.

Embodiment 42: According to the communications apparatus in Embodiment 35 or Embodiment 36, the transceiver module is further configured to receive a sixth message from the network device, where the sixth message is used to indicate to measure a second frequency, the communications apparatus works at the first frequency, the first frequency and the second frequency belong to a first frequency combination supported by the communications apparatus, the first frequency corresponds to the first radio access technology, the second frequency corresponds to the second radio access technology, the sixth message includes a configuration of a second measurement gap, the second measurement gap is used to measure the second frequency, the communications apparatus can perform communication at the first frequency when measuring the second frequency in the second measurement gap, and a capability of the communications apparatus corresponding to the first frequency in the second measurement gap is a second capability.

Embodiment 43: A communications apparatus is provided. The communications apparatus includes a processor and a transceiver. The processor and the transceiver are coupled, to perform the method according to any one of Embodiment 1 to Embodiment 13 or the method according to any one of Embodiment 14 to Embodiment 21.

Embodiment 44: A chip is provided. The chip includes a processor. When the processor executes instructions, the method according to any one of Embodiment 1 to Embodiment 13 or the method according to any one of Embodiment 14 to Embodiment 21 can be implemented. The instructions may be from a memory inside the chip, or may be from a memory outside the chip. Optionally, the chip further includes an input/output circuit. Optionally, the input/output circuit includes, for example, a communications interface.

Embodiment 45: A communications system is provided. The communications system includes the communications apparatus according to any one of Embodiment 22 to Embodiment 34 and the communications apparatus according to any one of Embodiment 35 to Embodiment 42.

Embodiment 46: A computer-readable storage medium is provided. The computer-readable storage medium stores a computer program, and when the computer program is run on a computer, the computer is enabled to perform the method according to any one of Embodiment 1 to Embodiment 13 or the method according to any one of Embodiment 14 to Embodiment 21.

Embodiment 47: A computer program product is provided. The computer program product is configured to store a computer program, and when the computer program is executed by a computer, the computer is enabled to implement the method according to any one of Embodiment 1 to Embodiment 13 or the method according to any one of Embodiment 14 to Embodiment 21.

Although this application is described with reference to embodiments herein, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

What is claimed is:

1. A communications method applied to a communication apparatus, the method comprising:
   determining whether a first capability of a terminal device is less than or equal to a second capability of the terminal device, wherein the first capability is a capability of the terminal device working at a first frequency based on the terminal device supporting only a first radio access technology, the second capability is a capability of the terminal device corresponding to the first frequency in a first frequency combination, the first frequency combination comprises the first frequency and a second frequency, the first frequency corresponds to the first radio access technology, and the second frequency corresponds to a second radio access technology; and
   based on the first capability being less than or equal to the second capability, sending a first message to the terminal device, wherein the first message indicates the terminal device to measure the second frequency, the first message does not comprise a configuration of a first measurement gap, and the first measurement gap is used to measure the second frequency.

2. The method according to claim 1, wherein the terminal device working at the first frequency measures the second frequency.

3. The method according to claim 1, further comprising:
   based on the first capability being greater than the second capability, sending a second message to the terminal device, wherein the second message indicates the terminal device to measure the second frequency, and the second message comprises the configuration of the first measurement gap.

4. The method according to claim 1, further comprising:
   based on the first capability being greater than the second capability, configuring a first communications parameter of the terminal device working at the first frequency, to schedule communication of the terminal device at the first frequency based on a third capability, wherein the third capability is less than or equal to the second capability; and
   sending a third message to the terminal device, wherein the third message indicates the terminal device to measure the second frequency, the third message does not comprise the configuration of the first measurement gap, and the first measurement gap is used to measure the second frequency.

5. The method according to claim 4, wherein the third message further comprises the first communications parameter, and the first communications parameter is a communications parameter used to configure a capability of the terminal device as the third capability.

6. The method according to claim 1, further comprising:
   based on the first capability being greater than the second capability, determining a second communications parameter of the terminal device working at the first frequency, to schedule communication of the terminal device at the first frequency based on the second capability; and
   sending a fourth message to the terminal device, wherein the fourth message indicates the terminal device to measure the second frequency, the fourth message does not comprise the configuration of the first measurement gap, and the first measurement gap is used to measure the second frequency.

7. The method according to claim 1, further comprising:
   based on the first capability being greater than the second capability, configuring a third communications parameter of the terminal device working at the first frequency in a second measurement gap, to schedule communication of the terminal device at the first frequency in the second measurement gap based on a fourth capability, wherein the fourth capability is less than or equal to the first capability, and the second measurement gap is used to measure the second frequency; and
   sending a fifth message to the terminal device, wherein the fifth message indicates the terminal device to measure the second frequency, the fifth message comprises a configuration of the second measurement gap, and the second measurement gap is used to measure the second frequency.

8. The method according to claim 1, further comprising:
   based on the first capability being greater than the second capability, determining a fourth communications parameter of the terminal device working at the first frequency in a second measurement gap, to schedule communication of the terminal device at the first frequency in the second measurement gap based on the second capability; and
   sending a sixth message to the terminal device, wherein the sixth message indicates the terminal device to measure the second frequency, the sixth message comprises a configuration of the second measurement gap, and the second measurement gap is used to measure the second frequency.

9. A communications method applied to a communication apparatus, the method comprising:
   determining one or more frequency combinations, wherein a capability of a terminal device corresponding to a fifth frequency in each of the one or more frequency combinations is greater than a capability of the terminal device working at the fifth frequency, based on the terminal device supporting only a first radio access technology, or the capability of the terminal device corresponding to the fifth frequency in each of the one or more frequency combinations is less than or equal to the capability of the terminal device working at the fifth frequency based on the terminal device supporting only the first radio access technology, each frequency combination comprises the fifth frequency and a sixth frequency, the fifth frequency corresponds to the first radio access technology, and the sixth frequency corresponds to a second radio access technology; and sending indication information to a network device, wherein the indication information indicates the one or more frequency combinations.

10. The method according to claim 9, further comprising: sending capability information of the terminal device to the network device, wherein the capability information indicates a capability of the terminal device of working at each of N frequencies, based on the terminal device supporting only the first radio access technology, and indicates a capability of the terminal device corresponding to a third frequency in each of at least one supported frequency combination, the N frequencies comprise a first frequency, each frequency combination comprises the third frequency and a fourth frequency, and the third frequency corresponds to the first radio access technology, wherein N is an integer greater than or equal to 1.

11. The method according to claim 9, further comprising: receiving a fifth message from the network device, wherein the fifth message indicates to measure a second frequency, the terminal device works at the first frequency, the first frequency and the second frequency belong to a first frequency combination supported by the terminal device, the first frequency corresponds to the first radio access technology, the second frequency corresponds to the second radio access technology, the fifth message comprises a configuration of a second measurement gap, the second measurement gap is used to measure the second frequency, the fifth message further comprises a third communications parameter corresponding to the second measurement gap, the third communications parameter is a communications parameter used to configure a capability of the terminal device corresponding to the first frequency as a fourth capability, the fourth capability is less than or equal to a first capability, and the first capability is a capability of the terminal device of working at the first frequency based on the terminal device supporting only the first radio access technology.

12. The method according to claim 9, further comprising: receiving a sixth message from the network device, wherein the sixth message indicates to measure a second frequency, the terminal device works at the first frequency, the first frequency and the second frequency belong to a first frequency combination supported by the terminal device, the first frequency corresponds to the first radio access technology, the second frequency corresponds to the second radio access technology, the sixth message comprises a configuration of a second measurement gap, the second measurement gap is used to measure the second frequency, the terminal device performs communication at the first frequency based on the terminal device measuring the second frequency in the second measurement gap, and a capability of the terminal device corresponding to the first frequency in the second measurement gap is a second capability.

13. A communications apparatus, comprising a processor and a transceiver, wherein the processor and the transceiver are coupled to each other, and cooperate with each other to perform a method including:

determining whether a first capability of a terminal device is less than or equal to a second capability of the terminal device, wherein the first capability is a capability of the terminal device working at a first frequency based on the terminal device supporting only a first radio access technology, the second capability is a capability of the terminal device corresponding to the first frequency in a first frequency combination, the first frequency combination comprises the first frequency and a second frequency, the first frequency corresponds to the first radio access technology, and the second frequency corresponds to a second radio access technology; and based on the first capability being less than or equal to the second capability, sending a first message to the terminal device, wherein the first message indicates the terminal device to measure the second frequency, the first message does not comprise a configuration of a first measurement gap, and the first measurement gap is used to measure the second frequency.

14. The communications apparatus according to claim 13, wherein the terminal device working at the first frequency measures the second frequency.

15. The communications apparatus according to claim 13, wherein the method further includes:

based on the first capability being greater than the second capability, configuring a first communications parameter of the terminal device working at the first frequency, to schedule communication of the terminal device at the first frequency based on a third capability, wherein the third capability is less than or equal to the second capability; and sending a third message to the terminal device, wherein the third message indicates the terminal device to measure the second frequency, the third message does not comprise the configuration of the first measurement gap, and the first measurement gap is used to measure the second frequency.

16. The communications apparatus according to claim 13, wherein the method further includes:

based on the first capability being greater than the second capability, determining a second communications parameter of the terminal device working at the first frequency, to schedule communication of the terminal device at the first frequency based on the second capability; and sending a fourth message to the terminal device, wherein the fourth message indicates the terminal device to measure the second frequency, the fourth message does not comprise the configuration of the first measurement gap, and the first measurement gap is used to measure the second frequency.

17. The communications apparatus according to claim 13, wherein the method further includes:

based on the first capability being greater than the second capability, configuring a third communications parameter of the terminal device working at the first frequency in a second measurement gap, to schedule communication of the terminal device at the first frequency in the second measurement gap based on a fourth capability, wherein the fourth capability is less than or equal to the first capability, and the second measurement gap is used to measure the second frequency; and sending a fifth message to the terminal device, wherein the fifth message indicates the terminal device to measure the second frequency, the fifth message comprises a configuration of the second measurement gap, and the second measurement gap is used to measure the second frequency.

18. A non-transitory computer-readable storage medium, storing a computer program, which is run on a computer, and causes the computer to perform a method including:

determining whether a first capability of a terminal device is less than or equal to a second capability of the terminal device, wherein the first capability is a capability of the terminal device working at a first frequency based on the terminal device supporting only a first radio access technology, the second capability is a capability of the terminal device corresponding to the first frequency in a first frequency combination, the first frequency combination comprises the first frequency and a second frequency, the first frequency corresponds to the first radio access technology, and the second frequency corresponds to a second radio access technology; and based on the first capability being less than or equal to the second capability, sending a first message to the terminal device, wherein the first message indicates the terminal device to measure the second frequency, the first message does not comprise a configuration of a first measurement gap, and the first measurement gap is used to measure the second frequency.

19. The non-transitory computer-readable storage medium according to claim 18, wherein the method further includes:

based on the first capability being greater than the second capability, configuring a first communications parameter of the terminal device working at the first frequency, to schedule communication of the terminal device at the first frequency based on a third capability, wherein the third capability is less than or equal to the second capability; and sending a third message to the terminal device, wherein the third message indicates the terminal device to measure the second frequency, the third message does not comprise the configuration of the first measurement gap, and the first measurement gap is used to measure the second frequency.

20. The non-transitory computer-readable storage medium according to claim 18, wherein the method further includes:

based on the first capability being greater than the second capability, determining a second communications parameter of the terminal device working at the first frequency, to schedule communication of the terminal device at the first frequency based on the second capability; and sending a fourth message to the terminal device, wherein the fourth message indicates the terminal device to measure the second frequency, the fourth message does not comprise the configuration of the first measurement gap, and the first measurement gap is used to measure the second frequency.

\* \* \* \* \*